(12) United States Patent
Hirose et al.

(10) Patent No.: US 9,620,810 B2
(45) Date of Patent: Apr. 11, 2017

(54) SECONDARY BATTERY AND ANODE

(75) Inventors: Takakazu Hirose, Fukushima (JP); Kenichi Kawase, Fukushima (JP); Kazunori Noguchi, Fukushima (JP); Takayuki Fujii, Fukushima (JP)

(73) Assignee: SONY CORPORATION, Tokyo (JP)

(*) Notice: Subject to any disclaimer, the term of this patent is extended or adjusted under 35 U.S.C. 154(b) by 606 days.

(21) Appl. No.: 12/617,306

(22) Filed: Nov. 12, 2009

(65) Prior Publication Data

US 2010/0124707 A1 May 20, 2010

(30) Foreign Application Priority Data

Nov. 14, 2008 (JP) .................................. 2008-291850
Jun. 25, 2009 (JP) .................................. 2009-150923

(51) Int. Cl.
| H01M 6/16 | (2006.01) |
| H01M 6/04 | (2006.01) |
| H01M 4/02 | (2006.01) |
| H01M 10/0525 | (2010.01) |
| H01M 4/38 | (2006.01) |
| H01M 4/134 | (2010.01) |
| H01M 4/1395 | (2010.01) |
| H01M 10/0568 | (2010.01) |
| H01M 10/0569 | (2010.01) |

(52) U.S. Cl.
CPC ....... *H01M 10/0525* (2013.01); *H01M 4/134* (2013.01); *H01M 4/1395* (2013.01); *H01M 4/38* (2013.01); *H01M 4/386* (2013.01); *H01M 10/0568* (2013.01); *H01M 10/0569* (2013.01)

(58) Field of Classification Search
None
See application file for complete search history.

(56) References Cited

U.S. PATENT DOCUMENTS

| 5,700,596 A | * | 12/1997 | Ikoma | ..................... H01M 4/32 252/182.1 |
| 6,685,804 B1 | | 2/2004 | Ikeda et al. | |
| 2002/0056474 A1 | * | 5/2002 | Sugawara et al. | ............ 136/261 |
| 2002/0076612 A1 | * | 6/2002 | Tanizaki et al. | .............. 429/223 |

(Continued)

FOREIGN PATENT DOCUMENTS

| JP | 2002-313319 | 10/2002 |
| JP | 2004-047404 | 2/2004 |

(Continued)

OTHER PUBLICATIONS

Japanese Patent Office Action corresponding to Japanese Serial No. 2009-150923 dated Apr. 26, 2011.

*Primary Examiner* — Ula C Ruddock
*Assistant Examiner* — Amanda Barrow
(74) *Attorney, Agent, or Firm* — Dentons US LLP

(57) ABSTRACT

A secondary battery capable of obtaining superior cycle characteristics and superior swollenness characteristics is provided. The secondary battery includes a cathode and an anode capable of inserting and extracting an electrode reactant; and an electrolyte containing a solvent and an electrolyte salt. The anode has an anode active material layer on an anode current collector. The anode active material layer contains a plurality of crystalline anode active material particles having silicon (Si) as an element. The plurality of anode active material particles contain a spherical particle and a nonspherical particle.

18 Claims, 17 Drawing Sheets

(56) References Cited

U.S. PATENT DOCUMENTS

| | | | |
|---|---|---|---|
| 2002/0164479 A1* | 11/2002 | Matsubara et al. | 428/367 |
| 2005/0141740 A1* | 6/2005 | Preves | H01M 10/0413 381/323 |
| 2006/0099507 A1* | 5/2006 | Kogetsu et al. | 429/218.1 |
| 2006/0216604 A1* | 9/2006 | Kawase et al. | 429/231.95 |
| 2007/0029682 A1* | 2/2007 | Aoki et al. | 257/793 |
| 2007/0087268 A1* | 4/2007 | Kim | H01M 4/134 429/232 |
| 2007/0092797 A1* | 4/2007 | Konishiike et al. | 429/218.1 |
| 2007/0105017 A1* | 5/2007 | Kawase et al. | 429/218.1 |
| 2007/0184560 A1* | 8/2007 | Schwirtlich et al. | 438/1 |
| 2007/0207382 A1* | 9/2007 | Yamane et al. | 429/223 |
| 2008/0038555 A1* | 2/2008 | Sekine et al. | 428/402 |
| 2008/0199779 A1* | 8/2008 | Kim et al. | 429/231.95 |
| 2008/0233478 A1* | 9/2008 | Hirose et al. | 429/220 |
| 2008/0241647 A1* | 10/2008 | Fukui et al. | 429/94 |
| 2008/0248393 A1* | 10/2008 | Richard | H01M 4/136 429/231.95 |
| 2013/0270749 A1* | 10/2013 | Hachtmann | B29C 35/0894 264/496 |
| 2014/0361726 A1* | 12/2014 | Carkner | H01M 10/46 320/103 |

FOREIGN PATENT DOCUMENTS

| | | | | |
|---|---|---|---|---|
| JP | 2004-158205 | * | 6/2004 | H01M 4/58 |
| JP | 2005-347076 | | 12/2005 | |
| JP | 2006-269331 | | 10/2006 | |
| JP | 2007-005201 | | 1/2007 | |
| JP | 2007-095544 | | 4/2007 | |
| JP | 2007-122915 | | 5/2007 | |
| JP | 2007-335206 | | 12/2007 | |
| JP | 2008-097954 | | 4/2008 | |
| JP | 2008-135382 | * | 6/2008 | H01M 4/02 |
| JP | 2008-176981 | * | 7/2008 | H01M 4/02 |
| JP | 2008-270154 | | 11/2008 | |
| JP | 2009-252579 | * | 10/2009 | H01M 4/02 |
| WO | 01/29912 | | 4/2001 | |

* cited by examiner

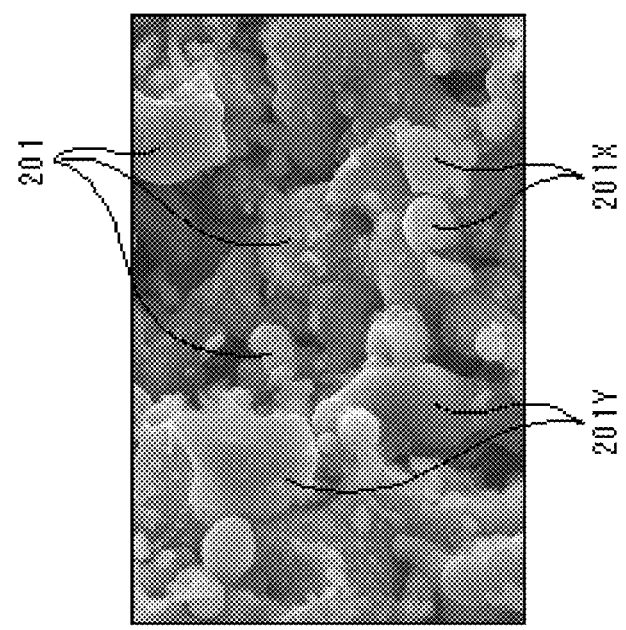

SECONDARY BATTERY AND ANODE

BACKGROUND OF THE INVENTION

1. Field of the Invention

The present invention relates to an anode having an anode active material layer capable of inserting and extracting an electrode reactant on an anode current collector and a secondary battery using the same.

2. Description of the Related Art

In recent years, portable electronic devices such as a video camera, a digital still camera, a mobile phone, and a notebook personal computer have been widely used, and it is strongly demanded to reduce their size and weight and to achieve their long life. Accordingly, as an electric power source for the portable electronic devices, a battery, in particular, a small and light-weight secondary battery capable of providing a high energy density has been developed.

Specially, a lithium ion secondary battery using insertion and extraction of lithium ions for charge and discharge reaction is in practical use widely, since such a lithium ion secondary battery is able to provide a higher energy density than a lead battery and a nickel cadmium battery.

The lithium ion secondary battery includes a cathode containing a cathode active material capable of inserting and extracting lithium ions, an anode containing an anode active material capable of inserting and extracting lithium ions, and an electrolyte.

As the anode active material, a carbon material is widely used. However, in recent years, as the high performance and the multi functions of the portable electronic devices are developed, further improving the battery capacity is demanded. Thus, it has been considered to use silicon instead of the carbon material. Since the theoretical capacity of silicon (4199 mAh/g) is significantly higher than the theoretical capacity of graphite (372 mAh/g), it is prospected that the battery capacity is thereby highly improved.

In the case where silicon is used as an anode active material, as a method of forming the anode active material layer, vapor-phase deposition method such as evaporation method is used. In this case, silicon is directly deposited on the surface of the anode current collector, and the anode active material is linked to (fixed on) the anode current collector, and thus the anode active material layer is hardly expanded and shrunk at the time of charge and discharge.

However, in this case, there is concern that cycle characteristics and swollenness characteristics as important characteristics of the secondary battery are lowered for the following reasons.

Firstly, at the time of charge and discharge, the anode active material inserting lithium ions becomes highly active. Thus, the electrolyte is easily decomposed, and part of the lithium ions easily becomes inert. Thereby, after charge and discharge are repeated, the discharge capacity is easily lowered, and gas is easily generated in the battery due to decomposition of the electrolyte.

Secondly, even if the anode active material is linked to the anode current collector, there is a possibility that the anode active material layer is broken and dropped from the anode current collector depending on the degree of expansion and shrinkage of the anode active material layer at the time of charge and discharge. Thereby, after charge and discharge are repeated, the discharge capacity is easily lowered. Further, if the anode active material layer is intensely expanded and shrunk, consequently the anode current collector becomes easily deformed.

Thirdly, since the silicon depositional film becomes amorphous (amorphous), the anode active material is easily affected by oxidation. Thus, the physical property of the anode active material is deteriorated with age, and the contact strength of the anode active material layer to the anode current collector is easily lowered. Thereby, after charge and discharge are repeated, the discharge capacity is easily lowered.

Therefore, to improve the cycle characteristics and the like of the lithium ion secondary battery, several technologies have been proposed. Specifically, the anode active material is formed to contain a crystalline region and an amorphous region (for example, refer to WO 01/029912). Further, a plurality of anode active material particles containing silicon and lithium are used and are bound by being sintered or fused (for example, refer to Japanese Unexamined Patent Application Publication No. 2006-269331). Further, the anode active material layer is formed so that a lower layer having primary particles grown by using vapor-phase deposition method and an upper layer having secondary particles deposited by using coating method are layered (for example, refer to Japanese Unexamined Patent Application Publication No. 2007-122915).

SUMMARY OF THE INVENTION

In these years, the high performance and the multi functions of the portable electronic devices are increasingly developed, and the electric power consumption thereof tends to be increased. Thus, charge and discharge of the secondary battery tend to be frequently repeated. Accordingly, in order to use the secondary battery frequently and safely, further improvement of the cycle characteristics and the swollenness characteristics has been aspired.

In view of the foregoing disadvantages, in the invention, it is desirable to provide an anode capable of obtaining superior cycle characteristics and superior swollenness characteristics and a secondary battery using the same.

According to an embodiment of the invention, there is provided a secondary battery including a cathode and an anode capable of inserting and extracting an electrode reactant and an electrolyte containing a solvent and an electrolyte salt. The anode has an anode active material layer on an anode current collector. The anode active material layer contains a plurality of crystalline anode active material particles having silicon as an element. The plurality of anode active material particles contain a spherical particle and a nonspherical particle. According to an embodiment of the invention, there is provided an anode capable of inserting and extracting an electrode reactant and having an anode active material layer on an anode current collector. The anode active material layer contains a plurality of crystalline anode active material particles having silicon as an element, and the plurality of anode active material particles contain a spherical particle and a nonspherical particle.

According to the anode of the embodiment of the invention, the anode active material layer contains the plurality of crystalline anode active material particles having silicon as an element, and the plurality of anode active material particles contain the spherical particle and the nonspherical particle. Thereby, the physical property of the anode active material particles is hardly deteriorated with age. Further, at the time of electrode reaction, the anode active material layer is hardly expanded and shrunk, and thus the anode current collector is hardly deformed. Therefore, according to the secondary battery using the anode of the embodiment of the invention, superior cycle characteristics and superior swollenness characteristics are able to be obtained.

Other and further objects, features and advantages of the invention will appear more fully from the following description.

BRIEF DESCRIPTION OF THE DRAWINGS

FIG. 4 is an SEM photograph illustrating a surface structure of the anode illustrated in FIG. 1;

DETAILED DESCRIPTION OF THE PREFERRED EMBODIMENT

Figure 1:
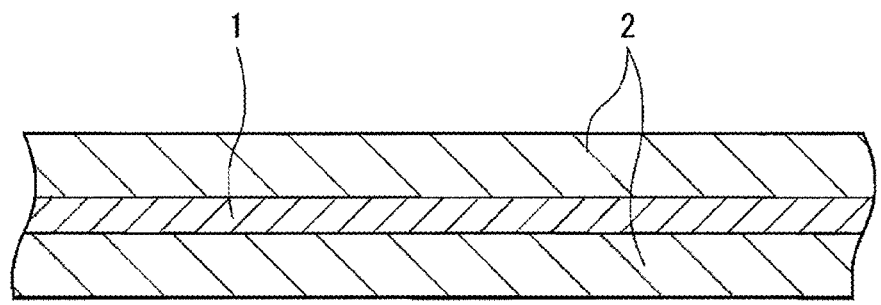
FIG. 1 is a cross sectional view illustrating a structure of an anode according to an embodiment of the invention.
Figure 2A:
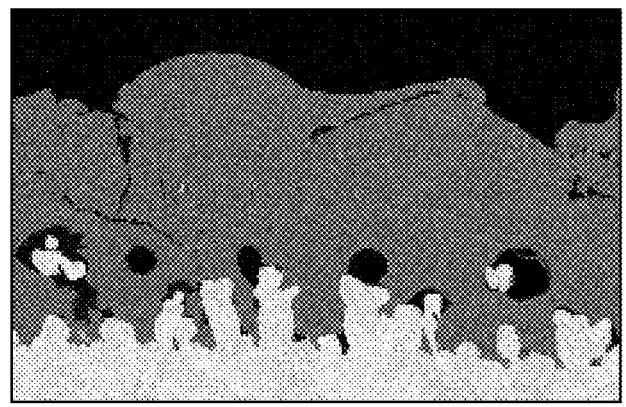
FIGS. 2A and 2B are an SEM photograph illustrating a cross sectional structure of the anode illustrated in FIG. 1 and a schematic drawing thereof.
Figure 2B:
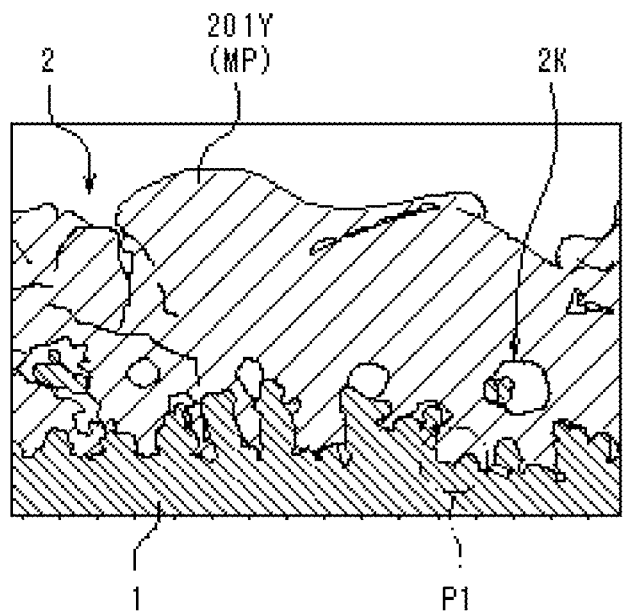

An embodiment of the invention will be hereinafter described in detail with reference to the drawings. The description will be given in the following order.
1. Anode
2. Electrochemical device (secondary battery) using anode
2-1. First secondary battery (square type)
2-2. Second secondary battery (cylindrical type)
2-3. Third secondary battery (laminated film type)
1. Anode FIG. 1 illustrates a cross sectional structure of an anode according to an embodiment of the invention. The anode is used, for example, for an electrochemical device such as a secondary battery. The anode has an anode current collector 1 having a pair of faces and an anode active material layer 2 provided on the anode current collector 1.

Anode Current Collector

The anode current collector 1 is preferably made of a material having favorable electrochemical stability, favorable electric conductivity, and favorable mechanical strength. Examples of such a material include copper, nickel, and stainless. Specially, copper is preferable since a high electric conductivity is thereby obtained.

The surface of the anode current collector 1 is preferably roughened. Thereby, due to the so-called anchor effect, the contact characteristics between the anode current collector 1 and the anode active material layer 2 are improved. In this case, it is enough that the surface of the anode current collector 1 at least in the region opposed to the anode active material layer 2 is roughened. Examples of roughening methods include a method of forming fine particles by electrolytic treatment. The electrolytic treatment is a method of providing concavity and convexity by forming fine particles on the surface of the anode current collector 1 by electrolytic method in an electrolytic bath. A copper foil formed by the electrolytic method is generally called "electrolytic copper foil." Examples of other roughening methods include a method of sandblasting a rolled copper foil.

The ten point height of roughness profile Rz of the surface of the anode current collector 1 is not particularly limited, but in particular, is preferably from 1.5 µm or more. In this case, the ten point height of roughness profile Rz is more preferably from 1.5 µm to 30 µm both inclusive, and is much more preferably from 3 µm to 30 µm both inclusive, since thereby the contact characteristics between the anode current collector 1 and the anode active material layer 2 are further improved. More specifically, if it is smaller than 1.5 µm, there is a possibility that sufficient contact characteristics are not able to be obtained. Meanwhile, if it is larger than 30 µm, there is a possibility that contact characteristics are lowered.

Anode Active Material Layer

The anode active material layer 2 is, for example, provided on both faces of the anode current collector 1. However, the anode active material layer 2 may be provided only on a single face of the anode current collector 1.

The anode active material layer 2 contains, as an anode active material, one or more anode materials capable of inserting and extracting an electrode reactant such as lithium ions. If necessary, the anode active material layer 2 may contain other material such as an electrical conductor together with the foregoing anode active material.

As the anode material, a material having silicon as an element is preferable, since such a material has superior ability to insert and extract the electrode reactant and thus is able to provide a high energy density. Examples of such a material include a simple substance, an alloy, or a compound of silicon, and a material having one or more phases thereof at least in part. Specially, at least one of the simple substance, the alloy, and the compound of silicon is preferable, and the silicon simple substance is more preferable.

"Alloys" in the invention include an alloy having one or more metal elements and one or more metalloid elements, in addition to an alloy having two or more metal elements. It is needless to say that the foregoing "alloys" in the invention may have a nonmetallic element. The structure thereof includes a solid solution, a eutectic crystal (eutectic mixture), an intermetallic compound, and a structure in which two or more thereof coexist.

Examples of alloys of silicon include an alloy having at least one of the following elements as an element other than silicon. That is, examples of the elements include tin, nickel, copper, iron, cobalt, manganese, zinc, indium (In), silver, titanium, germanium, bismuth (Bi), antimony, and chromium.

Examples of compounds of silicon include a compound having oxygen and carbon (C) as an element other than silicon. The compounds of silicon may have, for example, one or more of the foregoing elements described for the alloys of silicon as an element other than silicon.

Examples of alloys or compounds of silicon include the following. That is, examples thereof include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, and $TaSi_2$. In addition, examples thereof include $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), and $LiSiO$.

The anode active material preferably has oxygen as an element in addition to the foregoing silicon, since thereby expansion and shrinkage of the anode active material layer 2 at the time of electrode reaction are prevented. In this case, at least part of oxygen is preferably bonded with part of silicon. The bonding state may be in the form of silicon monoxide, silicon dioxide, or in the form of other metastable state.

The oxygen content in the anode active material is not particularly limited, but is preferably from 1.5 atomic % to 40 atomic % both inclusive, since thereby expansion and shrinkage of the anode active material layer 2 are more prevented. More specifically, when the oxygen content is smaller than 1.5 atomic %, there is a possibility that expansion and shrinkage of the anode active material layer 2 are not sufficiently prevented. Meanwhile, when the oxygen content is larger than 40 atomic %, the resistance may be excessively increased. In the case where the anode is used together with an electrolyte in an electrochemical device, the anode active material does not include a coat formed by decomposition of the electrolyte and the like. That is, when the oxygen content in the anode active material is calculated, oxygen in the foregoing coat is not included in the calculation.

The anode active material having oxygen is formed by continuously introducing oxygen gas into a chamber, for example, when the anode material is deposited. In particular, if a desired oxygen content is not obtained only by introducing the oxygen gas, a liquid (for example, moisture vapor or the like) may be introduced into the chamber as a supply source of oxygen.

Further, the anode active material preferably has a metal element as an element in addition to the foregoing silicon, since thereby resistance of the anode active material is lowered, and expansion and shrinkage of the anode active material layer 2 at the time of electrode reaction are more prevented. Examples of such a metal element include at least one of the following elements. That is, examples thereof include iron, nickel, molybdenum, titanium, chromium, cobalt, copper, manganese, zinc, germanium, aluminum, zirconium, silver, tin, antimony, and tungsten. The metal element content in the anode active material is not particularly limited. However, in the case where the anode is used for a secondary battery, if the content of the metal element is excessively large, the thickness of the anode active material layer 2 should be increased to obtain a desired battery capacity, and thus the anode active material layer 2 may be broken, and the anode active material layer 2 may be exfoliated from the anode current collector 1.

The anode active material may wholly have the metal element, or may partly have the metal element. In this case, the state of the anode active material may be a perfectly alloyed state (alloyed state), or a state that is not perfectly alloyed but a state in which silicon and the metal element are mixed (compound state or phase separation state). The state of the anode active material is able to be checked by, for example, energy dispersive X-ray fluorescence spectroscopy (EDX).

The anode active material having the metal element is formed, for example, by using alloy particles as a formation material in depositing the anode material, or depositing a metal material together with the anode material.

Further, it is preferable that the anode active material layer 2 includes a high oxygen-containing region having a higher oxygen content and a low oxygen-containing region having a lower oxygen content in the layer (in the thickness direction), since expansion and shrinkage of the anode active material layer 2 are prevented at the time of electrode reaction. The oxygen content in the low oxygen-containing region is preferably small as long as possible. The oxygen content in the high oxygen-containing region is, for example, similar to the oxygen content in the anode active material described above.

In this case, it is preferable that the high oxygen-containing region is sandwiched between the low oxygen-containing regions, and it is more preferable that that the low oxygen-containing region and the high oxygen-containing region are alternately and repeatedly layered, since thereby expansion and shrinkage of the anode active material layer 2 are more prevented. In the case where the low oxygen-containing region and the high oxygen-containing region are alternately layered, a high oxygen content region and a low oxygen content region are alternately and repeatedly distributed in the anode active material layer 2.

The anode active material containing the high oxygen-containing region and the low oxygen-containing region is formed by, for example, intermittently introducing oxygen gas into a chamber or changing the oxygen gas amount introduced into the chamber at the time of depositing the anode material. It is needless to say that in the case where a desired oxygen content is not able to be obtained only by introducing the oxygen gas, liquid (for example, moisture vapor or the like) may be introduced into the chamber.

It is possible that the oxygen content of the high oxygen-containing region is clearly different from the oxygen content of the low oxygen-containing region, or the oxygen content of the high oxygen-containing region is not clearly different from the oxygen content of the low oxygen-containing region. In particular, in the case where the introduction amount of the foregoing oxygen gas is continuously changed, the oxygen content may be continuously changed. In the case where the introduction amount of the oxygen gas is intermittently changed, the high oxygen-containing region and the low oxygen-containing region become so-called "layers." Meanwhile, in the case where the introduction amount of the oxygen gas is continuously changed, the high oxygen-containing region and the low oxygen-containing region become "lamellar state" rather than "layers." In the latter case, it is preferable that the oxygen content is incrementally or continuously changed between the high oxygen-containing region and the low oxygen-containing region. If the oxygen content is changed drastically, there is a possibility that the ion diffusion characteristics are lowered, or the resistance is increased.

Further, the anode active material is crystalline, and is hardly affected by oxidation. Thus, the physical property of the anode active material is hardly deteriorated with age, and the contact characteristics of the anode active material layer 2 to the anode current collector 1 is hardly lowered.

The crystal state (crystalline or amorphous) of the anode active material is able to be checked by X-ray diffraction. Specifically, if a sharp peak is detected as a result of analyzing the anode active material, the anode active material is crystalline. Meanwhile, if a broad peak is detected as a result of analyzing the anode active material, the anode active material is amorphous.

The half-width ($2\theta$) of the diffraction peak in (111) crystal plane of the anode active material obtained by X-ray diffraction is not particularly limited, but is preferably 20 degree or less. Further, the crystallite size originated in the same crystal plane is not particularly limited, but is, in particular, preferably 10 nm or more. Thereby, the physical property of the anode active material is hardly deteriorated with age, and diffusion characteristics of the electrode reactant becomes further hardly lowered.

The anode active material is preferably linked to the surface of the anode current collector 1. Thereby, the anode active material layer 2 is physically fixed on the anode current collector 1, and thus the anode active material layer 2 is hardly expanded and shrunk at the time of electrode reaction. The foregoing words "the anode active material is linked to the surface of the anode current collector 1" means that the anode material is directly deposited on the surface of the anode current collector 1. Thus, in the case where the anode active material layer 2 is formed by coating method, sintering method or the like, the anode active material is not directly linked to the surface of the anode current collector 1. In this case, the anode active material is indirectly linked to the anode current collector 1 with other material (for example, a binder or the like) in between, or the anode active material is only adjacent to the surface of the anode current collector 1.

It is enough that the anode active material is linked to the surface of the anode current collector 1 at least in part thereof. If at least part thereof is linked to the anode current collector 1, the contact strength of the anode active material layer 2 to the anode current collector 1 is improved compared to a case that the anode active material is never linked to the surface of the anode current collector 1. In the case where part of the anode active material is contacted with the anode current collector 1, the anode active material layer 2 has a portion where the anode active material is contacted with the anode current collector 1 and a portion where the anode active material is not contacted with the anode current collector 1.

In the case where the anode active material does not have the portion where the anode active material is not contacted with the anode current collector 1, the whole anode active material is contacted with the anode current collector 1, and thus electron conductivity in between is increased. In this case, the space where the anode active material layer 2 is expanded and shrunk at the time of electrode reaction does not exist. Thus, the anode current collector may be deformed due to stress generated by the expansion and shrinking of the anode active material layer.

Meanwhile, in the case where the anode active material has the portion where the anode active material is not contacted with the anode current collector 1, the way out (relax space) in the case where the anode active material layer 2 is expanded and shrunk at the time of electrode reaction exists. Thus, deformation of the anode current collector 1 being affected by a stress hardly occurs. Meanwhile, since there is the portion where the anode active material is not contacted with the anode current collector 1, electron conductivity in between may be lowered.

In this case, the anode active material layer 2 preferably has an air gap therein. Thereby, the way out (relax space) in the case where the anode active material layer 2 is expanded and shrunk at the time of electrode reaction is obtained, and accordingly the anode active material layer 2 becomes hardly expanded and shrunk.

Further, the anode active material is preferably alloyed with the anode current collector 1 in at least part of the interface thereof. Thereby, the contact strength of the anode active material layer 2 to the anode current collector 1 is increased, and thus the anode active material layer 2 becomes hardly expanded and shrunk at the time of electrode reaction. Further, electron conductivity between the anode current collector 1 and the anode active material layer 2 is thereby improved. "Being alloyed" includes not only a case that the element of the anode current collector 1 and the element of the anode active material form perfect alloying, but also includes a case that both elements are mixed. In the latter case, at the interface thereof, the element of the anode current collector 1 may be diffused in the anode active material, the element of the anode active material may be diffused in the anode current collector 1, or these elements may be diffused in each other.

In particular, the anode active material is in a state of a plurality of particles. In this case, the anode active material may have a single layer structure formed by a single deposition step or may have a multilayer structure formed by a plurality of deposition steps. However, if the deposition step is associated with high heat, the anode active material preferably has a multilayer structure. In the case where the deposition step is divided into several steps, time that the anode current collector 1 is exposed at high heat is shortened compared to a case that the deposition is performed in a single deposition step.

The plurality of particulate anode active materials (anode active material particles) contain a spherical particle and a nonspherical particle. In this case, compared to a case that the anode active material particles do not contain the spherical particle, the anode active material layer 2 is hardly expanded and shrunk at the time of electrode reaction, and thus the anode current collector 1 is hardly deformed. More specifically, the spherical particle more hardly contributes to electrode reaction due to its high resistance compared to the nonspherical particle, and thus the spherical particle is hardly expanded and shrunk at the time of electrode reaction. Thereby, even if the nonspherical particle is expanded and shrunk at the time of electrode reaction and thereby an internal stress is generated, the internal stress is relaxed by the spherical particle, and accordingly the anode current collector 1 is hardly deformed by being affected by the internal stress.

The foregoing "spherical particle" is a particle capable of being recognized as a particle having a spherical outline when the surface of the anode active material layer 2 is observed by using a scanning electron microscope (SEM) at the magnification ratio of 8000 times. Meanwhile, the "nonspherical particle" is a particle other than the foregoing spherical particle, and is mainly a particle capable of being recognized as a particle having a polygonal or platy outline when the surface of the anode active material layer 2 is observed by using the SEM (magnification ratio: 8000 times).

The number of spherical particles is not particularly limited. If at least one spherical particle is contained, the anode current collector 1 becomes hardly deformed compared to a case that no spherical particle is contained. However, if the number of spherical particles not contributing to electrode reaction is excessively large, the insertion and extraction amount of the electrode reactant may be lowered. More specifically, if the anode is used for a secondary battery, the battery capacity may be lowered. Thus, the number of spherical particles is preferably from 10 pcs to 200 pcs both inclusive.

The foregoing number of spherical particles is obtained by shooting 30 pieces of images (SEM images) of the surface of the anode active material layer 2 with the use of the SEM (magnification ratio: 8000 times), counting the number of spherical particles for each image, and then averaging the counted numbers for each image. In this case, the observation range by the SEM (referential range) is 10.75 µm in height and 16.00 µm in width. Further, a particle whose whole outline is not included in one piece of image (particle whose part of the outline is broken at the end of the image) is not counted.

In counting the number of spherical particles, it is preferable to count only spherical particles having a particle diameter (median size) within a given range. Thereby, human-caused variation due to whether a minute particle is counted or not is prevented, and counting a giant foreign substance such as a dust by mistake is prevented. The foregoing given range is, for example, from 0.1 µm to 40 µm both inclusive. It is needless to say that some of spherical particles have a particle diameter of less than 0.1 µm. Such minute spherical particles tend to hardly relax an internal stress generated in the anode active material layer 2 compared the spherical particles having the particle diameter within the foregoing range. Thus, to practically relax the internal stress in the anode active material layer 2, it is enough to focus attention only on the spherical particles having the particle diameter within the foregoing range.

The particle diameter (median size) of the spherical particle is more preferably from 0.5 µm to 35 µm both inclusive, since thereby the anode active material layer 2 is more hardly expanded and shrunk at the time of electrode reaction, and the insertion and extraction amount of the electrode reactant is hardly lowered. More specifically, if the particle diameter (median size) of the spherical particle is smaller than 0.5 µm, the spherical particle may hardly relax the internal stress in the anode active material layer 2. Meanwhile, if the particle diameter (median size) of the spherical particle is larger than 35 µm, the insertion and extraction amount of the electrode reactant may be lowered. In this case, if the anode is used for a secondary battery, the battery capacity may be lowered. The calculation method of the particle diameter of the spherical particle described above is similar to that of the case described for the number of spherical particles.

The circularity degree of the spherical particle is not particularly limited. However, if the circularity degree is excessively low, the spherical particle may hardly relax the internal stress in the anode active material layer 2. Thus, the circularity degree is preferably from 0.5 to 1 both inclusive. The calculation method of the circularity degree of the spherical particle described above is similar to that of the case described for the number of spherical particles. The circularity degree is calculated by dividing the boundary length of the spherical particle by the boundary length of a circle corresponding to the area of the spherical particle.

The shape of the spherical particle may be any shape, but specially, at least part of the spherical particles is preferably in the planular shape. Thereby, each anode active material is easily contacted with each other, and is easily layered on each other, and thus the number of contact points between each anode active material particle is increased. Thereby, electron conductivity in the anode active material layer 2 is improved. The foregoing "in the planular shape" means that the spherical particle is in the shape extending in the direction along the surface of the anode current collector 1, that is, is in the shape of an approximate oval that has a long axis in the direction along the surface of the anode current collector 1 and that has a short axis in the direction crossing the surface thereof. Such a planular shape is a characteristic shown, for example, in the case that the anode material is deposited by spraying method. In this case, if the fusion temperature of the anode material is increased, the anode active material particle tends to be easily in the planular shape.

It is possible that the spherical particle and the nonspherical particle are uniformly distributed or are nonuniformly distributed. Further, the positional relation (vertical relation and the like) between the spherical particle and the nonspherical particle is not particularly limited. As long as the anode active material layer 2 contains the spherical particle together with the nonspherical particle, the anode current collector 1 is hardly deformed.

The anode active material layer 2 is formed by, for example, spraying method. In this case, the anode active material layer 2 is formed by spraying the anode material in a fused state or a semi-fused state toward the anode current collector 1. Thereby, in the anode active material layer 2, as described above, the anode active material is crystalline, and is linked to the surface of the anode current collector 1.

The anode active material layer 2 may contain other anode material, as long as the anode active material layer 2 contains the material having silicon as an element as an anode material.

Examples of other anode materials include a material that is able to insert and extract the electrode reactant and that has at least one of metal elements and metalloid elements as an element (except for the material having silicon as an element), since such a material provides a high energy density. The material may be a simple substance, an alloy, or a compound of a metal element or a metalloid element, or may have one or more phases thereof at least in part.

Examples of the foregoing metal elements or the foregoing metalloid elements include a metal element or a metalloid element capable of forming an alloy with the electrode reactant. Specific examples thereof include at least one of the following elements. That is, examples thereof include magnesium, boron, aluminum, gallium, indium, germanium, tin, and lead (Pb). Further, examples thereof include bismuth, cadmium (Cd), silver, zinc, hafnium (Hf), zirconium, yttrium (Y), palladium (Pd), and platinum (Pt). Specially, tin is preferable. Tin has a high ability to insert and extract the electrode reactant, and thus provides a high energy density. Examples of materials having tin include a simple substance, an alloy, or a compound of tin, and a material having one or more phases thereof at least in part.

Examples of alloys of tin include an alloy having at least one of silicon, nickel, copper, iron, cobalt, manganese, zinc, indium, silver, titanium, germanium, bismuth, antimony, and chromium as an element other than tin. Examples of compounds of tin include a compound containing oxygen or carbon as an element other than tin. The compound of tin may have one or more of the elements described for the alloy of tin as an element other than tin. Examples of alloys or compounds of tin include $SnSiO_3$, LiSnO, and $Mg_2Sn$.

In particular, as the material having tin, for example, a material having a second element and a third element in addition to tin as a first element is preferable, since thereby the cycle characteristics are improved in the case where the anode is used for a secondary battery. The second element is at least one of the following elements. That is, examples thereof include cobalt, iron, magnesium, titanium, vanadium, chromium, manganese, nickel, copper, zinc, gallium, and zirconium. Further examples thereof include niobium, molybdenum, silver, indium, cerium (Ce), hafnium, tantalum, tungsten, bismuth, and silicon. The third element is at least one of boron, carbon, aluminum, and phosphorus.

Specially, an SnCoC-containing material that has tin, cobalt, and carbon in which the carbon content is from 9.9 wt % to 29.7 wt % both inclusive, and the content ratio of tin and cobalt (Co/(Sn+Co)) is from 20 wt % to 70 wt % both inclusive is preferable. In such a composition range, a high energy density is able to be obtained. In the SnCoC-containing material, at least part of carbon as an element is preferably bonded with a metal element or a metalloid element as other element. Cohesion or crystallization of tin or the like is thereby prevented.

The SnCoC-containing material has a phase containing tin, cobalt, and carbon. Such a phase is preferably a low crystalline phase or an amorphous phase. The phase is a reaction phase capable of being reacted with the electrode reactant, and such a reaction phase contributes to obtaining superior characteristics. The half-width of the diffraction peak obtained by X-ray diffraction of the phase is preferably 1 degree or more in diffraction angle 2θ of from 20 degree to 50 degree both inclusive in the case where CuKα ray is used as a specific X ray, and the insertion rate is 1 deg/min. Thereby, the electrode reactant is more smoothly inserted and extracted, and reactivity with the electrolyte or the like is decreased. In some cases, the SnCoC-containing material has a phase containing a simple substance of each element or part thereof, in addition to the low crystalline phase or the amorphous phase.

The SnCoC-containing material may further have other element according to needs. As other element, silicon, iron, nickel, chromium, indium, niobium, germanium, titanium, molybdenum, aluminum, phosphorus, gallium, bismuth or the like is preferable. The SnCoC-containing material may have two or more thereof.

In addition to the SnCoC-containing material, an SnCoFeC-containing material having tin, cobalt, iron, and carbon is also preferable. The composition of the SnCoFeC-containing material is able to be voluntarily set. For example, a composition in which the iron content is set small is as follows. That is, the carbon content is from 9.9 wt % to 29.7 wt % both inclusive, the iron content is from 0.3 wt % to 5.9 wt % both inclusive, and the content ratio of tin and cobalt (Co/(Sn+Co)) is from 30 wt % to 70 wt % both inclusive. Further, for example, a composition in which the iron content is set large is as follows. That is, the carbon content is from 11.9 wt % to 29.7 wt % both inclusive, the content ratio of tin, cobalt, and iron ((Co+Fe)/(Sn+Co+Fe)) is from 26.4 wt % to 48.5 wt % both inclusive, and the content ratio of cobalt and iron (Co/(Co+Fe)) is from 9.9 wt % to 79.5 wt % both inclusive. In such a composition range, a high energy density is obtained. The physical property and the like of the SnCoFeC-containing material are similar to those of the foregoing SnCoC-containing material.

Examples of other anode materials include a carbon material. In the carbon material, the crystal structure change associated with insertion and extraction of the electrode reactant is very little, and a high energy density is thereby obtained. In addition, the carbon material also functions as an electrical conductor. Examples of carbon materials include graphitizable carbon, non-graphitizable carbon in which the spacing of (002) plane is 0.37 nm or more, and graphite in which the spacing of (002) plane is 0.34 nm or less. More specifically, examples thereof include pyrolytic carbon, coke, glassy carbon fiber, an organic polymer compound fired body, activated carbon, and carbon black. Of the foregoing, the coke includes pitch coke, needle coke, and petroleum coke. The organic polymer compound fired body is obtained by firing and carbonizing a phenol resin, a furan resin or the like at appropriate temperature. The shape of the carbon material may be any of a fibrous shape, a spherical shape, a granular shape, and a scale-like shape.

Further, examples of other anode materials include a metal oxide and a polymer compound. The metal oxide is, for example, iron oxide, ruthenium oxide, molybdenum oxide or the like. The polymer compound is, for example, polyacetylene, polyaniline, polypyrrole or the like.

It is needless to say that the anode material may be a material other than the foregoing materials. Further, two or more of the foregoing anode materials may be used by mixture voluntarily.

The anode active material layer 2 preferably has a metal layer in at least part of gaps between anode active material particles. Thereby, since the anode active material particles are bonded with each other with the metal layer in between, the anode active material layer 2 is not broken or dropped from the anode current collector 1 even if the anode active material layer 2 is expanded and shrunk at the time of electrode reaction. In particular, if the anode material is a material having silicon with weak interatomic bond force as an element, dropping of the anode active material layer 2 is effectively prevented. Further, since the metal layer functions as a protective film, decomposition reaction resulting from contact with the anode active material particles activated at the time of electrode reaction is prevented. Examples of substances whose decomposition reaction is prevented include an electrode used together with an anode in the secondary battery.

As described above, it is enough that the metal layer is provided in at least part of the gaps. If the metal layer is provided in at least part of the gaps, the foregoing effect is obtained differently from a case that the metal layer is never provided. It is needless to say that the occupancy ratio of the metal layer in the gaps is preferably large as much as possible, since thereby the foregoing effect is further improved.

In this case, the metal layer preferably covers at least part of the surface of the anode active material particles. Thereby, the anode active material particles are easily bonded with the metal layer in between, and the metal layer easily functions as a protective film in a wider range. Thus, the coverage range of the metal layer is preferably wide as much as possible, since thereby higher effect is obtained. Specially, if the surface of the anode active material particles located in the uppermost surface layer of the anode active material layer 2 is covered with the metal layer, decomposition reaction of the electrolyte or the like is effectively prevented.

The metal layer preferably contains a material having a metal layer not reacted with the electrode reactant as an element in order to prevent inhibition of inserting of extracting the electrode reactant at the time of electrode reaction. Specifically, the metal layer preferably contains at least one of iron, cobalt, nickel, zinc, copper, and chromium, since such an element is hardly reacted with various electrode reactants such as lithium ions, and demonstrates superior binding function and protective function. However, the material composing the metal layer is not limited to a metal simple substance, but may be an alloy, a metal compound, or a mixture containing two or more thereof. It is needless to say that the metal layer may contain a metal element other than the foregoing iron or the like.

The thickness of the metal layer is not particularly limited, but in particular, is preferably from 1 nm to 30000 nm both inclusive, since thereby higher effect is obtained. More specifically, if the thickness is smaller than 1 nm, the metal layer amount is excessively small, and thus there is a possibility that sufficient binding function and sufficient protective function are not obtained. Meanwhile, if the thickness is larger than 30 nm, the metal layer amount is excessively large, and there is a possibility that insertion and extraction of the electrode reactant at the time of electrode reaction are prevented. The definition of the thickness of the metal layer (calculation procedure) will be described later (refer to FIGS. 6A and 6B).

The formation method of the metal layer is not particularly limited, but in particular, electrolytic plating method or nonelectrolytic plating method is preferable, and both the electrolytic plating method and the nonelectrolytic plating method may be used together, since thereby a plating film is easily grown to enter into gaps between the anode active material particles, and to cover the surface of the anode active material particles.

As long as the metal layer is finally formed in the gaps between the anode active material particles, the formation procedure of the anode active material layer 2 containing the metal layer is not particularly limited.

For example, it is possible that after the metal layer is previously formed to cover the surface of the anode material composed of a plurality of particles by using nonelectrolytic plating method, electrolytic plating method or the like, the anode material is deposited by spraying method. In this case, when the anode material is sprayed in a fused state or a semi-fused state, the metal layer in the similar state is sprayed together therewith. Thus, the metal layer is formed in gaps between the anode active material particles. Such a formation method is effective, for example, in the case where the thickness of the metal layer is desirably large relatively, since if the thickness of the metal layer previously formed is increased, the thickness of the metal layer formed after spraying by spraying method is increased. If the metal layer is formed on the surface of the anode material by using nonelectrolytic plating method or the like, for example, in order to grow the plating film, the plating film is preferably formed by dipping the anode material into a palladium chloride solution and filtering the resultant.

Otherwise, it is possible that after the plurality of anode active material particles are formed by using spraying method or the like, the metal layer is subsequently formed by using electrolytic plating method or the like. In this case, the plating film is mainly grown along the surface of the anode active material particles, the metal layer is formed in gaps between the anode active material particles. In the case where the metal layer is subsequently formed, it is possible that a step of forming the anode active material particles and then forming the metal layer may be repeated several times. Such a formation method is effective, for example, in the case where the thickness of the anode active material particles is desirably large relatively, since the anode active material particles and the metal layer are repeatedly formed, and a sufficient amount of metal layers is formed even if the total thickness of the anode active material particles is large.

A description will be given of a detailed structure example of the anode.

FIGS. 2A to 6B illustrate an enlarged part of the anode illustrated in FIG. 1. FIGS. 2A, 3A, 5A, and 6A illustrate an SEM photograph (secondary electron image) of a cross section, and FIGS. 2B, 3B, 5B, and 6B illustrate a schematic drawing of the SEM image illustrated in FIGS. 2A, 3A, 5A, and 6A. FIG. 4 illustrates an SEM photograph of a surface. FIGS. 2A to 4 illustrate a case that the anode active material is the silicon simple substance. FIGS. 5A to 6B illustrate a case that the anode active material is the material having silicon and the metal element.

Figure 5A:
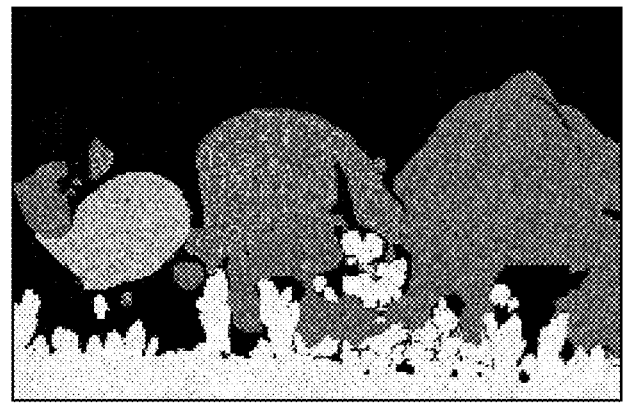
FIGS. 5A and 5B are an SEM photograph illustrating still another cross sectional structure of the anode illustrated in FIG. 1 and a schematic drawing thereof.
Figure 5B:
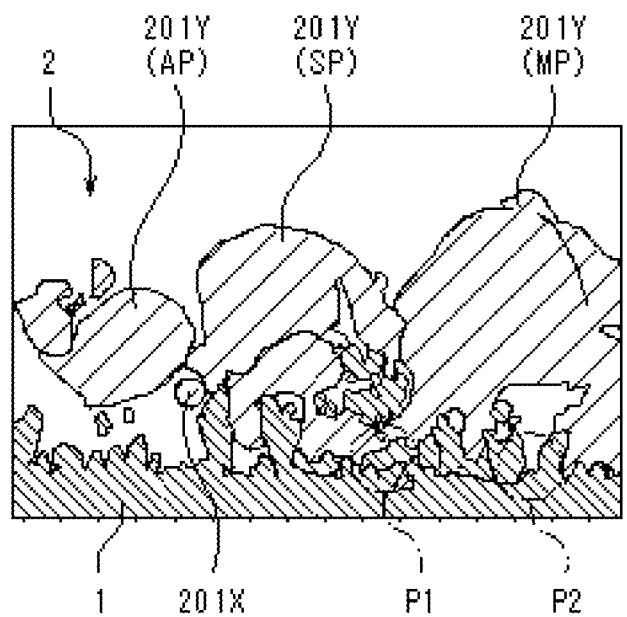

The anode active material layer 2 is formed by, for example, depositing the anode material on the surface of the anode current collector 1 by spraying method. The anode active material layer 2 contains a plurality of particulate anode active materials (anode active material particles 201). As illustrated in FIGS. 2A to 3B, the anode active material particles 201 may have a multilayer structure layered in the thickness direction of the anode active material layer 2. Otherwise, as illustrated in FIGS. 5A and 5B, the anode active material particles 201 may have a single layer structure arranged along the surface of the anode current collector 1.

For example, as illustrated in FIGS. 2A to 3B, the anode active material layer 2 has a portion where the anode active material particles 201 are contacted with the anode current collector 1 (contact portion P1) and a portion where the anode active material particles 201 are not contacted with the anode current collector 1 (non-contact portion P2). Further, the anode active material layer 2 has therein a plurality of air gaps 2K.

As illustrated in FIGS. 2A to 6B, the plurality of anode active material particles 201 contain a spherical particle 201x and a nonspherical particle 201Y. In the case where the anode active material layer 2 is viewed from the surface, the spherical particle 201X is viewed as a particle having an approximately circle outline or an approximately oval outline, while the nonspherical particle 201Y is viewed as a particle having a polygonal outline or a platy outline. Thus, in an SEM image, the spherical particle 201X is able to be clearly distinguished from the nonspherical particle 201Y.

Figure 3A:
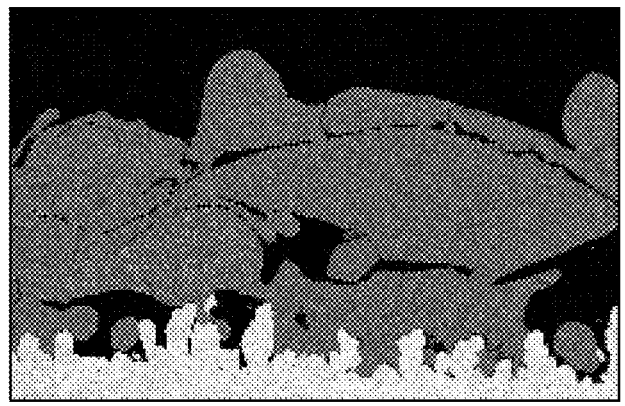
FIGS. 3A and 3B are an SEM photograph illustrating another cross sectional structure of the anode illustrated in FIG. 1 and a schematic drawing thereof.
Figure 3B:
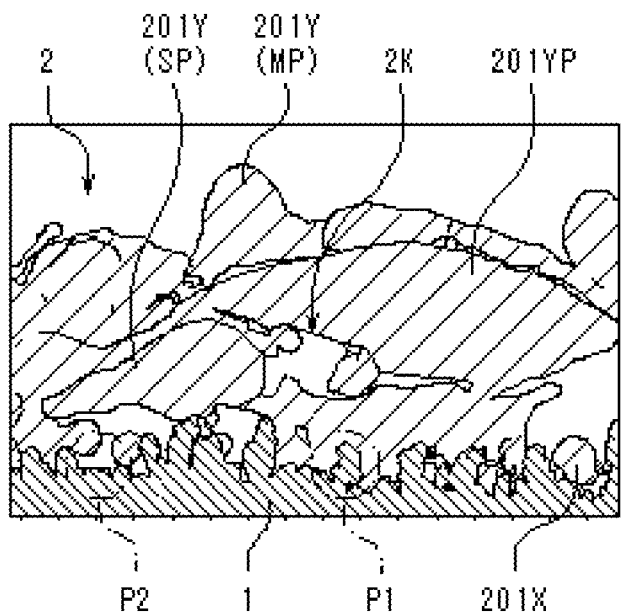

At least part of the nonspherical particle 201Y is, for example, in the planular shape. That is, as illustrated in FIGS. 3A and 3B, the plurality of nonspherical particles 201Y contain a planular particle 201YP. The planular particle 201YP is contacted with the adjacent anode active material particle 201 by being layered thereon.

In the case where the anode active material particles 201 have silicon and the metal element, for example, part of the anode active material particles 201 has silicon and the metal element. In this case, a state of the anode active material particles 201 may be alloyed state (AP), or compound (phase separation) state (SP). The anode active material particles 201 that has only silicon but does not have the metal element is in a state of monadelphos state (MP).

These three crystal states (MP, AP, and SP) are clearly illustrated in FIGS. 5A and 5B. That is, the anode active material particles 201 in the monadelphos state (MP) are observed as a uniform gray region. The anode active material particles 201 in the alloyed state (AP) are observed as a uniform white region. The anode active material particles 201 in the phase separation state (SP) are observed as a region in which a gray portion and a white portion are mixed.

Figure 6A:
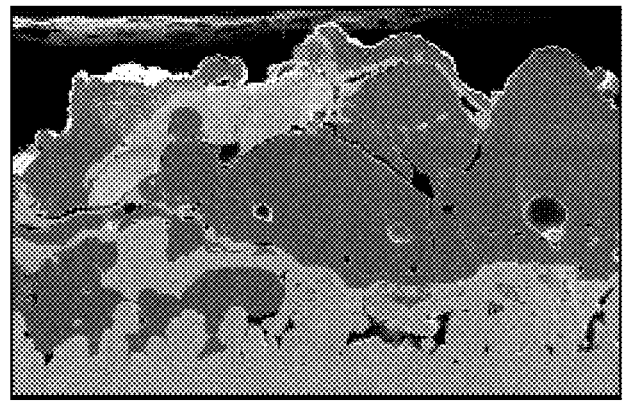
FIGS. 6A and 6B are an SEM photograph illustrating still another cross sectional structure of the anode illustrated in FIG. 1 and a schematic drawing thereof.
Figure 6B:
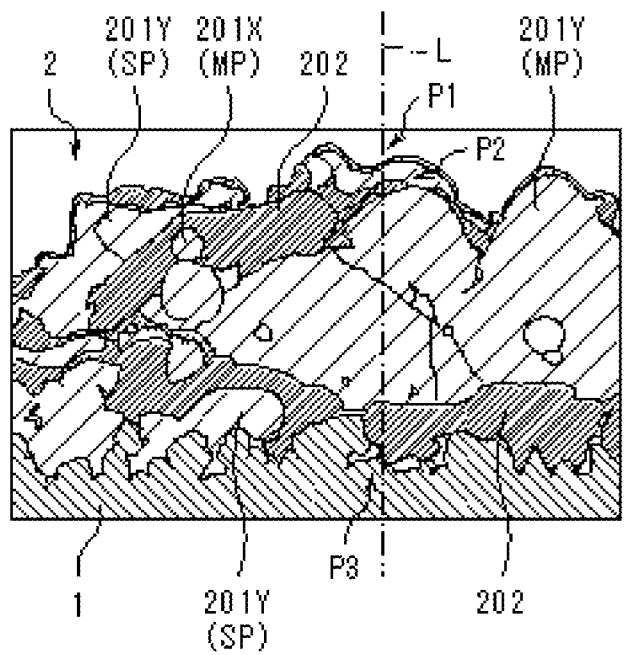

The anode active material layer 2 has, for example, as illustrated in FIGS. 6A and 6B, a metal layer 202 in gaps between the anode active material particles 201. The metal layer 202 exists in the foregoing gaps, for example, by being provided to cover the surface of the anode active material particles 201. In this case, the metal layer 202 is preferably provided to cover the surface of the anode active material particles 201 located in the uppermost surface layer of the anode active material layer 2. At least part of the metal layer 202 may be an alloy containing silicon.

The definition of the thickness of the metal layer 202 (calculation procedure) is as follows. First, an SEM photograph (FIG. 6A) of a cross section of the anode active material layer 2 containing the plurality of anode active material particles 202 and the metal layer 202 is obtained. Subsequently, a vertical line L (line perpendicular to the surface of the anode current collector 1) is drawn in a given position in the SEM photograph. After that, the distance (thickness) of the metal layer 202 crossing the vertical line L is measured. In the case illustrated in FIG. 6B, the metal layer 202 crosses the vertical line L at three points (positions P1 to P3). Thus, after the thickness of the metal layer 202 in each point is measured, the sum thereof is obtained. Subsequently, while a location where the vertical line L is drawn is changed, the foregoing operation to obtain the thickness (sum) of the metal layer 202 is repeated 50 times. In this case, the location where the vertical line L is drawn may be changed voluntarily (at random). However, to regularly determine the location, for example, the vertical line L is preferably drawn at intervals of 5 μm. Finally, the average value of the thicknesses of the metal layer 202 obtained 50 times is calculated.

The anode is manufactured, for example, by the following procedure.

First, the anode current collector 1 made of a roughened electrolytic copper foil or the like is prepared. Subsequently, as an anode material, a material having silicon as an element as an anode material is deposited on the surface of the anode current collector 1 by using spraying method to form the anode active material layer 2. In this case, the anode material in a fused state or a semi-fused state is sprayed, and thereby the anode material is deposited on the surface of the anode current collector 1. Thus, the anode active material layer 2 is formed to contain the plurality of crystalline anode active material particles (the spherical particles and the nonspherical particles). Accordingly, the anode is completed.

In the case where the anode active material layer 2 is formed by using spraying method, for example, the number of spherical particles, the particle diameter (median size) thereof, and the circularity degree thereof are able to be changed by adjusting the particle diameter, the material quality, the input amount, and the fusion temperature of the anode material, the amount of the material supply gas, the cooling temperature of the substrate and the like.

According to the anode, the anode active material layer 2 contains the plurality of crystalline anode active material particles having silicon as element. The plurality of anode active material particles contain the spherical particle and the nonspherical particle. In this case, the physical property of the anode active material particles is hardly deteriorated with age, compared to in a case that the anode active material particles are amorphous. Further, compared to in a case that the anode active material particles do not contain the spherical particle, the anode active material layer 2 becomes hardly expanded and shrunk at the time of electrode reaction, and thus the anode current collector 1 becomes hardly deformed. Therefore, the anode is able to contribute to improving performance of electrochemical devices. More specifically, in the case where the anode is used for a secondary battery, the anode is able to contribute to improving the cycle characteristics and the swollenness characteristics.

In particular, if the half-width (2θ) of the diffraction peak in (111) crystal plane of the anode active material particles obtained by X-ray diffraction is 20 degree or less, or the crystallite size originated in the same crystal plane is 10 nm or more, higher effect is able to be obtained. Further, if the median size of the spherical particle is from 0.5 μm to 35 μm both inclusive, or if the circularity degree of the spherical particle is from 0.5 to 1 both inclusive, higher effect is able to be obtained.

In addition, if the anode active material particles have oxygen and the oxygen content in the anode active material particles is from 1.5 atomic % to 40 atomic % both inclusive, or if the anode active material particles have the metal element such as iron, higher effect is able to be obtained. Similarly, if the anode active material layer 2 has the high oxygen-containing region and the low oxygen-containing region, higher effect is able to be obtained.

Further, if the surface of the anode current collector 1 is roughened, the contact characteristics between the anode current collector 1 and the anode active material layer 2 are able to be improved. In this case, if the ten point height of roughness profile Rz of the surface of the anode current collector 1 is 1.5 μm or more, or preferably from 3 μm to 30 μm both inclusive, higher effect is able to be obtained.

Further, if the anode active material layer 2 has the metal layer 202 in gaps between the anode active material particles 202, the cycle characteristics are able to be further improved. In this case, if the metal layer 202 covers the surface of the anode active material particles 201, higher effect is able to be obtained.

2. Electrochemical Device (Secondary Battery) Using Anode

Next, a description will be given of usage examples of the foregoing anode. In the description, a secondary battery will be taken as an example of electrochemical devices. The foregoing anode is used as follows.

2-1. First Secondary Battery (Square Type)

Figure 7:
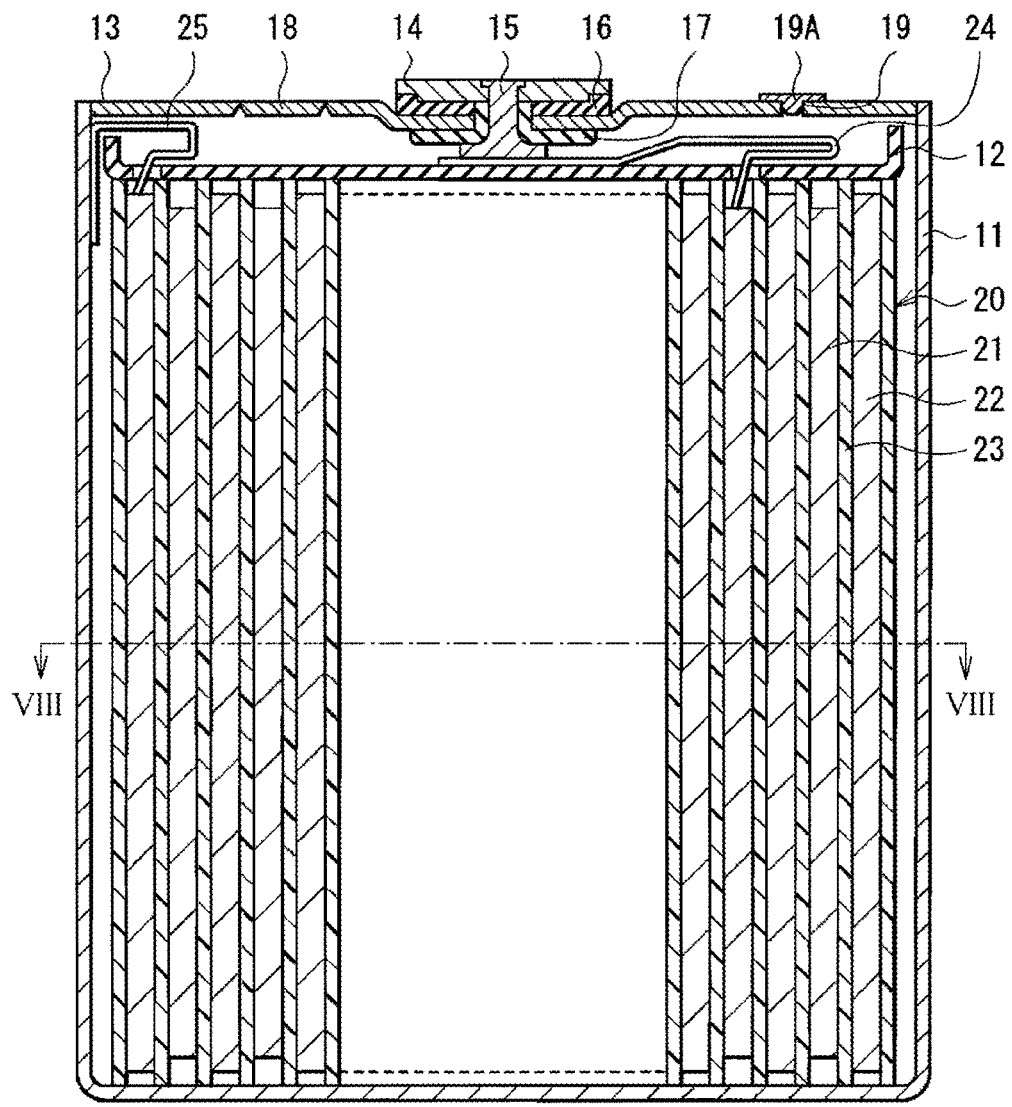
FIG. 7 is a cross sectional view illustrating a structure of a first secondary battery including the anode according to the embodiment of the invention.
Figure 8:
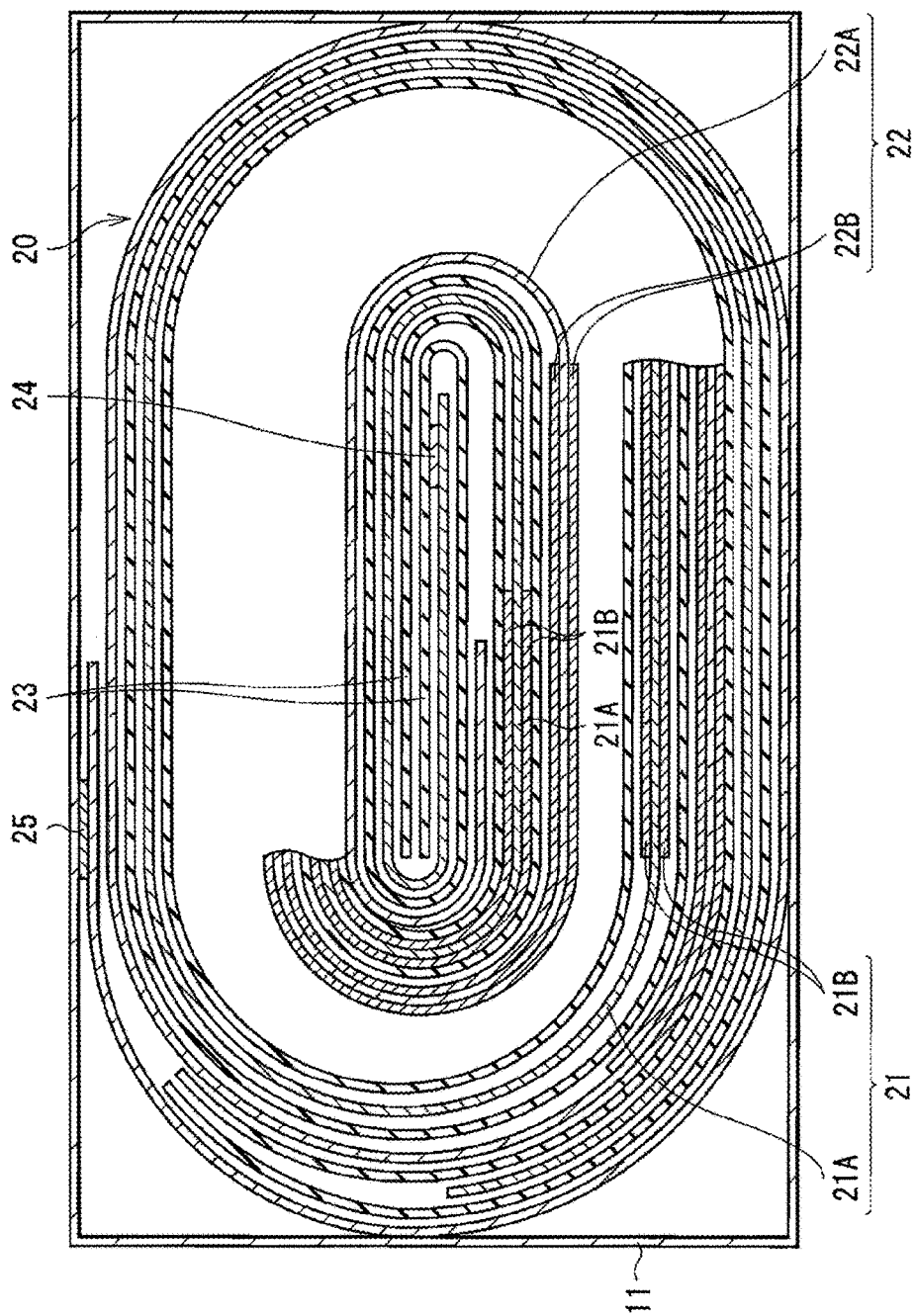
FIG. 8 is a cross sectional view taken along line VIII-VIII of the first secondary battery illustrated in FIG. 7.

FIG. 7 and FIG. 8 illustrate cross sectional structures of a first secondary battery. FIG. 8 illustrates a cross section taken along line VIII-VIII illustrated in FIG. 7. The secondary battery herein described is, for example, a lithium ion secondary battery in which the capacity of an anode 22 is expressed based on insertion and extraction of lithium ions as an electrode reactant.

Whole Structure of Secondary Battery

In the secondary battery, a battery element 20 having a planular spirally wound structure is contained in a battery can 11 mainly.

The battery can 11 is, for example, a square package member. As illustrated in FIG. 8, the square package member has a shape with the cross section in the longitudinal direction of a rectangle or an approximate rectangle (including curved lines in part). The square package member structures not only a square type battery in the shape of a rectangle, but also a square type battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 8 illustrates a case that the battery can 11 has a rectangular cross sectional shape. The battery structure including the foregoing battery can 11 is a so-called square structure.

The battery can 11 is made of, for example, iron, aluminum, an alloy thereof or the like. In some cases, the battery can 11 has a function as an electrode terminal. Specially, to prevent the secondary battery from being swollen by using the rigidity (hardly deformable characteristics) of the battery can 11 at the time of charge and discharge, rigid iron is more preferable than aluminum. In the case where the battery can 11 is made of iron, the battery can 11 may be plated by, for example, nickel or the like.

Further, the battery can 11 has a hollow structure in which one end of the battery can 11 is opened and the other end of the battery can 11 is closed. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and may have a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. Further, in the approximate center of the battery cover 13, a through-hole is provided. A cathode pin 15 is inserted in the through-hole so that the cathode pin is electrically connected to the terminal plate 14 and is electrically insulated from the battery cover 13 with a gasket 17 in between. The gasket 17 is made of, for example, an insulating material, and the surface thereof is coated with, for example, asphalt.

In the vicinity of the rim of the battery cover 13, a cleavage valve 18 and an injection hole 19 are provided. The cleavage valve 18 is electrically connected to the battery cover 13. In the case where the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless steel ball or the like.

The battery element 20 is formed by layering a cathode 21 and the anode 22 with a separator 23 in between and spirally winding the resultant laminated body. The battery element 20 is in the planular shape according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

Cathode

In the cathode 21, for example, a cathode active material layer 21B is provided on both faces of a cathode current collector 21A having a pair of faces. However, the cathode active material layer 21B may be provided only on a single face of the cathode current collector 21A.

The cathode current collector 21A is made of, for example, aluminum, nickel, stainless or the like.

The cathode active material layer 21B contains, as a cathode active material, one or more cathode materials capable of inserting and extracting lithium ions. According to needs, the cathode active material layer 21B may contain other material such as a cathode binder and a cathode electrical conductor.

As the cathode material, a lithium-containing compound is preferable, since thereby a high energy density is able to be obtained. Examples of lithium-containing compounds include a composite oxide having lithium and a transition metal element as an element and a phosphate compound containing lithium and a transition metal element as an element. Specially, a compound containing at least one of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

Examples of composite oxides having lithium and a transition metal element include a lithium-cobalt composite oxide ($Li_xCoO_2$), a lithium-nickel composite oxide ($Li_xNiO_2$), and a lithium-nickel composite oxide expressed by Formula 12. Examples of phosphate compounds having lithium and a transition metal element include lithium-iron phosphate compound ($LiFePO_4$) and a lithium-iron-manganese phosphate compound ($LiFe_{1-Q}Mn_uPO_4(u<1)$), since thereby a high battery capacity is obtained and superior cycle characteristics are obtained.

$$LiNi_{1-x}M_xO_2 \qquad \text{Formula 12}$$

In the formula, M is at least one of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium. x is in the range of $0.005<x<0.5$.

In addition, examples of cathode materials include an oxide, a disulfide, a chalcogenide, and a conductive polymer. Examples of oxide include titanium oxide, vanadium oxide, and manganese dioxide. Examples of disulfide include titanium disulfide and molybdenum sulfide. Examples of chalcogenide include niobium selenide. Examples of conductive polymer include sulfur, polyaniline, and polythiophene.

It is needless to say that the cathode material may be a material other than the foregoing compounds. Further, two or more of the foregoing cathode materials may be used by mixture voluntarily.

Examples of cathode binders include a synthetic rubber such as styrene butadiene rubber, fluorinated rubber, and ethylene propylene diene; and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. Such a carbon material may be used singly, or a plurality thereof may be used by mixture. The cathode electrical conductor may be a metal material, a conductive polymer or the like as long as the material has the electric conductivity.

Anode

In the anode 22, for example, an anode active material layer 22B is provided on both faces of an anode current collector 22A having a pair of faces. Structures of the anode current collector 22A and the anode active material layer 22B are similar to those of the anode current collector 1 and the anode active material layer 2 in the foregoing anode. The anode active material layer 22B contains the spherical particle and the nonspherical particle as the plurality of anode active material particles. In the anode 22, the capacity chargeable in the anode material capable of inserting and extracting lithium ions is preferably larger than the discharge capacity of the cathode 21.

Figure 9:
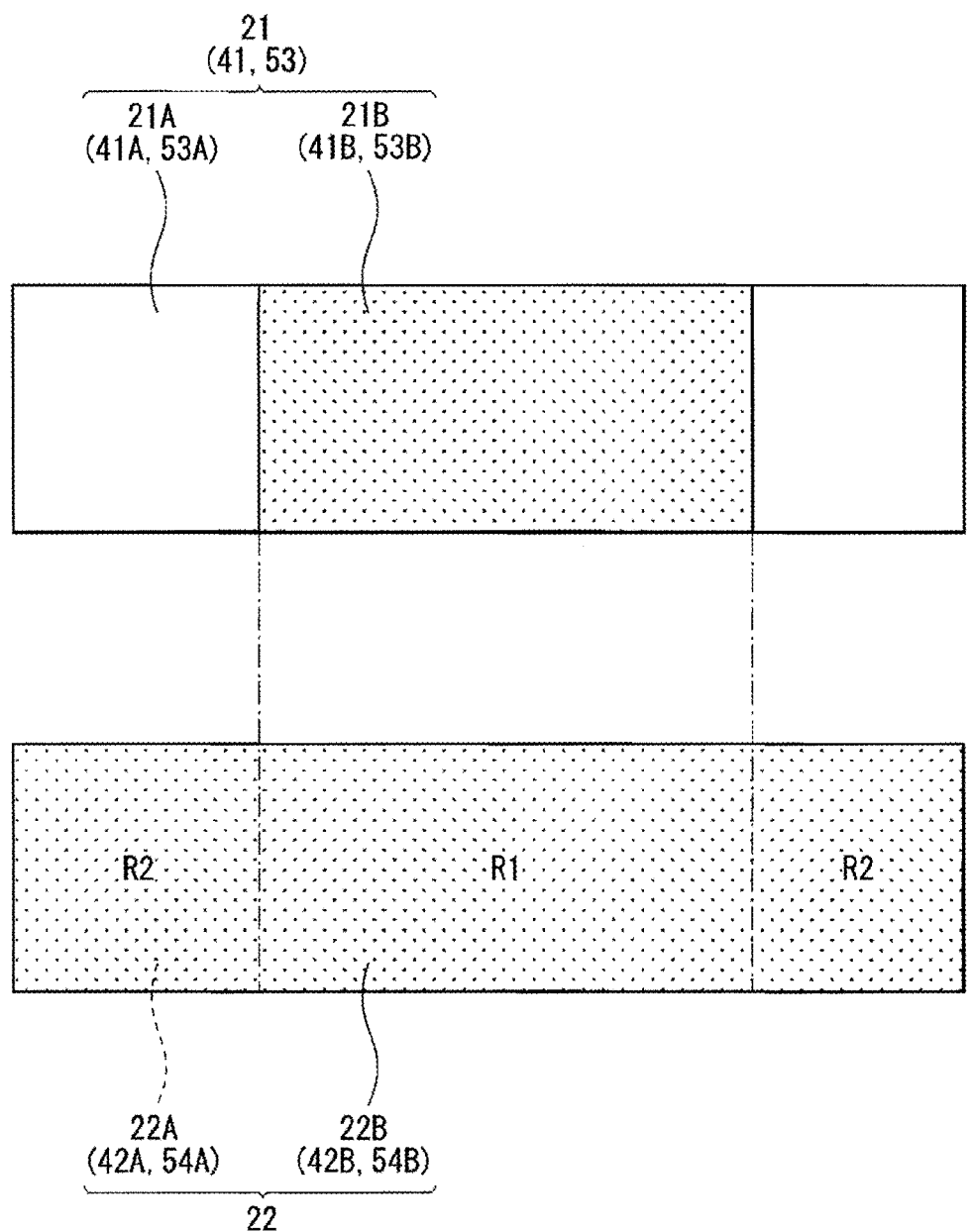
FIG. 9 is a plan view illustrating structures of the cathode and the anode illustrated in FIG. 8.

FIG. 9 illustrates a planar structure of the cathode 21 and the anode 22 illustrated in FIG. 8. In FIG. 9, the formation range of the cathode active material layer 21B in the cathode 21 is shaded, and the formation range of the anode active material layer 22B in the anode 22 is shaded.

In the secondary battery, for example, while the cathode active material layer 21B is provided on part of the surface of the cathode current collector 21A (for example, in the central region in the longitudinal direction), the anode active material layer 22B is provided on the whole surface of the anode current collector 22A. That is, the anode active material layer 22B is provided in a region opposed to the cathode active material layer 21B (opposed region R1) and in a region not opposed to the cathode active material layer 21B (non-opposed region R2) in the anode current collector 22A. In this case, out of the anode active material layer 22B, the portion provided in the opposed region R1 contributes to charge and discharge reaction, and the portion provided in the non-opposed region R2 hardly contributes to charge and discharge reaction.

As described above, the anode active material layer 22B has the spherical particle and the nonspherical particle as the plurality of anode active material particles. However, if the anode active material layer 22B is expanded and shrunk at the time of charge and discharge, in consequence thereof, the spherical particle and the nonspherical particle may be deformed and destroyed. In this case, the non-opposed region R2 is not affected by charge and discharge reaction, and the state immediately after forming the anode active material layer 22B remains without change. Thus, in the case where the presence, the particle diameter and the like of the spherical particle are examined, the anode active material layer 22B in the non-opposed region R2 is preferably examined, since thereby the presence and the like of the spherical particle are able to be examined in a well reproducible fashion without depending on the charge and discharge history.

Separator

The separator 23 separates the cathode 21 from the anode 22, and passes lithium ions while preventing short circuit resulting from contact of both electrodes. The separator 23 is made of, for example, a porous film composed of a synthetic resin such as polytetrafluoroethylene, polypropylene, and polyethylene, a ceramics porous film or the like. The separator 23 may be a laminated body composed of two or more porous films.

Electrolyte

An electrolytic solution as a liquid electrolyte is impregnated in the separator 23. The electrolytic solution contains a solvent and an electrolyte salt dissolved therein.

The solvent contains, for example, one or more nonaqueous solvents such as an organic solvent. The solvents described below may be combined voluntarily.

Examples of nonaqueous solvents include the following. That is, examples thereof include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide.

Specially, at least one of ethylene carbonate, propylene carbonate, dimethyl carbonate, diethyl carbonate, and ethyl methyl carbonate is preferable. In this case, a combination of a high viscosity (high dielectric constant) solvent (for example, specific inductive $\epsilon \geq 30$) such as ethylene carbonate and propylene carbonate and a low viscosity solvent (for example, viscosity $\leq 1$ mPa·s) such as dimethyl carbonate, ethylmethyl carbonate, and diethyl carbonate is more preferable. Thereby, dissociation property of the electrolyte salt and ion mobility are improved.

In particular, the solvent preferably contains at least one of a chain ester carbonate having halogen as an element shown in Formula 1 and a cyclic ester carbonate having halogen as an element shown in Formula 2. Thereby, a stable protective film is formed on the surface of the anode 22 at the time of charge and discharge, and decomposition of the electrolytic solution is prevented. Contents thereof in the solvent (single use or mixture use) is not particularly limited, but, for example, is preferably from 0.01 wt % to 50 wt % both inclusive. R11 to R16 in Formula 1 may be identical or different. The same is applied to R17 to R20 in Formula 2.

Formula 1

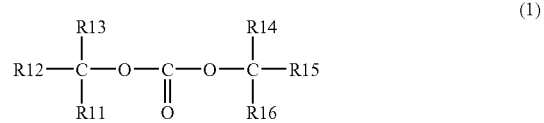

(1)

In the formula, R11 to R16 are a hydrogen group, a halogen group, an alkyl group, or an alkyl halide group. At least one of R11 to R16 is the halogen group or the alkyl halide group.

Formula 2

(2)

In the formula, R17 to R20 are a hydrogen group, a halogen group, an alkyl group, or an alkyl halide group. At least one of R17 to R20 is the halogen group or the alkyl halide group.

The halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and stable protective film is formed. Accordingly, decomposition reaction of the electrolytic solution is more prevented.

Examples of the chain ester carbonate having halogen shown in Formula 1 include fluoromethyl methyl carbonate, bis(fluoromethyl) carbonate, and difluoromethyl methyl carbonate. One thereof may be used singly, or a plurality thereof may be used by mixture.

Examples of the cyclic ester carbonate having halogen shown in Formula 2 include the compounds shown in the following Formulas 2-1 to 2-21. One thereof may be used singly, or a plurality thereof may be used by mixture.

Formula 2-1 to 2-12

(2-1)

(2-2)

(2-3)

(2-4)

(2-5)

(2-6)

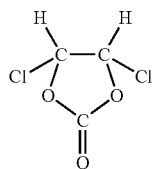

(2-7)

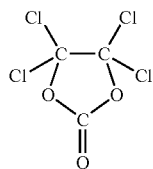

(2-8)

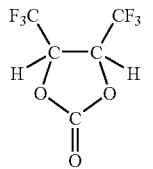

(2-9)

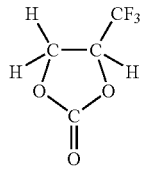

(2-10)

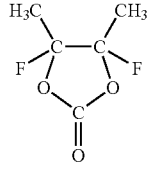

(2-11)

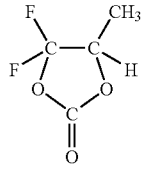

(2-12)

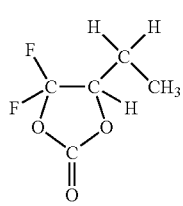

Formula 2-13 to 2-21

(2-13)

-continued

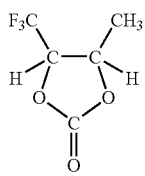 (2-14)

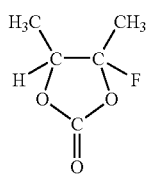 (2-15)

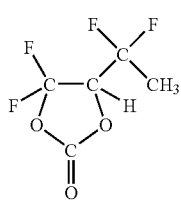 (2-16)

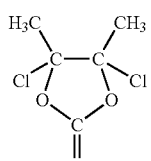 (2-17)

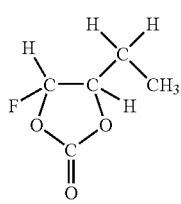 (2-18)

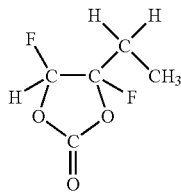 (2-19)

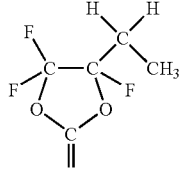 (2-20)

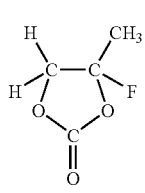 (2-21)

Specially, 4-fluoro-1,3-dioxolane-2-one shown in Formula 2-1 or 4,5-difluoro-1,3-dioxolane-2-one shown in Formula 2-3 is preferable, and the latter is more preferable. In particular, as the latter compound, a trans isomer is more preferable than a sis isomer, since the trans isomer is easily available and provides high effect.

The solvent preferably contains at least one of cyclic ester carbonates having an unsaturated carbon bond shown in Formula 3 to Formula 5. Thereby, a stable protective film is formed on the surface of the anode 22 at the time of charge and discharge, and thus decomposition of the electrolytic solution is prevented. Contents thereof in the solvent (single use or mixture use) is not particularly limited, but, for example, is preferably from 0.01 wt % to 10 wt % both inclusive.

Formula 3

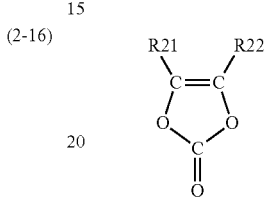 (3)

In the formula, R21 and R22 are a hydrogen group or an alkyl group.

Formula 4

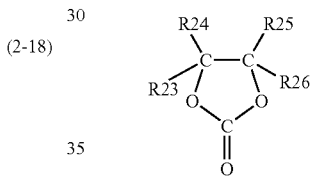 (4)

In the formula, R23 to R26 are a hydrogen group, an alkyl group, a vinyl group, or an aryl group. At least one of R23 to R26 is the vinyl group or the aryl group.

Formula 5

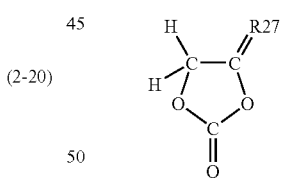 (5)

In the formula, R27 is an alkylene group.

The cyclic ester carbonate having an unsaturated carbon bond shown in Formula 3 is a vinylene carbonate compound. Examples of vinylene carbonate compounds include the following compounds. That is, examples thereof include vinylene carbonate (1,3-dioxole-2-one), methylvinylene carbonate (4-methyl-1,3-dioxole-2-one), and ethylvinylene carbonate (4-ethyl-1,3-dioxole-2-one). Further, examples thereof include 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The cyclic ester carbonate having an unsaturated carbon bond shown in Formula 4 is a vinylethylene carbonate compound. Examples of vinylethylene carbonate compounds include the following compounds. That is, examples thereof include vinylethylene carbonate (4-vinyl-1,3-dioxolane-2-one), 4-methyl-4-vinyl-1,3-dioxolane-2-one, and 4-ethyl-4-vinyl-1,3-dioxolane-2-one. Further examples thereof include 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R23 to R26 may be the vinyl group or the aryl group. Otherwise, it is possible that some of R23 to R26 are the vinyl group, and the others thereof are the aryl group.

The cyclic ester carbonate having an unsaturated carbon bond shown in Formula 5 is a methylene ethylene carbonate compound. Examples of methylene ethylene carbonate compounds include the following compounds. That is, examples thereof include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate compound may have one methylene group (compound shown in Formula 5), or have two methylene groups.

The cyclic ester carbonate having an unsaturated carbon bond may be catechol carbonate having a benzene ring or the like, in addition to the compounds shown in Formula 3 to Formula 5.

Further, the solvent preferably contains sultone (cyclic sulfonic ester), since thereby chemical stability of the electrolytic solution is further improved. As the sultone, for example, propane sultone, propene sultone or the like is cited. Such sultone may be used singly, or a plurality thereof may be used by mixture. The sultone content in the solvent is, for example, from 0.5 wt % to 5 wt % both inclusive.

Further, the solvent preferably contains an acid anhydride since thereby chemical stability of the electrolytic solution is thereby further improved. Examples of acid anhydrides include carboxylic anhydride, disulfonic anhydride, and an anhydride of carboxylic acid and sulfonic acid. Examples of carboxylic anhydrides include succinic anhydride, glutaric anhydride, and maleic anhydride. Examples of disulfonic anhydrides include ethane disulfonic anhydride and propane disulfonic anhydride. Examples of anhydrides of carboxylic acid and sulfonic acid include sulfobenzoic anhydride, sulfopropionic anhydride, and sulfobutyric anhydride. The anhydrides may be used singly, or a plurality thereof may be used by mixture. The content of the acid anhydride in the solvent is, for example, from 0.5 wt % to 5 wt % both inclusive.

The electrolyte salt contains, for example, one or more light metal salts such as a lithium salt. The electrolyte salts described below may be combined voluntarily.

Examples of lithium salts include the following. That is, examples thereof include lithium hexafluorophosphate, lithium tetrafluoroborate, lithium perchlorate, and lithium hexafluoroarsenate. Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride (LiCl), and lithium bromide (LiBr).

Specially, at least one of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one of the compounds shown in Formula 6 to Formula 8, since hereby higher effect is obtained. R31 and R33 in Formula 6 may be identical or different. The same is applied to R41 to R43 in Formula 7 and R51 and R52 in Formula 8.

Formula 6

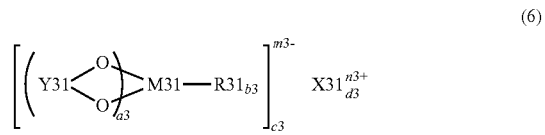

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O=)C—R32-C(=O)—, —(O=)C—C(R33)$_2$—, or —(O=)C—C(=O)—. R32 is an alkylene group, an alkylene halide group, an arylene group, or an arylene halide group. R33 is an alkyl group, an alkyl halide group, an aryl group, or an aryl halide group. a3 is one of integer numbers 1 to 4. b3 is 0, 2, or 4. c3, d3, m3, and n3 are one of integer numbers 1 to 3.

Formula 7

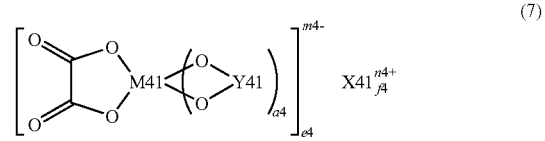

In the formula, X41 is a Group 1 element or a Group 2 element in the long period periodic table. M41 is a transition metal element, a Group 13 element, a Group 14 element, or a Group 15 element in the long period periodic table. Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—. R41 and R43 are a hydrogen group, an alkyl group, a halogen group, or an alkyl halide group. At least one of R41 and R43 is respectively the halogen group or the alkyl halide group. R42 is a hydrogen group, an alkyl group, a halogen group, or an alkyl halide group. a4, e4, and n4 are an integer number of 1 or 2. b4 and d4 are one of integer numbers 1 to 4. c4 is one of integer numbers 0 to 4. f4 and m4 are one of integer numbers 1 to 3.

Formula 8

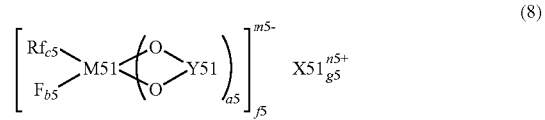

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —(O═)C—(C(R51)$_2$)$_{d5}$-C(═O)—, —(R52)$_2$C—(C(R51)$_2$)$_{d5}$-C(═O)—, —(R52)$_2$C—(C(R51)$_2$)$_{d5}$-C(R52)$_2$-, —(R52)$_2$C—(C(R51)$_2$)$_{d5}$-S(═O)$_2$—, —(O═)$_2$S—(C(R51)$_2$)$_{e5}$-S(═O)$_2$—, or —(O═)C—(C(R51)$_2$)$_{e5}$-S(═O)$_2$—. R51 is a hydrogen group, an alkyl group, a halogen group, or an alkyl halide group. R52 is a hydrogen group, an alkyl group, a halogen group, or an alkyl halide group, and at least one thereof is the halogen group or the alkyl halide group. a5, f5, and n5 are 1 or 2. b5, c5, and e5 are one of integer numbers 1 to 4. d5 is one of integer numbers 0 to 4. g5 and m5 are one of integer numbers 1 to 3.

Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of the compound shown in Formula 6 include the compounds shown in Formula 6-1 to Formula 6-6. Examples of the compound shown in Formula 7 include the compounds shown in Formula 7-1 to Formula 7-8. Examples of the compound shown in Formula 8 include the compound shown in Formula 8-1. It is needless to say that the compound is not limited to the foregoing compounds, and the compound may be other compound as long as such a compound has the structure shown in Formula 6 to Formula 8.

Formula 6-1 to 6-6

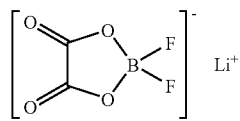
(6-1)

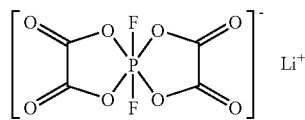
(6-2)

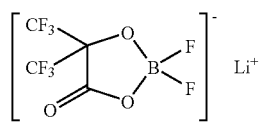
(6-3)

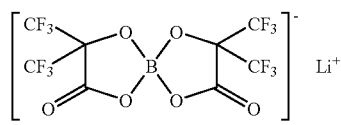
(6-4)

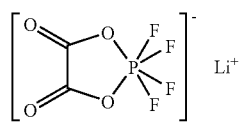
(6-5)

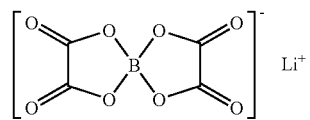
(6-6)

Formula 7-1 to 7-8

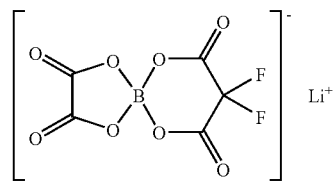
(7-1)

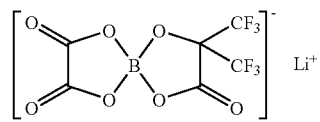
(7-2)

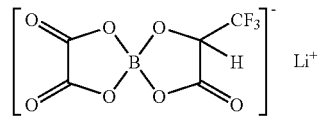
(7-3)

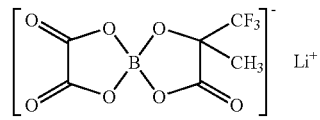
(7-4)

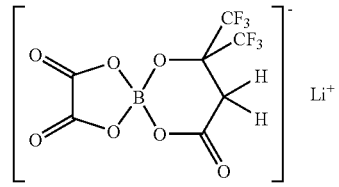
(7-5)

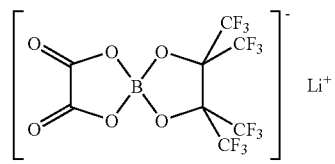
(7-6)

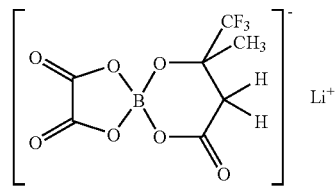
(7-7)

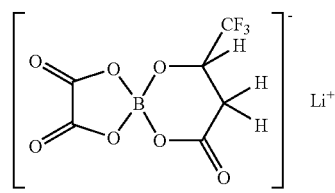
(7-8)

Formula 8-1

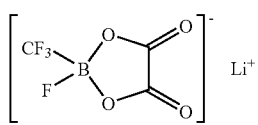
(8-1)

Further, the electrolyte salt may contain at least one of the compounds shown in Formula 9 to Formula 11, since thereby higher effect is obtained. m and n in Formula 9 may be identical or different. The same is applied to p, q, and r in Formula 11.

Formula 9

$$LiN(C_mF_{2m+1}SO_2)(C_nF_{2n+1}SO_2) \quad (9)$$

In the formula, m and n are an integer number of 1 or more.

Formula 10

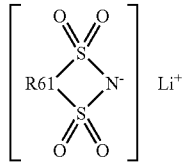
(10)

In the formula, R61 is a straight chain/branched perfluoro alkylene group with the carbon number from 2 to 4 both inclusive.

Formula 11

$$LiC(C_pF_{2p+1}SO_2)(C_qF_{2q+1}SO_2)(C_rF_{2r+1}SO_2) \quad (11)$$

In the formula, p, q, and r are an integer number of 1 or more.

Examples of the chain imide compound shown in Formula 9 include the following compounds. That is, examples thereof include lithium bis(trifluoromethanesulfonyl)imide (LiN(CF$_3$SO$_2$)$_2$), and lithium bis(pentafluoroethanesulfonyl)imide (LiN(C$_2$F$_5$SO$_2$)$_2$). Further examples thereof include lithium (trifluoromethanesulfonyl)(pentafluoroethanesulfonyl)imide (LiN(CF$_3$SO$_2$)(C$_2$F$_5$SO$_2$)). Further examples thereof include lithium(trifluoromethanesulfonyl)(heptafluoropropanesulfonyl)imide (LiN(CF$_3$SO$_2$)(C$_3$F$_7$SO$_2$)). Further examples thereof include lithium(trifluoromethanesulfonyl)(nonafluorobutanesulfonyl)imide (LiN(CF$_3$SO$_2$)(C$_4$F$_9$SO$_2$)). One thereof may be used singly, or a plurality thereof may be used by mixture.

Examples of the cyclic imide compound shown in Formula 10 include the compounds shown in the following Formula 10-1 to Formula 10-4. One thereof may be used singly, or a plurality thereof may be used by mixture.

Formula 10-1 to 10-4

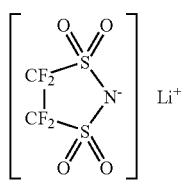
(10-1)

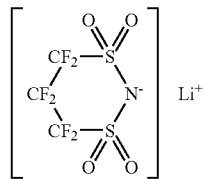
(10-2)

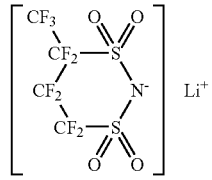
(10-3)

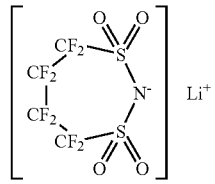
(10-4)

Examples of the chain methyde compound shown in Formula 11 include lithium tris(trifluoromethanesulfonyl)methyde (LiC(CF$_3$SO$_2$)$_3$).

The content of the electrolyte salt to the solvent is preferably from 0.3 mol/kg to 3.0 mol/kg both inclusive, since thereby high ion conductivity is obtained.

Operation of Secondary Battery

In the secondary battery, at the time of charge, for example, lithium ions are extracted from the cathode 21, and are inserted in the anode 22 through the electrolytic solution impregnated in the separator 23. Meanwhile, at the time of discharge, for example, lithium ions are extracted from the anode 22, and are inserted in the cathode 21 through the electrolytic solution impregnated in the separator 23.

Method of Manufacturing Secondary Battery

The secondary battery is manufactured, for example, by the following procedure.

First, the cathode 21 is formed. First, a cathode active material, a cathode binder, and a cathode electrical conductor are mixed to prepare a cathode mixture, which is dispersed in an organic solvent to form paste cathode mixture slurry. Subsequently, both faces of the cathode current collector 21A are uniformly coated with the cathode mixture slurry by using a doctor blade, a bar coater or the like, which is dried to form the cathode active material layer 21B. Finally, the cathode active material layer 21B is compression-molded by using a rolling press machine or the like while being heated if necessary. In this case, the resultant may be compression-molded over several times.

Next, the anode 22 is formed according to the foregoing procedure of forming the anode. In this case, the anode active material layer 22B containing the spherical particle and the nonspherical particle as the plurality of anode active material particles is formed on both faces of the anode current collector 22A.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like, and the anode lead 25 is connected to the battery can 11 by welding or the like.

After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by a sealing member 19A. The secondary battery illustrated in FIG. 7 and FIG. 8 is thereby completed.

According to the first secondary battery, the anode 22 has a structure similar to that of the foregoing anode. Thus, the physical property of the anode active material particles is hardly deteriorated with age, and the anode current collector 22A becomes hardly deformed at the time of charge and discharge. Therefore, superior cycle characteristics and superior swollenness characteristics are able to be obtained.

In particular, in the case where the solvent of the electrolytic solution contains the chain ester carbonate having halogen, the cyclic ester carbonate having halogen, the cyclic ester carbonate having an unsaturated carbon bond, sultone, or an acid anhydride, the cycle characteristics are able to be further improved.

Further, in the case where the electrolyte salt of the electrolytic solution contains at least one of lithium hexafluorophosphate, lithium tetrafluoroborate, lithium perchlorate, and lithium hexafluoroarsenate; or the compound shown in Formula 6 to Formula 11, the cycle characteristics are able to be further improved.

2-2. Second Secondary Battery (Cylindrical Type)

Figure 10:
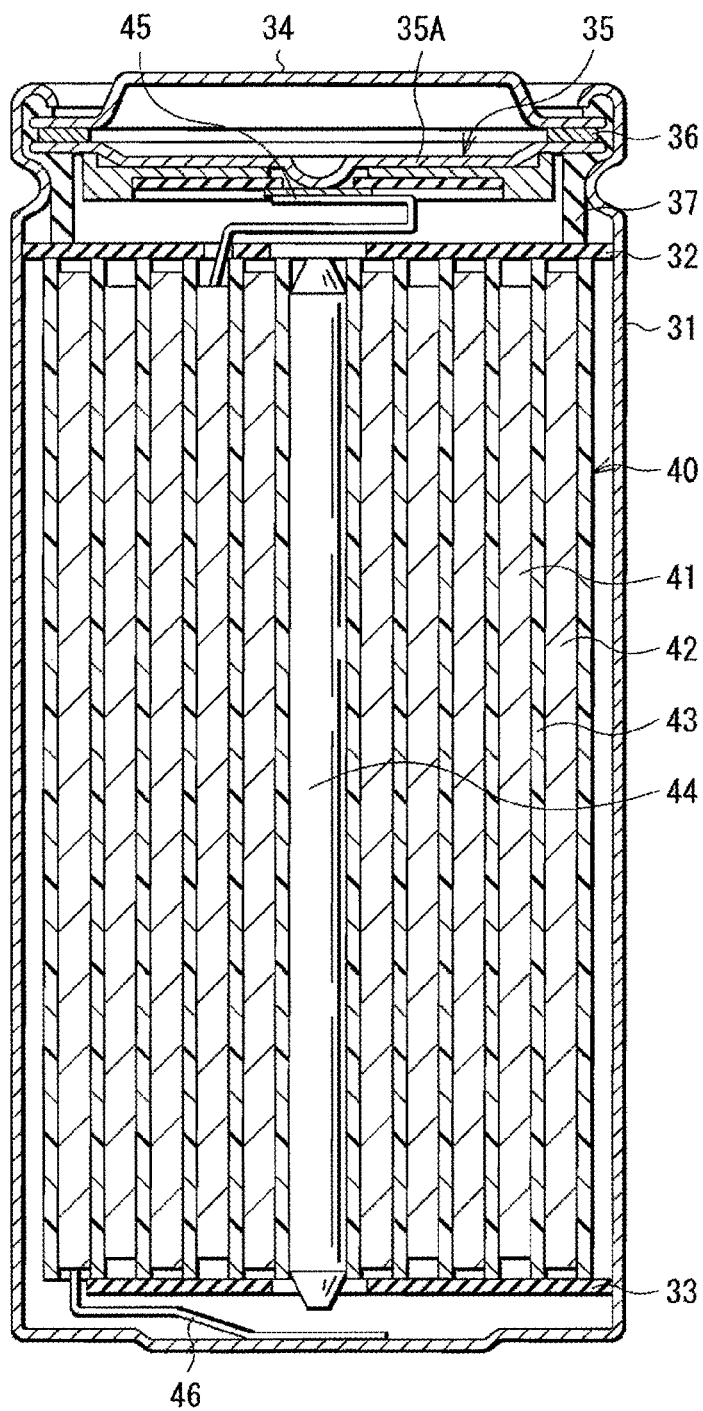
FIG. 10 is a cross sectional view illustrating a structure of a second secondary battery including the anode according to the embodiment of the invention.
Figure 11:
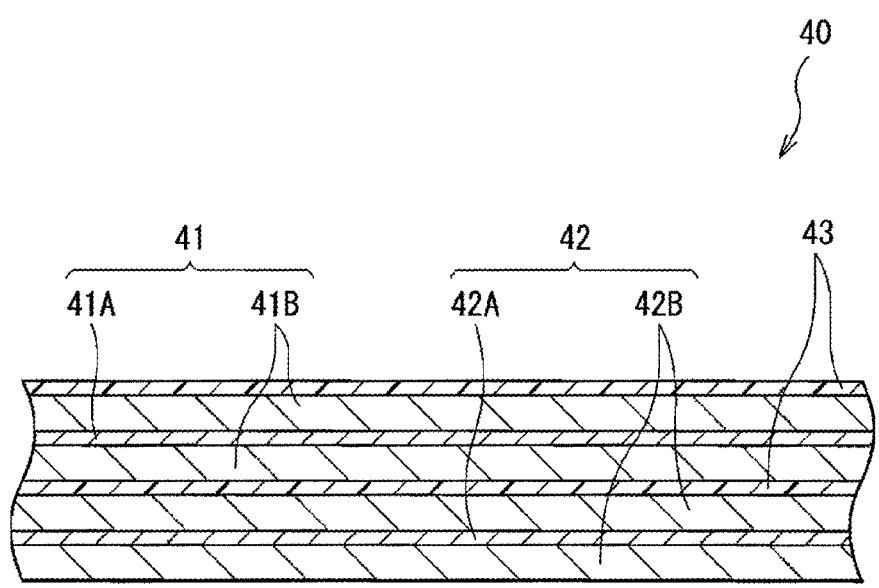
FIG. 11 is a cross sectional view illustrating an enlarged part of the spirally wound electrode body illustrated in FIG. 10.

FIG. 10 and FIG. 11 illustrate a cross sectional structure of a second secondary battery. FIG. 11 illustrates an enlarged part of a spirally wound electrode body 40 illustrated in FIG. 10.

The secondary battery is a lithium ion secondary battery as in the foregoing first secondary battery. The secondary battery mainly contains the spirally wound electrode body 40 and a pair of insulating plates 32 and 33 inside a battery can 31 in the shape of an approximately hollow cylinder. The battery structure using such a battery can 31 is a so-called cylindrical type.

The battery can 31 is made of, for example, a material similar to that of the battery can 11 in the first secondary battery. One end of the battery can 31 is opened, and the other end of the battery can 31 is closed. The pair of insulating plates 32 and 33 is vertically arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. By the caulking work, inside of the battery can 31 is hermetically sealed. The battery cover 34 is made of, for example, a material similar to that of the battery can 31. The safety valve mechanism 35 is electrically connected to the battery cover 34 through the PTC device 36. In the safety valve mechanism 35, in the case where the internal pressure becomes a certain level or more by internal short circuit, external heating or the like, a disk plate 35A flips to cut the electric connection between the battery cover 34 and the spirally wound electrode body 40. As temperature rises, the PTC device 36 increases the resistance and thereby limits a current to prevent abnormal heat generation resulting from a large current. The gasket 37 is made of, for example, an insulating material. The surface of the gasket 37 is coated with, for example, asphalt.

In the spirally wound electrode body 40, a cathode 41 and an anode 42 are layered with a separator 43 in between and spirally wound. For example, a center pin 44 is inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by, for example, being welded to the safety valve mechanism 35. The anode lead 46 is, for example, welded and thereby electrically connected to the battery can 31.

The cathode 41 has a structure in which, for example, a cathode active material layer 41B is provided on both faces of a cathode current collector 41A having a pair of faces. The structures of the cathode current collector 41A and the cathode active material layer 41B are respectively similar to the structures of the cathode current collector 21A and the cathode active material layer 21B in the first secondary battery.

The anode 42 has a structure in which, for example, an anode active material layer 42B is provided on both faces of an anode current collector 42A having a pair of faces. The structures of the anode current collector 42A and the anode active material layer 42B are respectively similar to the structures of the anode current collector 22A and the anode active material layer 22B in the first secondary battery. The anode active material layer 42B contains the spherical particle and the nonspherical particle as the plurality of anode active material particles.

The structure of the separator 43 and the composition of the electrolytic solution are respectively similar to the structure of the separator 23 and the composition of the electrolytic solution in the first secondary battery.

In the secondary battery, at the time of charge, for example, lithium ions are extracted from the cathode 41, and are inserted in the anode 42 through the electrolytic solution. Meanwhile, at the time of discharge, for example, lithium ions are extracted from the anode 42, and are inserted in the cathode 41 through the electrolytic solution.

The secondary battery is manufactured, for example, by the following procedure.

First, for example, the cathode 41 is formed by forming the cathode active material layer 41B on both faces of the cathode current collector 41A and the anode 42 is formed by forming the anode active material layer 42B on both faces of the anode current collector 42A with the use of procedures similar to the procedures of forming the cathode 21 and the anode 22 in the first secondary battery. Subsequently, the cathode lead 45 is attached to the cathode 41 by welding or the like, and the anode lead 46 is attached to the anode 42 by welding or the like. Subsequently, the cathode 41 and the anode 42 are layered with the separator 43 in between and spirally wound, and thereby the spirally wound electrode body 40 is formed. After that, the center pin 44 is inserted in the center of the spirally wound electrode body. Subsequently, the spirally wound electrode body 40 is sandwiched between the pair of insulating plates 32 and 33, and contained in the battery can 31. In this case, the end of the cathode lead 45 is welded to the safety valve mechanism 35, and the end of the anode lead 46 is welded to the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery illustrated in FIG. 10 and FIG. 11 is thereby completed.

According to the second secondary battery, the anode 42 has a structure similar to that of the anode 22 of the first secondary battery. Therefore, superior cycle characteristics and superior swollenness characteristics are able to be obtained. Other effects of the secondary battery are similar to those of the first secondary battery.

2-3. Third Secondary Battery (Laminated Film Type)

Figure 12:
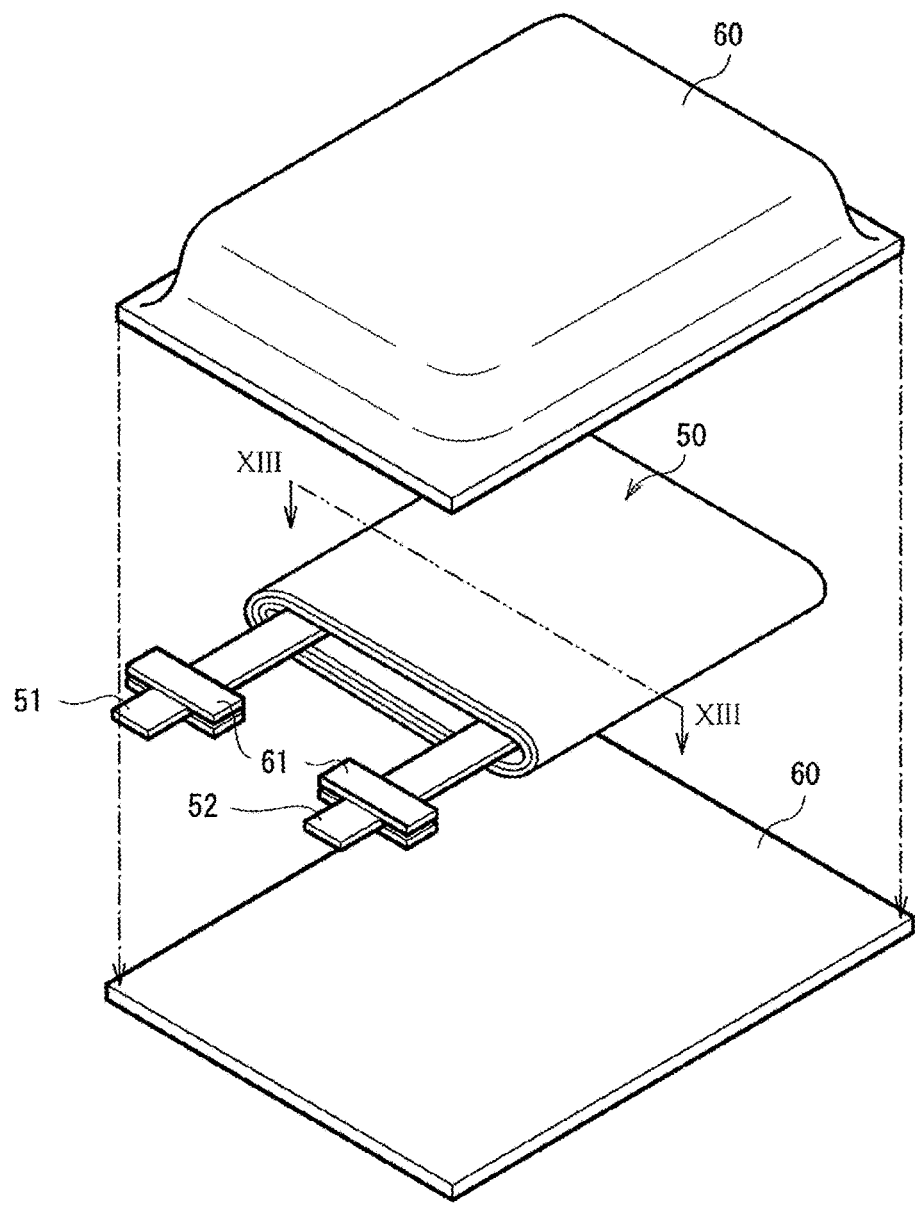
FIG. 12 is an exploded perspective view illustrating a structure of a third secondary battery including the anode according to the embodiment of the invention.
Figure 13:
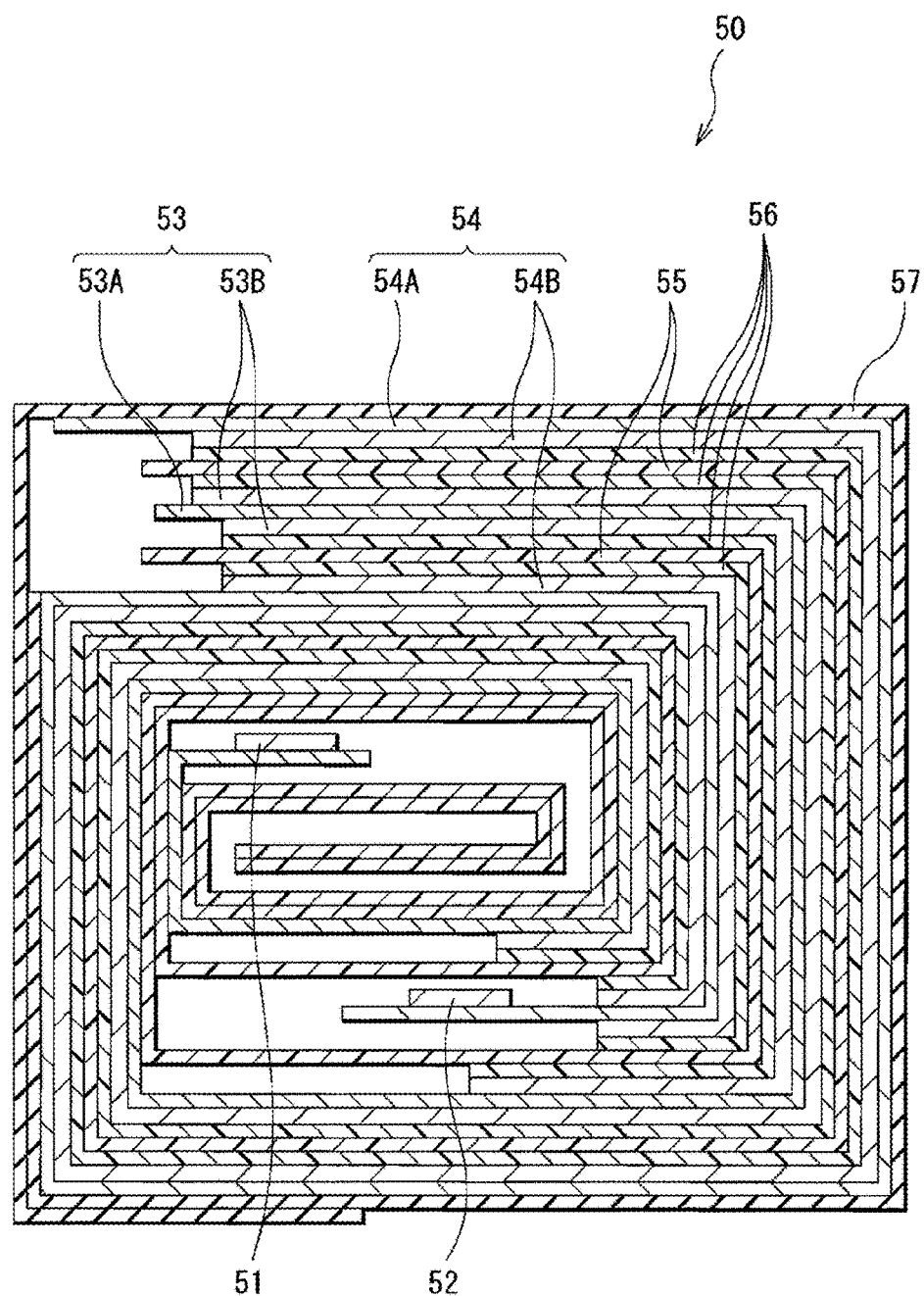
FIG. 13 is a cross sectional view taken along line XIII-XIII of the spirally wound electrode body illustrated in FIG. 12.

FIG. 12 illustrates an exploded perspective structure of a third secondary battery. FIG. 13 illustrates an exploded cross section taken along line XIII-XIII illustrated in FIG. 12.

The secondary battery is a lithium ion secondary battery as in the foregoing first secondary battery. In the secondary battery, a spirally wound electrode body 50 on which a cathode lead 51 and an anode lead 52 are attached is contained in a film package member 60 mainly. The battery structure using such a package member 60 is called the laminated film type.

The cathode lead 51 and the anode lead 52 are respectively derived from inside to outside of the package member 60 in the same direction, for example. However, arrangement positions of the cathode lead 51 and the anode lead 52 with respect to the spirally wound electrode body 50, derivation directions thereof and the like are not particularly limited. The cathode lead 51 is made of, for example, aluminum or the like, and the anode lead 52 is made of, for example, copper, nickel, stainless or the like. These materials are in the shape of, for example, a thin plate or mesh.

The package member 60 is made of a laminated film in which, for example, a fusion bonding layer, a metal layer, and a surface protective layer are layered in this order. In this case, for example, the respective outer edges of the fusion bonding layer of two films are bonded with each other by fusion bonding, an adhesive or the like so that the fusion bonding layer and the spirally wound electrode body 50 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 60, an aluminum laminated film in which a polyethylene film, an aluminum foil, and a nylon film are layered in this order is preferable. However, the package member 60 may be made of a laminated film having other laminated structure, a polymer film such as polypropylene, or a metal film, instead of the foregoing aluminum laminated film.

An adhesive film 61 to protect from entering of outside air is inserted between the package member 60 and the cathode lead 51, the anode lead 52. The adhesive film 61 is made of a material having contact characteristics with respect to the cathode lead 51 and the anode lead 52. Examples of such a material include, for example, a polyolefin resin such as polyethylene, polypropylene, modified polyethylene, and modified polypropylene.

In the spirally wound electrode body 50, a cathode 53 and an anode 54 are layered with a separator 55 and an electrolyte 56 in between and spirally wound. The outermost periphery thereof is protected by a protective tape 57.

The cathode 53 has a structure in which, for example, a cathode active material layer 53B is provided on both faces of a cathode current collector 53A having a pair of faces. The structures of the cathode current collector 53A and the cathode active material layer 53B are respectively similar to those of the cathode current collector 21A and the cathode active material layer 21B in the first secondary battery.

The anode 54 has a structure in which, for example, an anode active material layer 54B is provided on both faces of an anode current collector 54A having a pair of faces. The structures of the anode current collector 54A and the anode active material layer 54B are respectively similar to the structures of the anode current collector 22A and the anode active material layer 22B in the first secondary battery. The anode active material layer 54B has the spherical particle and the nonspherical particle as the plurality of anode active material particles.

The structure of the separator 55 is similar to the structure of the separator 23 in the first secondary battery.

The electrolyte layer 56 is a so-called gel electrolyte, containing an electrolytic solution and a polymer compound that holds the electrolytic solution. The gel electrolyte is preferable, since high ion conductivity (for example, 1 mS/cm or more at room temperature) is obtained and liquid leakage of the electrolytic solution is prevented.

Examples of polymer compounds include the following. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. Further. examples thereof include a copolymer of vinylidene fluoride and hexafluoro propylene. One of these polymer compounds may be used singly, or two or more thereof may be used by mixture. Specially, polyvinylidene fluoride or the copolymer of vinylidene fluoride and hexafluoro propylene is preferable, since such a polymer compound is electrochemically stable.

The composition of the electrolytic solution is similar to the composition of the electrolytic solution in the first secondary battery. However, in the electrolyte layer 56 as the gel electrolyte, a solvent of the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte layer 56 in which the electrolytic solution is held by the polymer compound, the electrolytic solution may be directly used. In this case, the electrolytic solution is impregnated in the separator 55.

In the secondary battery, at the time of charge, for example, lithium ions are extracted from the cathode 53, and are inserted in the anode 54 through the electrolyte layer 56. Meanwhile, at the time of discharge, for example, lithium ions are extracted from the anode 54, and are inserted in the cathode 53 through the electrolyte layer 56.

The secondary battery including the gel electrolyte layer 56 is manufactured, for example, by the following three procedures.

In the first manufacturing method, first, for example, the cathode 53 and the anode 54 are formed by a formation procedure similar to that of the cathode 21 and the anode 22 in the first secondary battery. Specifically, the cathode 53 is formed by forming the cathode active material layer 53B on both faces of the cathode current collector 53A, and the anode 54 is formed by forming the anode active material layer 54B on both faces of the anode current collector 54A. Subsequently, a precursor solution containing an electrolytic solution, a polymer compound, and a solvent is prepared. After the cathode 53 and the anode 54 are coated with the precursor solution, the solvent is volatilized to form the gel electrolyte layer 56. Subsequently, the cathode lead 51 is attached to the cathode current collector 53A by welding or the like, and the anode lead 52 is attached to the anode current collector 54A by welding or the like. Subsequently, the cathode 53 and the anode 54 provided with the electrolyte layer 56 are layered with the separator 55 in between and spirally wound to obtain a laminated body. After that, the protective tape 57 is adhered to the outermost periphery thereof to form the spirally wound electrode body 50. Finally, for example, after the spirally wound electrode body 50 is sandwiched between two pieces of film-like package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery illustrated in FIG. 12 and FIG. 13 is completed.

In the second manufacturing method, first, the cathode lead 51 is attached to the cathode 53, and the anode lead 52 is attached to the anode 54. Subsequently, the cathode 53 and the anode 54 are layered with the separator 55 in between and spirally wound. After that, the protective tape 57 is adhered to the outermost periphery thereof, and thereby a spirally wound body as a precursor of the spirally wound electrode body 50 is formed. Subsequently, after the spirally wound body is sandwiched between two pieces of the film-like package members 60, the outermost peripheries except for one side are bonded by thermal fusion bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte layer 56 is formed. Accordingly, the secondary battery is completed.

In the third manufacturing method, the spirally wound body is formed and contained in the pouch-like package member 60 in the same manner as that of the foregoing second manufacturing method, except that the separator 55 with both faces coated with a polymer compound is used firstly. Examples of polymer compounds with which the separator 55 is coated include a polymer containing vinylidene fluoride as a component, that is, a homopolymer, a copolymer, and a multicomponent copolymer. Specific examples thereof include polyvinylidene fluoride, a binary copolymer containing vinylidene fluoride and hexafluoro propylene as a component, and a ternary copolymer containing vinylidene fluoride, hexafluoro propylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 60. After that, the opening of the package member 60 is sealed by thermal fusion bonding or the like. Finally, the resultant is heated while a weight is applied to the package member 60, and the separator 55 is contacted with the cathode 53 and the anode 54 with the polymer compound in between. Thereby, the electrolytic solution is impregnated into the polymer compound, and the polymer compound is gelated to form the electrolyte layer 56. Accordingly, the secondary battery is completed.

In the third manufacturing method, the swollenness of the secondary battery is prevented compared to the first manufacturing method. Further, in the third manufacturing method, the monomer, the solvent and the like as a raw material of the polymer compound are hardly left in the electrolyte layer 56 compared to the second manufacturing method. In addition, the formation step of the polymer compound is favorably controlled. Thus, sufficient contact characteristics are obtained between the cathode 53/the anode 54/the separator 55 and the electrolyte layer 56.

According to the third secondary battery, the anode 54 has a structure similar to that of the anode 22 of the first secondary battery. Therefore, superior cycle characteristics and superior swollenness characteristics are able to be obtained. Other effects of the secondary battery are similar to those of the first secondary battery.

EXAMPLES

Examples of the invention will be described in detail.

Examples 1-1 to 1-10

The laminated film type lithium ion secondary battery illustrated in FIG. 12 and FIG. 13 was fabricated by the following procedure.

First, the cathode 53 was formed by forming the cathode active material layer 53B on the cathode current collector 53A by using coating method.

In this case, first, lithium carbonate ($Li_2CO_2$) and cobalt carbonate ($CoCO_3$) were mixed at a molar ratio of 0.5:1. After that, the mixture was fired in the air at 900 deg C. for 5 hours. Thereby, lithium-cobalt composite oxide ($LiCoO_2$) was obtained. Subsequently, 91 parts by mass of the lithium-cobalt composite oxide as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone to obtain paste cathode mixture slurry. Subsequently, both faces of the cathode current collector 53A were uniformly coated with the cathode mixture slurry, which was dried to form the cathode active material layer 53B. As the cathode current collector 53A, a strip-shaped aluminum foil (thickness: 12 μm) was used. Finally, the cathode active material layer 53B was compression-molded by using a roll pressing machine.

Next, the anode 54 was formed by forming the anode active material layer 54B on the anode current collector 54A by using spraying method (gas frame spraying method).

In this case, the anode active material layer 54B containing a plurality of anode active material particles was formed by spraying silicon powder (median size: from 1 μm to 300 μm both inclusive) as an anode material in a fused state or a semi-fused state toward both faces of the anode current collector 54A. As the anode current collector 54A, a roughened electrolytic copper foil (thickness: 18 μm, ten point height of roughness profile Rz: 4 μm) was used. Presence of the spherical particle and the nonspherical particle was set as illustrated in Table 1. In the spraying step, mixed gas of hydrogen and oxygen as spraying gas (hydrogen:oxygen=2:1 at a volume ratio) was used as spraying gas, nitrogen gas was used as material supply gas, and the spraying rate was about from 45 msec to 55 msec both inclusive. In this case, the material input amount per unit time was controlled by adjusting the material supply gas amount. Further, to prevent thermal damage to the anode current collector 54A, spraying treatment was performed while cooling with the use of carbon dioxide. In particular, oxygen gas was introduced into a chamber, and the oxygen content in the anode active material particles was thereby set to 5 atomic %.

In forming the anode active material layer 54B, by adjusting the median size, the input amount, and the fusion temperature of the anode material and the cooling temperature of the substrate, the following conditions were satisfied. Firstly, the nonspherical particle contained a planular particle. Secondly, the half-width (2θ) of the diffraction peak in (111) crystal plane of the anode active material particles obtained by X-ray diffraction was 1 degree, and the crystallite size originated in the same crystal plane was 40 nm. In this case, an X-ray diffracting device (tube: CuKα), Rigaku Corporation make was used, the X-ray tube voltage was 40 kV, the X-ray tube current was 40 mA, the scanning method was θ-2θ method, and the measurement range was in the range of 20 degree≤2θ≤90 degree. Thirdly, presence of the spherical particle, the number thereof, the particle diameter (media size) thereof, and the circularity degree thereof were set as illustrated in Table 1. For the foregoing conditions, the non-opposed region R2 of the anode active material layer 54B described with reference to FIG. 9 was examined. A procedure of calculating the particle diameter of the spherical particle and the number thereof was as described for the foregoing anode.

Next, ethylene carbonate (EC) and diethyl carbonate (DEC) were mixed as a solvent. After that, lithium hexafluorophosphate ($LiPF_6$) as an electrolyte salt was dissolved in the solvent to prepare a liquid electrolyte (electrolytic solution). In this case, the solvent composition (EC:DEC) was 50:50 at a weight ratio. The content of the electrolyte salt to the solvent was 1 mol/kg.

Finally, the secondary battery was assembled by using the cathode 53, the anode 54, and the electrolytic solution. First, the cathode lead 51 made of aluminum was welded to one end of the cathode current collector 53A, and the anode lead 52 made of nickel was welded to one end of the anode current collector 54A. Subsequently, the cathode 53, the separator 55, the anode 54, and the separator 55 were layered in this order and spirally wound in the longitudinal direction. After that, the end portion of the spirally wound body was fixed by the protective tape 57 made of an adhesive tape, and thereby a spirally wound body as a precursor of the spirally wound electrode body 50 was formed. As the separator 55, a 3-layer structure (thickness: 23 μm) in which a film made of a microporous polyethylene as a main component was sandwiched between films made of a microporous polypropylene as a main component was used. Subsequently, the spirally wound body was sandwiched between the package members 60. After that, outer edges other than an edge of one side of the package members were thermally fusion-bonded with each other. Thereby, the spirally wound body was contained in the package members 60 in a pouched state. As the package member 60, a 3-layer laminated film (total thickness: 100 μm) in which a nylon film (thickness: 30 μm), an aluminum foil (thickness: 40 μm), and a cast polypropylene film (thickness 30 μm) were layered from the outside was used. Subsequently, the electrolytic solution was injected through the opening of the package member 60, the electrolytic solution was impregnated in the separator 55, and thereby the spirally wound electrode body 50 was formed. Finally, the opening of the package member 60 was sealed by thermal fusion bonding in the vacuum atmosphere, and thereby the laminated film type secondary battery was completed. In forming the secondary battery, lithium metal was prevented from being precipitated on the anode 54 in the full charged state by adjusting the thickness of the cathode active material layer 53B.

Figure 14:
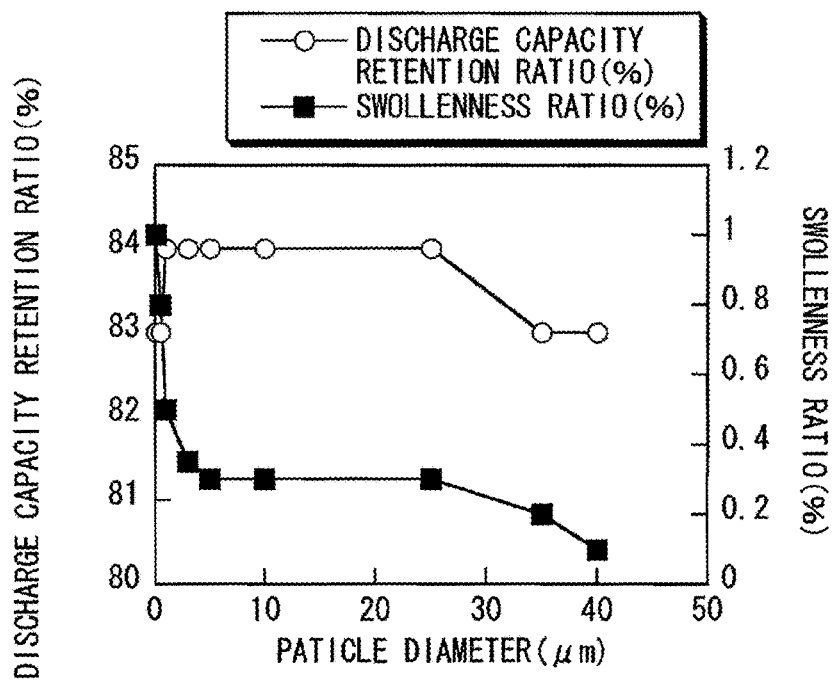
FIG. 14 is a diagram illustrating a relation between a particle diameter and a discharge capacity retention ratio/a swollenness ratio.

The cycle characteristics and the swollenness characteristics for the secondary batteries of Examples 1-1 to 1-10 were examined. The results illustrated in Table 1 and FIG. 14 were obtained.

In examining the cycle characteristics, a cycle test was performed, and thereby the discharge capacity retention ratio was obtained. First, to stabilize the battery state, after 1 cycle of charge and discharge was performed in the atmosphere at 23 deg C., charge and discharge were performed again to measure the discharge capacity at the second cycle. Subsequently, the secondary battery was charged and discharged 99 cycles in the same atmosphere, and thereby the discharge capacity at the 101st cycle was measured. Finally, the discharge capacity retention ratio (%)=(discharge capacity at the 101st cycle/discharge capacity at the second cycle)*100 was calculated. In this case, after charge was performed at the constant current density of 3 mA/$cm^2$ until the battery voltage reached 4.2 V, charge was continuously performed at the constant voltage of 4.2 V until the battery density reached 0.3 mA/$cm^2$. Further, discharge was performed at the constant current density of 3 mA/$cm^2$ until the battery voltage reached 2.5 V.

In examining the swollenness characteristics, the swollenness ratio at the time of the foregoing cycle test was obtained. That is, the thickness after the second cycle discharge and the thickness after the 101st cycle discharge were measured. After that, the swollenness ratio (%)= [(thickness after the 101st cycle discharge-thickness after the second cycle discharge)/thickness after the second cycle discharge]*100 was calculated.

The procedures and the conditions in examining the cycle characteristics and the swollenness characteristics were similarly applied to the following examples.

TABLE 1

| | Anode active material layer | | | | | | | Discharge | |
| --- | --- | --- | --- | --- | --- | --- | --- | --- | --- |
| | Spherical particle | | | | | Crystal state | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 1-1 | Present | 15 | 0.1 | 0.95 | Present | Crystalline | 1 | 40 | 83 | 1 |
| Example 1-2 | | | 0.5 | | | | | | 83 | 0.8 |
| Example 1-3 | | | 1 | | | | | | 84 | 0.5 |
| Example 1-4 | | | 3 | | | | | | 84 | 0.35 |
| Example 1-5 | | | 5 | | | | | | 84 | 0.3 |

TABLE 1-continued

| | Anode active material layer | | | | | | | Discharge | |
| | Spherical particle | | | | Crystal state | | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
|---|---|---|---|---|---|---|---|---|---|---|
| Example 1-6 | | | 10 | | | | | | 84 | 0.3 |
| Example 1-7 | | | 25 | | | | | | 84 | 0.3 |
| Example 1-8 | | | 35 | | | | | | 83 | 0.2 |
| Example 1-9 | | | 40 | | | | | | 83 | 0.1 |
| Example 1-10 | Not present | — | — | — | Present | Crystalline | 1 | 40 | 82 | 3.2 |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

In Examples 1-1 to 1-9 in which the plurality of anode active material particles contained the spherical particle, the discharge capacity retention ratio was increased up to about 80% or more, and the swollenness ratio was decreased down to about 1% or less differently from in Example 1-10 in which the plurality of anode active material particles did not contain the spherical particle. In particular, in the case where the plurality of anode active material particles contained the spherical particle, there was a tendency that as the particle diameter was increased, the discharge capacity retention ratio was increased and then decreased, and the swollenness ratio was decreased. In this case, in the case where the particle diameter was from 0.5 μm to 35 μm both inclusive, the discharge capacity retention ratio was more increased, the swollenness ratio was more decreased, and a sufficient battery capacity was obtained. Accordingly, in the case where the plurality of anode active material particles contains the spherical particle, superior cycle characteristics and superior swollenness ratio are obtained. In this case, in the case where the particle diameter (median size) of the spherical particle is from 0.5 μm to 35 μm both inclusive, both characteristics are further improved.

Examples 2-1 to 2-8

Figure 15:
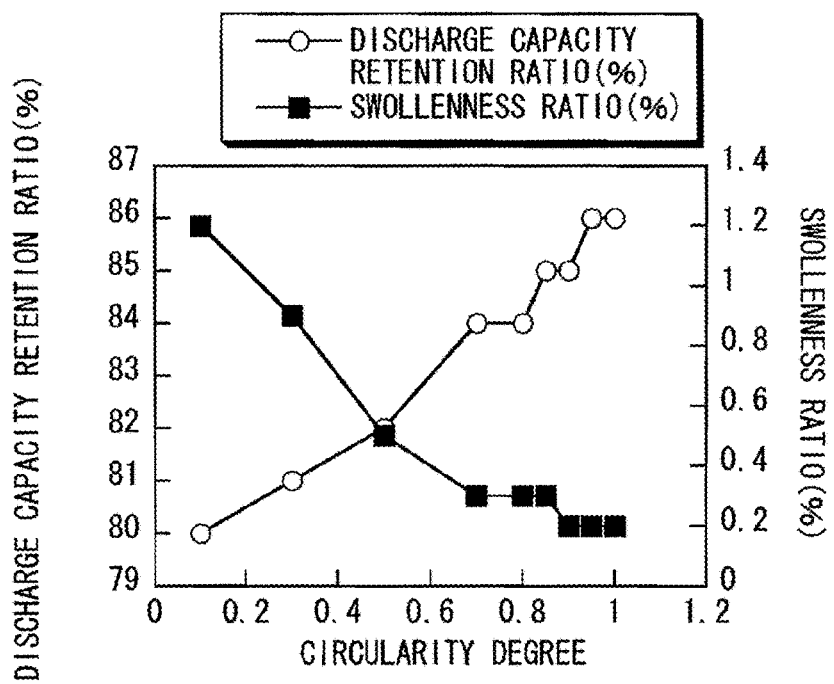
FIG. 15 is a diagram illustrating a relation between a circularity degree and a discharge capacity retention ratio/a swollenness ratio.

A procedure similar to that of Example 1-5 was executed, except that the circularity degree of the spherical particle was changed as illustrated in Table 2. The cycle character-istics and the swollenness characteristics for the secondary batteries of Examples 2-1 to 2-8 were examined The results illustrated in Table 2 and FIG. 15 were obtained.

TABLE 2

| | Anode active material layer | | | | | | | | Discharge | |
| | Spherical particle | | | | | Crystal state | | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
|---|---|---|---|---|---|---|---|---|---|---|
| Example 2-1 | Present | 15 | 5 | 0.1 | Present | Crystalline | 1 | 40 | 80 | 1.2 |
| Example 2-2 | | | | 0.3 | | | | | 81 | 0.9 |
| Example 2-3 | | | | 0.5 | | | | | 82 | 0.5 |
| Example 2-4 | | | | 0.7 | | | | | 84 | 0.3 |
| Example 2-5 | | | | 0.8 | | | | | 84 | 0.3 |
| Example 2-6 | | | | 0.85 | | | | | 84 | 0.3 |
| Example 2-7 | | | | 0.9 | | | | | 84 | 0.3 |
| Example 1-5 | | | | 0.95 | | | | | 84 | 0.3 |
| Example 2-8 | | | | 1 | | | | | 85 | 0.2 |
| Example 1-10 | Not present | — | — | — | Present | Crystalline | 1 | 40 | 82 | 3.2 |

Battery structure: laminated film type; cathode active material: $LiCoO_2$; anode active material: Si (spraying method), ten point height of roughness profile Rz of anode current collector: 4 μm; and oxygen content in anode active material particles: 5 atomic %

In Examples 2-1 to 2-8 in which the plurality of anode active material particles contained the spherical particle, even in the case where the circularity degree was changed, the discharge capacity retention ratio of about 80% or more and the swollenness ratio of about 1% or less were obtained differently from in Example 1-10 in which the plurality of anode active material particles did not contain the spherical particle. In particular, in the case where the plurality of anode active material particles contained the spherical particle, there was a tendency that as the circularity degree was increased, the discharge capacity retention ratio was increased, and the swollenness ratio was decreased. In this case, in the case where the circularity degree was from 0.5 to 1 both inclusive, the discharge capacity retention ratio was more increased, the swollenness ratio was more decreased, and a sufficient battery capacity was obtained. Accordingly, in the case where the circularity degree is from 0.5 to 1 both inclusive, both characteristics are further improved.

Examples 3-1 to 3-11

Figure 16:
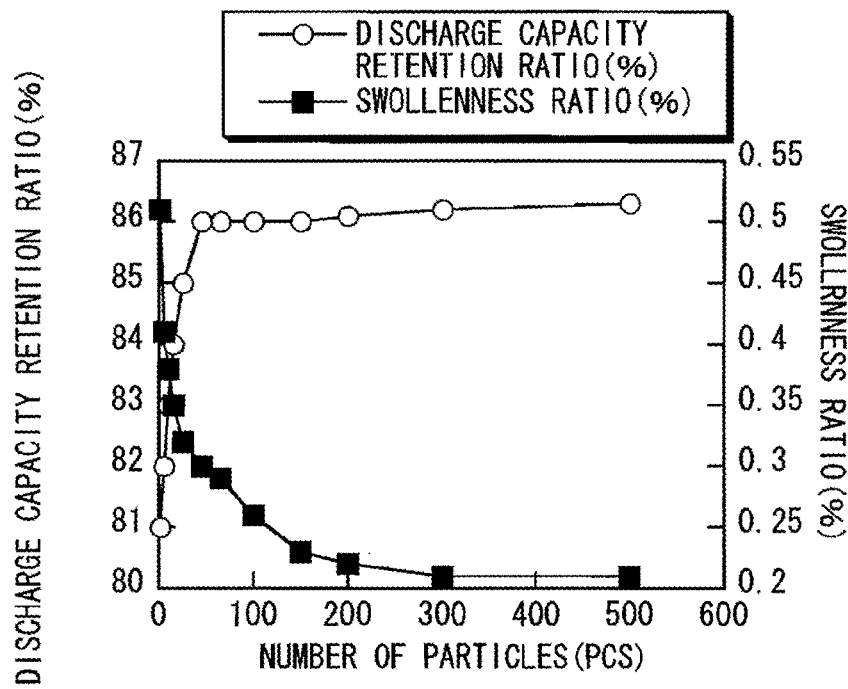
FIG. 16 is a diagram illustrating a relation between the number of particles and a discharge capacity retention ratio/a swollenness ratio.

A procedure similar to that of Example 1-4 was executed, except that the number of spherical particles was changed as illustrated in Table 3. The cycle characteristics and the swollenness characteristics for the secondary batteries of Examples 3-1 to 3-11 were examined. The results illustrated in Table 3 and FIG. 16 were obtained.

TABLE 3

| | Anode active material layer | | | | | | | Discharge | |
|---|---|---|---|---|---|---|---|---|---|
| | Spherical particle | | | | Crystal state | | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 3-1 | Present | 1 | 3 | 0.95 | Present | Crystalline | 1 | 40 | 81 | 0.51 |
| Example 3-2 | | 5 | | | | | | | 82 | 0.42 |
| Example 3-3 | | 10 | | | | | | | 83 | 0.38 |
| Example 1-4 | | 15 | | | | | | | 84 | 0.35 |
| Example 3-4 | | 25 | | | | | | | 85 | 0.32 |
| Example 3-5 | | 45 | | | | | | | 86 | 0.3 |
| Example 3-6 | | 65 | | | | | | | 86 | 0.29 |
| Example 3-7 | | 100 | | | | | | | 86 | 0.26 |
| Example 3-8 | | 150 | | | | | | | 86 | 0.23 |
| Example 3-9 | | 200 | | | | | | | 86.1 | 0.22 |
| Example 3-10 | | 300 | | | | | | | 86.2 | 0.21 |
| Example 3-11 | | 500 | | | | | | | 86.3 | 0.21 |
| Example 1-10 | Not present | — | — | — | Present | Crystalline | 1 | 40 | 82 | 3.2 |

Battery structure: laminated film type; cathode active material: LiCoO$_2$; anode active material: Si (spraying method); ten point height of roughness profile Rz of anode current collector: 4 μm; and oxygen content in anode active material particles: 5 atomic %

In Examples 3-1 to 3-11 in which the plurality of anode active material particles contained the spherical particle, even in the case where the number of particles was changed, the discharge capacity retention ratio of about 80% or more and the swollenness ratio of about 1% or less were obtained differently from in Example 1-10 in which the plurality of anode active material particles did not contain the spherical particle. In particular, in the case where the plurality of anode active material particles contained the spherical particle, there was a tendency that as the number of particles was increased, the discharge capacity retention ratio was increased, and the swollenness ratio was decreased. In this case, in the case where the number of particles was from 10 pcs to 200 pcs both inclusive, the discharge capacity retention ratio was more increased, the swollenness ratio was more decreased, and a sufficient battery capacity was obtained. Accordingly, in the case where the number of spherical particles is from 10 pcs to 200 pcs both inclusive, both characteristics are further improved.

Examples 4-1 to 4-5

Figure 17:
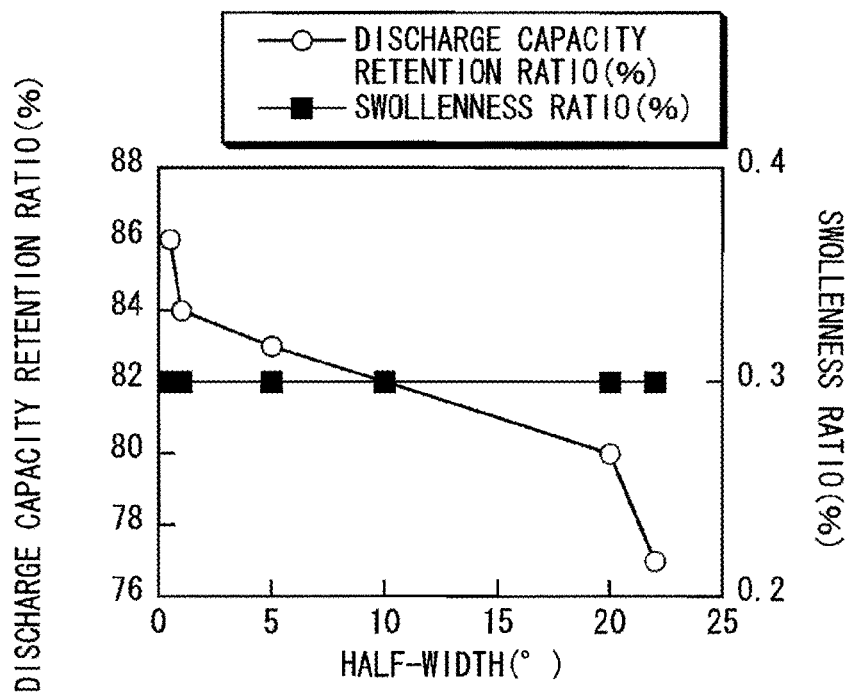
FIG. 17 is a diagram illustrating a relation between a half-width and a discharge capacity retention ratio/a swollenness ratio.

A procedure similar to that of Example 1-5 was executed, except that the half-width and the crystallite size were changed as illustrated in Table 4. The cycle characteristics and the swollenness characteristics for the secondary batteries of Examples 4-1 to 4-5 were examined. The results illustrated in Table 4 and FIG. 17 were obtained.

TABLE 4

| | Anode active material layer | | | | | | | Discharge | |
|---|---|---|---|---|---|---|---|---|---|
| | Spherical particle | | | | Crystal state | | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 4-1 | Present | 15 | 5 | 0.95 | Present | Crystalline | 0.5 | 100 | 86 | 0.3 |
| Example 1-5 | | | | | | | 1 | 40 | 84 | 0.3 |
| Example 4-2 | | | | | | | 5 | 20 | 83 | 0.3 |
| Example 4-3 | | | | | | | 10 | 15 | 82 | 0.3 |
| Example 4-4 | | | | | | | 20 | 10 | 80 | 0.3 |
| Example 4-5 | | | | | | | 22 | 8.5 | 77 | 0.3 |

Battery structure: laminated film type; cathode active material: LiCoO$_2$; anode active material: Si (spraying method); ten point height of roughness profile Rz of anode current collector: 4 μm; and oxygen content in anode active material particles: 5 atomic %

In Examples 4-1 to 4-5 in which the anode active material particles were crystalline, there was a tendency that as the half-width was increased and the crystallite size was decreased, while the swollenness ratio was constant, the discharge capacity retention ratio was decreased. In this case, in the case where the half-width was 20 degree or less and the crystallite size was 10 nm or more, the discharge capacity retention ratio was more increased. Accordingly, in the case where the anode active material particles are crystalline, superior cycle characteristics are obtained. In this case, in the case where the half-width of the diffraction peak in (111) crystal plane of the anode active material particles obtained by X-ray diffraction is 20 degree or less and the crystallite size is 10 nm or more, the cycle characteristics are further improved.

Examples 5-1 to 5-4

A procedure similar to that of Examples 1-1 to 1-10 was executed, except that the anode active material layer 54B was formed by using coating method. In forming the anode active material layer 54B, first, spherical particles and nonspherical particles composed of silicon powder were prepared. In this case, the silicon powder was fused and then immediately cooled to obtain the spherical particles. Meanwhile, the silicon powder was fused and then moderately cooled with the use of cooling gas (nitrogen gas) to obtain the nonspherical particles. Subsequently, the foregoing silicon powder (the spherical particles and the nonspherical particles) as an anode active material and a polyamic acid solution (solvent: N-methyl-2-pyrrolidone and N,N-dimethyl acetoamide) for forming the anode binder were mixed at a dry weight ratio of 80:20 to obtain an anode mixture. Subsequently, the anode mixture was dispersed in N-methyl-2-pyrrolidone to obtain paste anode mixture slurry. Subsequently, both faces of the anode current collector 54A were uniformly coated with the anode mixture slurry by using a coating device and the resultant was dried. Finally, the resultant was provided with heat treatment in the vacuum atmosphere under conditions at 400 deg C. for 1 hour to form the anode active material layer 54B. The presence of spherical particles, the number thereof, the particle diameter thereof, and the circularity degree thereof in this case were as illustrated in Table 5. The cycle characteristics and the swollenness characteristics for the secondary batteries of Examples 5-1 to 5-4 were examined. The results illustrated in Table 5 were obtained.

TABLE 5

| | Anode active material layer | | | | | | | Discharge capacity | |
|---|---|---|---|---|---|---|---|---|---|
| | Spherical particle | | | | Crystal state | | | | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 5-1 | Present | 15 | 1 | 0.95 | Present | Crystalline | 1 | 40 | 68 | 1.5 |
| Example 5-2 | | | 3 | | | | | | 70 | 1.3 |
| Example 5-3 | | | 5 | | | | | | 72 | 1.1 |
| Example 5-4 | Not present | — | — | — | | | | | 55 | 4.5 |

Battery structure: laminated film type; cathode active material: LiCoO$_2$; anode active material: Si (spraying method); ten point height of roughness profile Rz of anode current collector: 4 μm; and oxygen content in anode active material particles: 5 atomic %

In Examples 5-1 to 5-4 in which coating method was used as a formation method of the anode active material layer 54B, the discharge capacity retention ratio was decreased and the swollenness ratio was increased than in Examples 1-1 to 1-10 in which spraying method was used. The result shows that if coating method is used, differently from the case using spraying method, an ideal system in which the spherical particle and the nonspherical particle are mixed is not able to be formed, and expansion and shrinkage of the anode active material layer 54B are not sufficiently prevented at the time of charge and discharge. Accordingly, in the case where the anode active material layer 54B is formed by spraying method, the ideal system in which the spherical particle and the nonspherical particle are mixed is able to be formed, and thus superior cycle characteristics are obtained.

Examples 6-1 to 6-3

A procedure similar to that of Examples 1-5, 1-6, and 1-10 was executed, except that the nonspherical particle did not contain the planular particle. The cycle characteristics and the swollenness characteristics for the secondary batteries of Examples 6-1 to 6-3 were examined. The results illustrated in Table 6 were obtained.

TABLE 6

| | Anode active material layer | | | | | | | Discharge capacity | |
|---|---|---|---|---|---|---|---|---|---|
| | Spherical particle | | | | Crystal state | | | | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 1-5 | Present | 15 | 5 | 0.95 | Present | Crystalline | 1 | 40 | 84 | 0.3 |
| Example 1-6 | | | 10 | | | | | | 84 | 0.3 |
| Example 6-1 | | | 5 | | Not present | | | | 73 | 0.4 |
| Example 6-2 | | | 10 | | | | | | 74 | 0.4 |

TABLE 6-continued

| | Anode active material layer | | | | | | | Discharge | |
|---|---|---|---|---|---|---|---|---|---|
| | Spherical particle | | | | Crystal state | | | capacity | |
| | Presence | Number of particles (pcs) | Particle diameter (μm) | Circularity degree | Planular particle | Type | Half-width (deg) | Crystallite size (nm) | retention ratio (%) | Swollenness ratio (%) |
| Example 1-10 | Not present | — | — | — | Present | Crystalline | 1 | 40 | 82 | 3.2 |
| Example 6-3 | | | | | Not present | | | | 62 | 3.3 |

Battery structure: laminated film type; cathode active material: LiCoO$_2$; anode active material: Si (spraying method); ten point height of roughness profile Rz of anode current collector: 4 μm; and oxygen content in anode active material particles: 5 atomic %

In Examples 6-1 and 6-2 in which the plurality of anode active material particles contained the spherical particle, even in the case where the nonspherical particle did not contain the planular particle, the discharge capacity retention ratio was increased up to about 70% or more, and the swollenness ratio was decreased down to about 1% or less compared to Example 6-3 in which the plurality of anode active material particles did not contain the spherical particle. In particular, in the case where the nonspherical particle contained the planular particle, the discharge capacity retention ratio was increased and the swollenness ratio was decreased than in the case in which the nonspherical particle did not contain the planular particle. Accordingly, in the case where the nonspherical particle contains a planular particle, the cycle characteristics and the swollenness characteristics are further improved.

compared to in Example 1-10 in which the plurality of anode active material particles did not contain the spherical particle. In particular, in the case where the plurality of anode active material particles contained the spherical particle, there was a tendency that as the oxygen content was increased, the discharge capacity retention ratio was increased while the swollenness ratio was constant. In this case, in the case where the oxygen content was from 1.5 atomic % to 40 atomic % both inclusive, the discharge capacity retention ratio was more increased, the swollenness ratio was more decreased, and a sufficient battery capacity was obtained. Accordingly, in the case where the oxygen content in the anode active material particles is from 1.5 atomic % to 40 atomic % both inclusive, the cycle characteristics are further improved.

Examples 7-1 to 7-9

Figure 18:
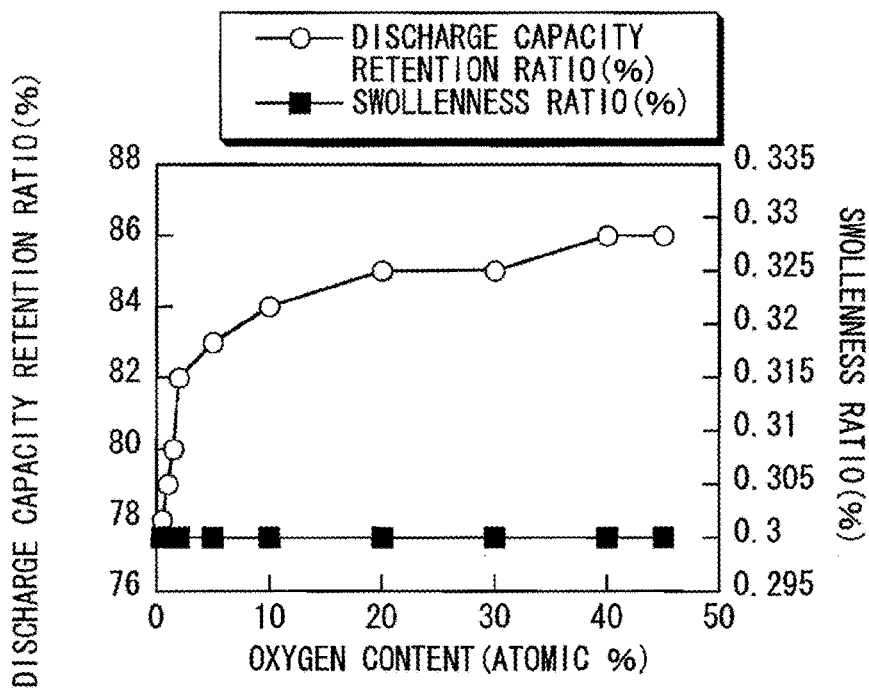
FIG. 18 is a diagram illustrating a relation between an oxygen content and a discharge capacity retention ratio/a swollenness ratio.

A procedure similar to that of Example 1-5 was executed, except that the oxygen content in the anode active material particles was changed as illustrated in Table 7. The cycle characteristics and the swollenness characteristics for the secondary batteries of Examples 7-1 to 7-9 were examined. The results illustrated in Table 7 and FIG. 18 were obtained.

Examples 8-1 to 8-16

A procedure similar to that of Example 1-5 was executed, except that the anode active material had a metal element illustrated in Table 8 and Table 9. In this case, in forming the anode active material layer 54B, by depositing each metal together with silicon, the content of the metal element in the

TABLE 7

| | Anode active material layer | | | | | | | | Discharge | |
|---|---|---|---|---|---|---|---|---|---|---|
| | Spherical particle | | | | | Crystal state | | | capacity | |
| | Presence | Number of particles (pcs) | Particle diameter (μm) | Circularity degree | Planular particle | Type | Half-width (deg) | Crystallite size (nm) | Oxygen content (atomic %) | retention ratio (%) | Swollenness ratio (%) |
| Example 7-1 | Present | 15 | 5 | 0.95 | Present | Crystalline | 1 | 40 | 0.5 | 78 | 0.3 |
| Example 7-2 | | | | | | | | | 1 | 79 | 0.3 |
| Example 7-3 | | | | | | | | | 1.5 | 80 | 0.3 |
| Example 7-4 | | | | | | | | | 2 | 82 | 0.3 |
| Example 1-5 | | | | | | | | | 5 | 84 | 0.3 |
| Example 7-5 | | | | | | | | | 10 | 84 | 0.3 |
| Example 7-6 | | | | | | | | | 20 | 85 | 0.3 |
| Example 7-7 | | | | | | | | | 30 | 85 | 0.3 |
| Example 7-8 | | | | | | | | | 40 | 86 | 0.3 |
| Example 7-9 | | | | | | | | | 45 | 86 | 0.3 |
| Example 1-10 | Not present | — | — | — | Present | Crystalline | 1 | 40 | 5 | 82 | 3.2 |

Battery structure: laminated film type; cathode active material: LiCoO$_2$; anode active material: Si (spraying method); and ten point height of roughness profile Rz of anode current collector: 4 μm In Examples 7-1 to 7-9 in which the plurality of anode active material particles contained the spherical particle, even in the case where the oxygen content was changed, the discharge capacity retention ratio of about 80% or more and the swollenness ratio of about 1% or less were obtained anode active material particles was set to 5 atomic %. The cycle characteristics and the swollenness characteristics for the secondary batteries of Examples 8-1 to 8-16 were examined. The results illustrated in Table 8 and Table 9 were obtained.

TABLE 8

| | Anode active material layer | | | | | | | | | Discharge | |
|---|---|---|---|---|---|---|---|---|---|---|---|
| | Spherical particle | | | | Crystal state | | | Metal element | | capacity | |
| | Presence | Number of particles (pcs) | Particle diameter (μm) | Circularity degree | Planular particle | Type | Half-width (deg) | Crystallite size (nm) | Type | Content (atomic %) | retention ratio (%) | Swollenness ratio (%) |
| Example 1-5 | Present | 15 | 5 | 0.95 | Present | Crystalline | 1 | 40 | — | — | 84 | 0.3 |
| Example 8-1 | | | | | | | | | Fe | 5 | 84 | 0.3 |
| Example 8-2 | | | | | | | | | Ni | | 84 | 0.3 |
| Example 8-3 | | | | | | | | | Mo | | 85 | 0.3 |
| Example 8-4 | | | | | | | | | Ti | | 84 | 0.3 |
| Example 8-5 | | | | | | | | | Cr | | 85 | 0.3 |
| Example 8-6 | | | | | | | | | Co | | 85 | 0.3 |
| Example 8-7 | | | | | | | | | Cu | | 84 | 0.3 |
| Example 8-8 | | | | | | | | | Mn | | 84 | 0.3 |
| Example 8-9 | | | | | | | | | Zn | | 85 | 0.3 |
| Example 8-10 | | | | | | | | | Ge | | 85 | 0.3 |
| Example 8-11 | | | | | | | | | Al | | 85 | 0.3 |
| Example 8-12 | | | | | | | | | Zr | | 84 | 0.3 |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

TABLE 9

| | Anode active material layer | | | | | | | | | Discharge | |
|---|---|---|---|---|---|---|---|---|---|---|---|
| | Spherical particle | | | | Crystal state | | | Metal element | | capacity | |
| | Presence | Number of particles (pcs) | Particle diameter (μm) | Circularity degree | Planular particle | Type | Half-width (deg) | Crystallite size (nm) | Type | Content (atomic %) | retention ratio (%) | Swollenness ratio (%) |
| Example 8-13 | Present | 15 | 5 | 0.95 | Present | Crystalline | 1 | 40 | Ag | 5 | 84 | 0.3 |
| Example 8-14 | | | | | | | | | Sn | | 85 | 0.3 |
| Example 8-15 | | | | | | | | | Sb | | 85 | 0.3 |
| Example 8-16 | | | | | | | | | W | | 85 | 0.3 |
| Example 1-10 | Not present | — | — | — | Present | Crystalline | 1 | 40 | — | — | 82 | 3.2 |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

In Examples 8-1 to 8-16 in which the plurality of anode active material particles contained the spherical particle, even in the case where the anode active material particles had the metal element, the discharge capacity retention ratio of about 80% or more and the swollenness ratio of about 1% or less were obtained compared to in Example 1-10 in which the plurality of anode active material particles did not contain the spherical particle. In particular, in the case where the anode active material particles had the metal element, the discharge capacity retention ratio was higher than that of the case in which the anode active material particles did not have the metal element, while the swollenness ratio was equal to that of the case in which the anode active material particles did not have the metal element. Accordingly, in the case where the anode active material particles have the metal element, cycle characteristics are further improved.

Examples 9-1 to 9-3

Figure 19:
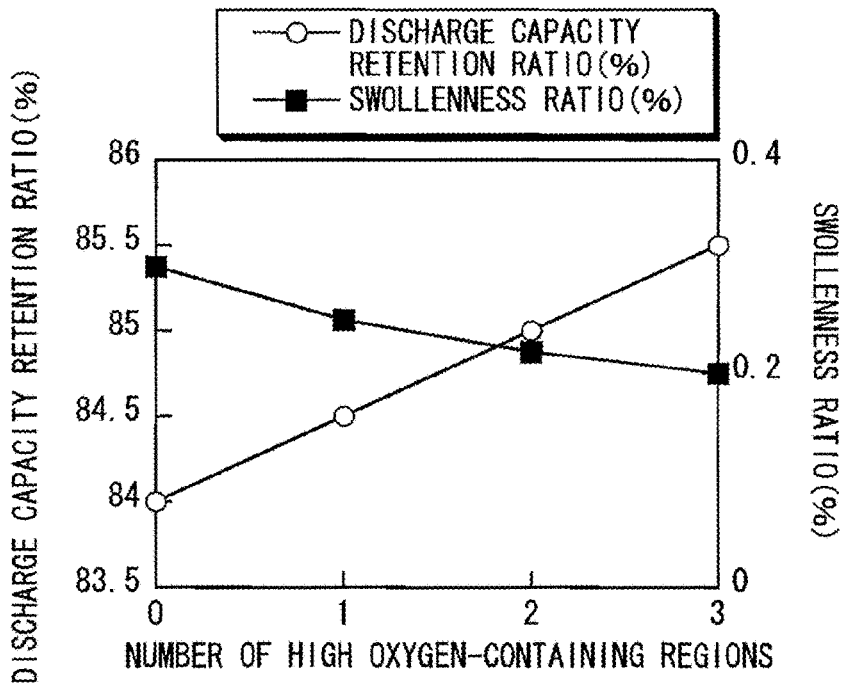
FIG. 19 is a diagram illustrating a relation between the number of high oxygen-containing regions and a discharge capacity retention ratio/a swollenness ratio.

A procedure similar to that of Example 1-5 was executed, except that the anode active material layer 54B was formed so that the high oxygen-containing region was sandwiched between the low oxygen-containing regions, and the high oxygen-containing region and the low oxygen-containing region were alternately layered. In this case, the number of high oxygen-containing regions was set as illustrated in Table 10. The cycle characteristics and the swollenness characteristics for the secondary batteries of Examples 9-1 to 9-3 were examined. The results illustrated in Table 10 and FIG. 19 were obtained.

TABLE 10

| | Anode active material layer | | | | | | | | Number of high oxygen-containing regions | Discharge capacity | |
|---|---|---|---|---|---|---|---|---|---|---|---|
| | Spherical particle | | | | Crystal state | | | | | | |
| | Presence | Number of particles (pcs) | Particle diameter (μm) | Circularity degree | Planular particle | Type | Half-width (deg) | Crystallite size (nm) | | retention ratio (%) | Swollenness ratio (%) |
| Example 1-5 | Present | 15 | 5 | 0.95 | Present | Crystalline | 1 | 40 | — | 84 | 0.3 |
| Example 9-1 | | | | | | | | | 1 | 84.5 | 0.25 |

TABLE 10-continued

| | Anode active material layer | | | | | | | | | |
|---|---|---|---|---|---|---|---|---|---|---|
| | Spherical particle | | | | Crystal state | | | Number of high oxygen-containing regions | Discharge capacity retention ratio (%) | Swollenness ratio (%) |
| | Presence | Number of particles (pcs) | Particle diameter (μm) | Circularity degree | Planular particle | Type | Half-width (deg) | Crystallite size (nm) | | | |
| Example 9-2 | | | | | | | | | 2 | 85 | 0.22 |
| Example 9-3 | | | | | | | | | 3 | 85 | 0.2 |
| Example 1-10 | Not present | — | — | — | Present | Crystalline | 1 | 40 | — | 82 | 3.2 |

Battery structure: laminated film type; cathode active material: LiCoO$_2$; anode active material: Si (spraying method); ten point height of roughness profile Rz of anode current collector: 4 μm; and oxygen content in anode active material particles: 5 atomic %

In Examples 9-1 to 9-3 in which the plurality of anode active material particles contained the spherical particle, even in the case where the anode active material layer 54B had the high oxygen-containing region and the low oxygen-containing region, the discharge capacity retention ratio of about 80% or more and the swollenness ratio of about 1% or less were obtained compared to in Example 1-10 in which the plurality of anode active material particles did not contain the spherical particle. In particular, in the case where the anode active material layer 54B had the high oxygen-containing region and the low oxygen-containing region, the discharge capacity retention ratio was increased and the swollenness ratio was decreased than in the case in which the anode active material layer 54B did not have the high oxygen-containing region and the low oxygen-containing region. In this case, as the number of high oxygen-containing regions was increased, the discharge capacity retention ratio was increased and the swollenness ratio was decreased. Accordingly, in the case where the anode active material layer 54B had the high oxygen-containing region and the low oxygen-containing region, the cycle characteristics and the swollenness characteristics are further improved.

Examples 10-1 to 10-13

Figure 20:
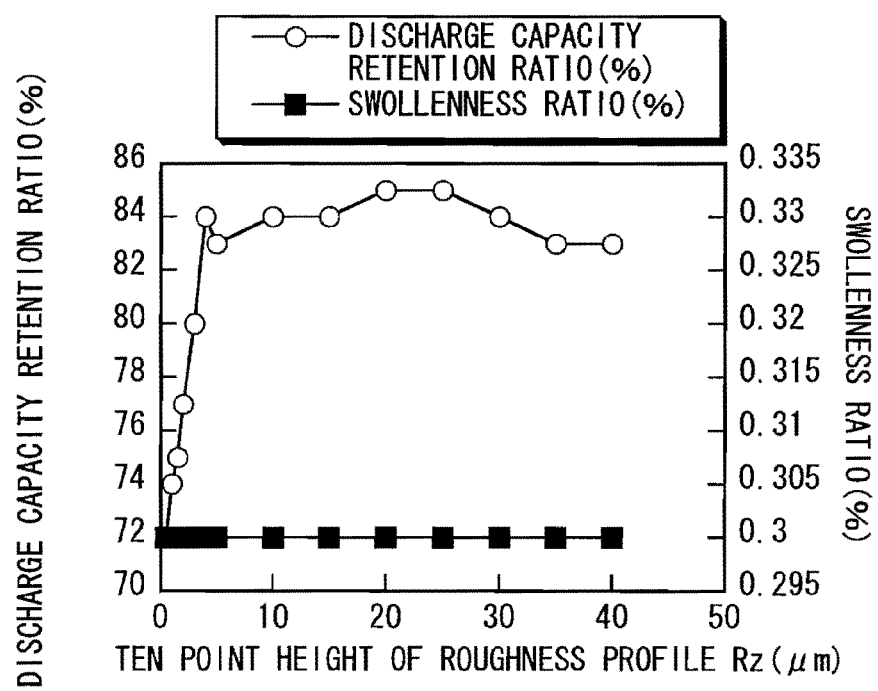
FIG. 20 is a diagram illustrating a relation between a ten point height of roughness profile Rz and a discharge capacity retention ratio/a swollenness ratio.

A procedure similar to that of Example 1-5 was executed, except that the ten point height of roughness profile Rz of the surface of the anode current collector 54A was changed as illustrated in Table 11. The cycle characteristics and the swollenness characteristics for the secondary batteries of Examples 10-1 to 10-13 were examined. The results illustrated in Table 11 and FIG. 20 were obtained.

TABLE 11

| | Anode active material layer | | | | | | | | Anode current collector Ten point height of roughness profile Rz (μm) | Discharge capacity retention ratio (%) | Swollenness ratio (%) |
|---|---|---|---|---|---|---|---|---|---|---|---|
| | Spherical particle | | | | Crystal state | | | | | | |
| | Presence | Number of particles (pcs) | Particle diameter (μm) | Circularity degree | Planular particle | Type | Half-width (deg) | Crystallite size (nm) | | | |
| Example 10-1 | Present | 15 | 5 | 0.95 | Present | Crystalline | 1 | 40 | 0.5 | 72 | 0.3 |
| Example 10-2 | | | | | | | | | 1 | 74 | 0.3 |
| Example 10-3 | | | | | | | | | 1.5 | 75 | 0.3 |
| Example 10-4 | | | | | | | | | 2 | 77 | 0.3 |
| Example 10-5 | | | | | | | | | 3 | 80 | 0.3 |
| Example 1-5 | | | | | | | | | 4 | 84 | 0.3 |
| Example 10-6 | | | | | | | | | 5 | 83 | 0.3 |
| Example 10-7 | | | | | | | | | 10 | 84 | 0.3 |
| Example 10-8 | | | | | | | | | 15 | 84 | 0.3 |
| Example 10-9 | | | | | | | | | 20 | 85 | 0.3 |
| Example 10-10 | | | | | | | | | 25 | 85 | 0.3 |
| Example 10-11 | | | | | | | | | 30 | 84 | 0.3 |
| Example 10-12 | | | | | | | | | 35 | 83 | 0.3 |
| Example 10-13 | | | | | | | | | 40 | 83 | 0.3 |
| Example 1-10 | Not present | — | — | — | Present | Crystalline | 1 | 40 | 4 | 82 | 3.2 |

Battery structure: laminated film type; cathode active material: LiCoO$_2$; anode active material: Si (spraying method); and oxygen content in anode active material particles: 5 atomic %

In Examples 10-1 to 10-13 in which the plurality of anode active material particles contained the spherical particle, even in the case where the ten point height of roughness profile Rz was changed, the discharge capacity retention ratio of about 70% or more and the swollenness ratio of about 1% or less were obtained compared to in Example 1-10 in which the plurality of anode active material particles did not contain the spherical particle. In particular, in the case where the plurality of anode active material particles contained the spherical particle, there was a tendency that as the ten point height of roughness profile Rz was increased, the discharge capacity retention ratio was increased and then decreased while the swollenness ratio was constant. In this case, in the case where the ten point height of roughness profile Rz was 1.5 μm or more, or preferably from 3 μm to 30 μm both inclusive, the discharge capacity retention ratio was more increased, and a sufficient battery capacity was obtained. Accordingly, in the case where the ten point height of roughness profile Rz of the surface of the anode current collector 2A is 1.5 μm or more, preferably from 3 μm to 30 μm both inclusive, the cycle characteristics are further improved.

Examples 11-1 to 11-8

A procedure similar to that of Example 1-5 was executed, except that the composition of the electrolytic solution was changed as illustrated in Table 12 and Table 13. In this case, as a solvent, 4-fluoro-1,3-dioxole-2-one (FEC) as a cyclic ester carbonate having halogen shown in Formula 2 or 4,5-difluoro-1,3-dioxolane-2-one (DFEC) as a cyclic ester carbonate having halogen shown in Formula 2 was used. Further, as other solvent, vinylene carbonate (VC) as a cyclic ester carbonate having an unsaturated carbon bond shown in Formula 3 or vinylethylene carbonate (VEC) as a cyclic ester carbonate having an unsaturated carbon bond shown in Formula 4 was used. Further, as an electrolyte salt, lithium tetrafluoroborate ($LiBF_4$) was used. In addition, as other solvent, propene sultone (PRS) as sultone was used. Further, sulfobenzoic anhydride (SBAH) as an acid anhydride or sulfopropionic anhydride (SPAH) as an acid anhydride was used. In this case, the content of other solvent in the solvent was 1 wt %. The cycle characteristics and the swollenness characteristics for the secondary batteries of Examples 11-1 to 11-8 were examined. The results illustrated in Table 12 and Table 13 were obtained.

TABLE 12

| | Anode active material layer | | | | | | | |
|---|---|---|---|---|---|---|---|---|
| | Spherical particle | | | | | Crystal state | | |
| | Presence | Number of particles (pcs) | Particle diameter (μm) | Circularity degree | Planular particle | Type | Half-width (deg) | Crystallite size (nm) |
| Example 1-5 | Present | 15 | 5 | 0.95 | Present | Crystalline | 1 | 40 |
| Example 11-1 | | | | | | | | |
| Example 11-2 | | | | | | | | |
| Example 11-3 | | | | | | | | |
| Example 11-4 | | | | | | | | |
| Example 11-5 | | | | | | | | |
| Example 11-6 | | | | | | | | |
| Example 11-7 | | | | | | | | |
| Example 11-8 | | | | | | | | |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

TABLE 13

| | Electrolytic solution | | | | | | Discharge | |
|---|---|---|---|---|---|---|---|---|
| | Solvent (weight ratio) | | | | Electrolyte salt | Other | capacity retention | Swollenness ratio |
| | EC | FEC | DFEC | DEC | (mol/kg) | solvent | ratio (%) | (%) |
| Example 1-5 | 50 | — | — | 50 | $LiPF_6$: 1 | — | 84 | 0.3 |
| Example 11-1 | — | 50 | — | 50 | | | 85 | 0.3 |
| Example 11-2 | 25 | — | 5 | 70 | | | 86 | 0.3 |
| Example 11-3 | — | 50 | — | 50 | $LiPF_6$: 0.9 + $LiBF_4$: 0.1 | | 86 | 0.3 |
| Example 11-4 | | | | | $LiPF_6$: 1 | VC | 86 | 0.3 |
| Example 11-5 | | | | | | VEC | 86 | 0.3 |
| Example 11-6 | | | | | | PRS | 85 | 0.2 |
| Example 11-7 | | | | | | SBAH | 85 | 0.25 |
| Example 11-8 | | | | | | SPAH | 85 | 0.23 |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

In Examples 11-1 to 11-8 in which FEC or the like was added as a solvent and other solvent and $LiBF_4$ was added as an electrolyte salt, the discharge capacity retention ratio was increased than in Example 1-5 in which FEC or the like and $LiBF_4$ were not added, while the swollenness ratio was equal to that of Example 1-5. Further, in Examples 11-6 to 11-8 in which PRS or the like was added, the swollenness ratio was decreased than in Example 1-5 in which PRS or the like was not added. Accordingly, in the case where as a solvent, a chain ester carbonate or a cyclic ester carbonate having halogen, a cyclic ester carbonate having an unsaturated carbon bond, sultone, or an acid anhydride is used, the cycle characteristics are improved. Further, in the case where lithium tetrafluoroborate is used as an electrolyte salt, the cycle characteristics are further improved. Further, in the case where sultone or an acid anhydride is used as a solvent, the swollenness characteristics are improved.

Examples 12-1 to 12-4

A procedure similar to that of Example 1-5 was executed, except that a lithium-nickel composite oxide illustrated in Table 14 was used as a cathode active material. In this case, as a lithium-nickel composite oxide, $LiNi_{0.70}Co_{0.25}Al_{0.05}O_2$, $LiNi_{0.79}Co_{0.14}Mn_{0.07}O_2$, $LiNi_{0.70}Co_{0.25}Mg_{0.05}O_2$, or $LiNi_{0.70}CO_{0.25}Fe_{0.05}O_2$ was used. The cycle characteristics and the swollenness characteristics for the secondary batteries of Examples 12-1 to 12-4 were examined. The results illustrated in Table 14 were obtained.

was used, the discharge capacity retention ratio was increased than that of Example 1-5. Accordingly, in the case where the lithium-nickel-cobalt composite oxide is used as a cathode active material, the cycle characteristics are further improved.

Examples 13-1 and 13-2

A procedure similar to that of Example 1-5 was executed, except that the square type secondary battery was fabricated. In fabricating the secondary battery, first, the cathode 21 and the anode 22 were formed. After that, the cathode lead 24 made of aluminum was welded to the cathode current collector 21A, and the anode lead 25 made of nickel was welded to the anode current collector 22A. Subsequently, the cathode 21, the separator 23, and the anode 22 were layered in this order and spirally wound in the longitudinal direction. After that, the spirally wound laminated body was formed into the planular shape to form the battery element 20. Subsequently, the battery element 20 was contained in the battery can 11 made of the materials illustrated in Table 15. After that, the insulating plate 12 was arranged on the battery element 20. Subsequently, the cathode lead 24 was welded to the cathode pin 15, and the anode lead 25 was welded to the battery can 11. After that, the battery cover 13 was laser-welded to the open end of the battery can 11. Finally, after an electrolytic solution was injected into the battery can 11 from the injection hole 19, the injection hole 19 was sealed by the sealing member 19A. The square

TABLE 14

| | Anode active material layer | | | | | | | Cathode active | Discharge | |
| | Spherical particle | | | | Crystal state | | | material layer | capacity | Swollen- |
| | Presence | Number of particles (pcs) | Particle diameter (μm) | Circularity degree | Planular particle | Type | Half-width (deg) | Crystallite size (nm) | Cathode active material | retention ratio (%) | ness ratio (%) |
|---|---|---|---|---|---|---|---|---|---|---|---|
| Example 1-5 | Present | 15 | 5 | 0.95 | Present | Crystalline | 1 | 40 | $LiCoO_2$ | 84 | 0.3 |
| Example 12-1 | | | | | | | | | $LiNi_{0.70}Co_{0.25}Al_{0.05}O_2$ | 88 | 0.3 |
| Example 12-2 | | | | | | | | | $LiNi_{0.79}Co_{0.14}Al_{0.07}O_2$ | 88 | 0.3 |
| Example 12-3 | | | | | | | | | $LiNi_{0.70}Co_{0.25}Mg_{0.05}O_2$ | 87 | 0.3 |
| Example 12-4 | | | | | | | | | $LiNi_{0.70}Co_{0.25}Fe_{0.05}O_2$ | 87 | 0.3 |

Battery structure: laminated film type; anode active material: Si (spraying method); ten point height of roughness profile Rz of anode current collector: 4 μm; and oxygen content in anode active material particles: 5 atomic %

In Examples 12-1 to 12-4 in which the lithium-nickel-cobalt composite oxides were used as a cathode active material, while the swollenness ratio was equal to that of Example 1-5 in which the lithium-cobalt composite oxide battery was thereby completed. The cycle characteristics and the swollenness characteristics for the secondary batteries of Examples 13-1 and 13-2 were examined. The results illustrated in Table 15 were obtained.

TABLE 15

| | Anode active material layer | | | | | | | | Discharge | |
| | Spherical particle | | | | Crystal state | | | | capacity | Swollen- |
| | Presence | Number of particles (pcs) | Particle diameter (μm) | Circularity degree | Planular particle | Type | Half-width (deg) | Crystallite size (nm) | Battery structure | retention ratio (%) | ness ratio (%) |
|---|---|---|---|---|---|---|---|---|---|---|---|
| Example 1-5 | Present | 15 | 5 | 0.95 | Present | Crystalline | 1 | 40 | Laminated film type | 84 | 0.3 |
| Example 13-1 | | | | | | | | | Square type (Al) | 85 | 0.2 |
| Example 13-2 | | | | | | | | | Square type (Fe) | 87 | 0.1 |

Battery structure: laminated film type; cathode active material: $LiCoO_2$; anode active material: Si (spraying method); ten point height of roughness profile Rz of anode current collector: 4 μm; and oxygen content in anode active material particles: 5 atomic %

In Examples 13-1 and 13-2 in which the battery structure was square type, the discharge capacity retention ratio was increased and the swollenness ratio was decreased than in Example 1-5 in which the battery structure was laminated film type. Further, in the case of the square type in which the battery can 11 was made of iron, the discharge capacity retention ratio was more increased and the swollenness ratio was more decreased. Accordingly, in the case where the battery structure is the square type, the cycle characteristics and the swollenness characteristics are further improved.

Examples 14-1 to 14-18

A procedure similar to that of Example 8-1 was executed, except that, as illustrated in Table 16 and Table 17, the composition of the anode active material particles (the crystallite size and the metal element content) was changed and a metal layer was formed. In forming the anode active material layer 54B, a step of forming the plurality of anode active material particles by using spraying method and then forming the metal layer by using electrolytic plating method was repeated several times. In this case, an iron plating solution, Japan Pure Chemical Co., Ltd. make was used as a plating solution, the current density was from 2 A/dm$^2$ to 5 A/dm$^2$ both inclusive, and the plating rate was 5 nm/sec. Further, the concentration and the plating time of the plating solution were adjusted to change the thickness of the metal layer. The cycle characteristics for the secondary batteries of Examples 14-1 to 14-8 were examined. The results illustrated in Table 16 and Table 17 were obtained.

TABLE 16

| | Anode active material layer | | | | | | | | | | | Discharge |
|---|---|---|---|---|---|---|---|---|---|---|---|---|
| | Spherical particle | | | | | Crystal state | | | | | | capacity |
| | | | | | | Half- | Crystal-lite | | Metal element | | Metal layer | retention |
| | | Number of particles | Particle diameter | Circular-ity | Planular | | width | size | | Content (atomic | | Thickness | ratio |
| | Presence | (pcs) | (μm) | degree | particle | Type | (deg) | (nm) | Type | %) | Type | (m) | (%) |
| Example 14-1 | Present | 15 | 5 | 0.95 | Present | Crystalline | 1 | 35 | Fe | 0.3 | Fe | 0.5 | 75 |
| Example 14-2 | | | | | | | | | | | | 1 | 80 |
| Example 14-3 | | | | | | | | | | | | 5 | 80.1 |
| Example 14-4 | | | | | | | | | | | | 10 | 80.3 |
| Example 14-5 | | | | | | | | | | | | 50 | 80.5 |
| Example 14-6 | | | | | | | | | | | | 100 | 80.7 |
| Example 14-7 | | | | | | | | | | | | 200 | 81 |
| Example 14-8 | | | | | | | | | | | | 300 | 81.2 |
| Example 14-9 | | | | | | | | | | | | 500 | 81.5 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

TABLE 17

| | Anode active material layer | | | | | | | | | | | Discharge |
|---|---|---|---|---|---|---|---|---|---|---|---|---|
| | Spherical particle | | | | | Crystal state | | | | | | capacity |
| | | | | | | Half- | Crystal-lite | | Metal element | | Metal layer | retention |
| | | Number of particles | Particle diameter | Circular-ity | Planular | | width | size | | Content (atomic | | Thickness | ratio |
| | Presence | (pcs) | (μm) | degree | particle | Type | (deg) | (nm) | Type | %) | Type | (m) | (%) |
| Example 14-10 | Present | 15 | 5 | 0.95 | Present | Crystalline | 1 | 35 | Fe | 0.3 | Fe | 1000 | 81..8 |
| Example 14-11 | | | | | | | | | | | | 5000 | 81.9 |
| Example 14-12 | | | | | | | | | | | | 10000 | 82 |
| Example 14-13 | | | | | | | | | | | | 15000 | 82.2 |
| Example 14-14 | | | | | | | | | | | | 20000 | 82.3 |
| Example 14-15 | | | | | | | | | | | | 30000 | 82.4 |
| Example 14-16 | | | | | | | | | | | | 40000 | 82.6 |
| Example 14-17 | | | | | | | | | | | | 50000 | 82.6 |
| Example 14-18 | Present | 15 | 5 | 0.95 | Present | Crystalline | 1 | 35 | Fe | 0.3 | — | — | 65 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

In Examples 14-1 to 14-17 in which the metal layer was formed, the discharge capacity retention ratio was increased than in Example 14-8 in which the metal layer was not formed. Such a result showed that in the case where the metal layer was formed, the anode active material particles are bonded with the metal layer in between, the electrolytic solution was protected from the anode active material particles by the metal layer. In particular, there was a tendency that as the thickness of the metal layer was increased, the discharge capacity retention ratio was increased. In this case, in the case where the thickness was from 1 nm to 30000 nm both inclusive, the discharge capacity retention ratio was increased and a sufficient battery capacity was obtained. Accordingly, in the case where the metal layer is formed, cycle characteristics are further improved. In addition, in the case where the thickness of the metal layer was from 1 nm to 30000 nm both inclusive, a superior battery capacity and superior cycle characteristics are obtained.

Examples 15-1 to 15-19

A procedure similar to that of Examples 14-1 to 14-17 was executed, except that the formation material and the thickness of the metal layer were changed as illustrated in Table 18 and Table 19. In forming the metal layer, a copper plating solution, a nickel plating solution, a cobalt plating solution, a zinc plating solution, and a chromium plating solution, Japan Pure Chemical Co., Ltd. make were used as a plating solution, and the plating rate was 5 nm/sec. Further, the current density was from 2 A/dm$^2$ to 8 A/dm$^2$ both inclusive in the copper plating solution, from 2 A/dm$^2$ to 10 A/dm$^2$ both inclusive in the nickel plating solution, from 1 A/dm$^2$ to 8 A/dm$^2$ both inclusive in the cobalt plating solution, from 1 A/dm$^2$ to 3 A/dm$^2$ both inclusive in the zinc plating solution, and from 2 A/dm$^2$ to 6 A/dm$^2$ both inclusive in the chromium plating solution. The cycle characteristics for the secondary batteries of Examples 15-1 to 15-19 were examined. The results illustrated in Table 18 and Table 19 were obtained.

In Examples 15-1 to 15-19 in which the formation material of the metal layer was changed, the discharge capacity retention ratio was higher than that of Example 14-18 in which the metal layer was not formed. Accordingly, in the case where the formation material of the metal layer is changed, the cycle characteristics are further improved.

Examples 16-1 to 16-25

A procedure similar to that of Examples 14-7 was executed, except that iron was not contained in the anode active material particles, or the iron content in the anode active material particles was changed, or metal element type contained in the anode active material particles was changed as illustrated in Table 20 and Table 21. The cycle characteristics for the secondary batteries of Examples 16-1 to 16-25 were examined. The results illustrated in Table 20 and Table 21 were obtained.

TABLE 18

| | Anode active material layer | | | | | | | | | | Discharge |
|---|---|---|---|---|---|---|---|---|---|---|---|
| | Spherical particle | | | | Crystal state | | | Metal element | | Metal layer | capacity |
| | Presence | Number of particles (pcs) | Particle diameter (μm) | Circular-ity degree | Planular particle | Type | Half-width (deg) | Crystal-lite size (nm) | Type | Content (atomic %) | Type | Thickness (m) | retention ratio (%) |
|---|---|---|---|---|---|---|---|---|---|---|---|---|---|
| Example 15-1 | Present | 15 | 5 | 0.95 | Present | Crystalline | 1 | 35 | Fe | 0.3 | Cu | 0.5 | 73 |
| Example 15-2 | | | | | | | | | | | | 100 | 80 |
| Example 15-3 | | | | | | | | | | | | 200 | 80.5 |
| Example 15-4 | | | | | | | | | | | | 500 | 81 |
| Example 15-5 | | | | | | | | | | | | 15000 | 81.6 |
| Example 15-6 | | | | | | | | | | | Ni | 0.5 | 74 |
| Example 15-7 | | | | | | | | | | | | 100 | 80.2 |
| Example 15-8 | | | | | | | | | | | | 200 | 80.6 |
| Example 15-9 | | | | | | | | | | | | 500 | 81.2 |
| Example 15-10 | | | | | | | | | | | | 15000 | 81.9 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

TABLE 19

| | Anode active material layer | | | | | | | | | | Discharge |
|---|---|---|---|---|---|---|---|---|---|---|---|
| | Spherical particle | | | | Crystal state | | | Metal element | | Metal layer | capacity |
| | Presence | Number of particles (pcs) | Particle diameter (μm) | Circular-ity degree | Planular particle | Type | Half-width (deg) | Crystal-lite size (nm) | Type | Content (atomic %) | Type | Thickness (m) | retention ratio (%) |
|---|---|---|---|---|---|---|---|---|---|---|---|---|---|
| Example 15-11 | Present | 15 | 5 | 0.95 | Present | Crystalline | 1 | 35 | Fe | 0.3 | Co | 0.5 | 74 |
| Example 15-12 | | | | | | | | | | | | 100 | 80.3 |
| Example 15-13 | | | | | | | | | | | | 200 | 80.5 |
| Example 15-14 | | | | | | | | | | | | 500 | 81.4 |
| Example 15-15 | | | | | | | | | | | | 15000 | 82.1 |
| Example 15-16 | | | | | | | | | | | Zn | 0.5 | 72 |
| Example 15-17 | | | | | | | | | | | | 200 | 79 |
| Example 15-18 | | | | | | | | | | | Cr | 0.5 | 73 |
| Example 15-19 | | | | | | | | | | | | 200 | 80 |
| Example 14-18 | Present | 15 | 5 | 0.95 | Present | Crystalline | 1 | 35 | Fe | 0.3 | — | — | 65 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

TABLE 20

| | Anode active material layer | | | | | | | | | | | Discharge capacity retention ratio (%) |
|---|---|---|---|---|---|---|---|---|---|---|---|---|
| | Spherical particle | | | | | Crystal state | | | Metal element | | Metal layer | |
| | Presence | Number of particles (pcs) | Particle diameter (μm) | Circularity degree | Planular particle | Type | Half-width (deg) | Crystallite size (nm) | Type | Content (atomic %) | Type | Thickness (m) | |
| Example 16-1 | Present | 15 | 5 | 0.95 | Present | Crystalline | 1 | 35 | — | — | Fe | 200 | 80 |
| Example 16-2 | | | | | | | | | Fe | 0.05 | | | 80.1 |
| Example 16-3 | | | | | | | | | | 0.1 | | | 80.3 |
| Example 16-4 | | | | | | | | | | 0.2 | | | 81 |
| Example 14-7 | | | | | | | | | | 0.3 | | | 81 |
| Example 16-5 | | | | | | | | | | 0.5 | | | 81.2 |
| Example 16-6 | | | | | | | | | | 0.7 | | | 81.3 |
| Example 16-7 | | | | | | | | | | 1 | | | 81.5 |
| Example 16-8 | | | | | | | | | | 1.3 | | | 81.6 |
| Example 16-9 | | | | | | | | | | 1.8 | | | 81.8 |
| Example 16-10 | | | | | | | | | | 2.3 | | | 81.9 |
| Example 16-11 | | | | | | | | | | 3.3 | | | 82 |
| Example 16-12 | | | | | | | | | | 4.8 | | | 82.1 |
| Example 16-13 | | | | | | | | | | 5.3 | | | 82.1 |

Battery structure: laminated film type; cathode active material: $LiCoO_2$; anode active material: Si (spraying method); ten point height of roughness profile Rz of anode current collector: 5 μm; and oxygen content in anode active material particles: 5 atomic %

TABLE 21

| | Anode active material layer | | | | | | | | | | | Discharge capacity retention ratio (%) |
|---|---|---|---|---|---|---|---|---|---|---|---|---|
| | Spherical particle | | | | | Crystal state | | | Metal element | | Metal layer | |
| | Presence | Number of particles (pcs) | Particle diameter (μm) | Circularity degree | Planular particle | Type | Half-width (deg) | Crystallite size (nm) | Type | Content (atomic %) | Type | Thickness (m) | |
| Example 16-14 | Present | 15 | 5 | 0.95 | Present | Crystalline | 1 | 35 | Fe | 6.8 | Fe | 200 | 82 |
| Example 16-15 | | | | | | | | | | 8.8 | | | 81.4 |
| Example 16-16 | | | | | | | | | Al | 0.3 | | | 80.5 |
| Example 16-17 | | | | | | | | | Ca | | | | 80.6 |
| Example 16-18 | | | | | | | | | Cr | | | | 80.4 |
| Example 16-19 | | | | | | | | | Mg | | | | 80.6 |
| Example 16-20 | | | | | | | | | Mn | | | | 80.7 |
| Example 16-21 | | | | | | | | | Ni | | | | 80.6 |
| Example 16-22 | | | | | | | | | K | | | | 80.5 |
| Example 16-23 | | | | | | | | | Cu | | | | 80.7 |
| Example 16-24 | | | | | | | | | Ti | | | | 80.8 |
| Example 16-25 | | | | | | | | | Fe + Al + Ca | 0.2 + 0.07 + 0.03 | | | 84 |
| Example 14-18 | Present | 15 | 5 | 0.95 | Present | Crystalline | 1 | 35 | Fe | 0.3 | — | — | 65 |

Battery structure: laminated film type; cathode active material: $LiCoO_2$; anode active material: Si (spraying method); ten point height of roughness profile Rz of anode current collector: 5 μm; and oxygen content in anode active material particles: 5 atomic %

In Examples 16-1 to 16-25 in which the composition of the metal element contained in the anode active material particles was changed, the discharge capacity retention ratio was higher than that of Example 14-18 in which the metal layer was not formed. Accordingly, even in the case where the composition of the metal element contained in the anode active material is changed, the cycle characteristics are further improved.

Examples 17-1 to 17-13

A procedure similar to that of Example 14-7 was executed, except that the half-width and the crystallite size were changed as illustrated in Table 22. The cycle characteristics for the secondary batteries of Examples 17-1 to 17-13 were examined. The results illustrated in Table 22 were obtained.

TABLE 22

| | Anode active material layer | | | | | | | | | | | | Discharge capacity retention ratio (%) |
|---|---|---|---|---|---|---|---|---|---|---|---|---|---|
| | Spherical particle | | | | Crystal state | | | Metal element | | Metal layer | | | |
| | Presence | Number of particles (pcs) | Particle diameter (μm) | Circular-ity degree | Planular particle | Type | Half-width (deg) | Crystal-lite size (nm) | Type | Content (atomic %) | Type | Thickness (m) | |
| Example 17-1 | Present | 15 | 5 | 0.95 | Present | Crystalline | 0.4 | 130 | Fe | 0.3 | Fe | 200 | 81.9 |
| Example 17-2 | | | | | | | 0.5 | 115 | | | | | 81.6 |
| Example 17-3 | | | | | | | 0.6 | 100 | | | | | 81.6 |
| Example 17-4 | | | | | | | 0.7 | 70 | | | | | 81.3 |
| Example 17-5 | | | | | | | 0.8 | 50 | | | | | 81.1 |
| Example 17-6 | | | | | | | 0.9 | 40 | | | | | 81 |
| Example 14-7 | | | | | | | 1 | 35 | | | | | 81 |
| Example 17-7 | | | | | | | 2 | 30 | | | | | 80.9 |
| Example 17-8 | | | | | | | 3 | 25 | | | | | 80.7 |
| Example 17-9 | | | | | | | 5 | 20 | | | | | 80.5 |
| Example 17-10 | | | | | | | 12 | 15 | | | | | 80.4 |
| Example 17-11 | | | | | | | 20 | 10 | | | | | 80.2 |
| Example 17-12 | | | | | | | 21 | 7.5 | | | | | 80.1 |
| Example 17-13 | | | | | | | 23 | 5 | | | | | 80 |

Battery structure: laminated film type; cathode active material: $LiCoO_2$; anode active material: Si (spraying method); ten point height of roughness profile Rz of anode current collector: 5 μm; and oxygen content in anode active material particles: 5 atomic %

In Examples 17-1 to 17-13 in which the metal layer was formed, in the case where the half-width was 20 degree or less and the crystallite size was 10 nm or more, the discharge capacity retention ratio was more increased. Accordingly, even in the case where the metal layer is formed, if the half-width of the diffraction peak in (111) crystal plane of the anode active material particles obtained by X-ray diffraction is 20 degree or less and the crystallite size is 10 nm or more, the cycle characteristics are further improved.

Examples 18-1 to 18-3

A procedure similar to that of Examples 14-6, 14-7, and 14-9 was executed, except that the nonspherical particle did not contain the planular particle. The cycle characteristics for the secondary batteries of Examples 18-1 to 18-3 were examined. The results illustrated in Table 23 were obtained.

In Examples 18-1 to 18-3 in which the nonspherical particles did not contain the planular particle, the discharge capacity retention ratio was higher than that of Example 14-18 in which the metal layer was not formed. Accordingly, even in the case where the metal layer is formed, if the nonspherical particle contained the planular particle, the cycle characteristics are further improved.

Examples 19-1 to 19-9

A procedure similar to that of Example 14-7 was executed, except that the oxygen content in the anode active material particles was changed as illustrated in Table 24. The cycle characteristics and the swollenness characteristics for the secondary batteries of Examples 19-1 to 19-9 were examined. The results illustrated in Table 24 were obtained.

TABLE 23

| | Anode active material layer | | | | | | | | | | | | Discharge capacity retention ratio (%) |
|---|---|---|---|---|---|---|---|---|---|---|---|---|---|
| | Spherical particle | | | | Crystal state | | | Metal element | | Metal layer | | | |
| | Presence | Number of particles (pcs) | Particle diameter (μm) | Circular-ity degree | Planular particle | Type | Half-width (deg) | Crystal-lite size (nm) | Type | Content (atomic %) | Type | Thickness (m) | |
| Example 18-1 | Present | 15 | 5 | 0.95 | Not present | Crystalline | 1 | 35 | Fe | 0.3 | Fe | 100 | 74 |
| Example 18-2 | | | | | | | | | | | | 200 | 75 |
| Example 18-3 | | | | | | | | | | | | 500 | 76 |
| Example 14-7 | | | | | Present | | | | | | | 200 | 81 |
| Example 14-18 | Present | 15 | 5 | 0.95 | Present | Crystalline | 1 | 35 | Fe | 0.3 | — | — | 65 |

Battery structure: laminated film type; cathode active material: $LiCoO_2$; anode active material: Si (spraying method); ten point height of roughness profile Rz of anode current collector: 5 μm; and oxygen content in anode active material particles: 5 atomic %

TABLE 24

| | Anode active material layer | | | | | | | | | | | | |
|---|---|---|---|---|---|---|---|---|---|---|---|---|---|
| | Spherical particle | | | | Crystal state | | | | Metal element | | Metal layer | | Oxygen content | Discharge capacity |
| | | Particle | | | | | Crystal- | | | | | | | |
| | Presence | Number of particles (pcs) | Particle diameter (μm) | Circularity degree | Planular particle | Type | Half-width (deg) | lite size (nm) | Type | Content (atomic %) | Type | Thickness (m) | amount (atomic %) | retention ratio (%) |
| Example 19-1 | Present | 15 | 5 | 0.95 | Present | Crystal-line | 1 | 35 | Fe | 0.3 | Fe | 200 | 0.5 | 78 |
| Example 19-2 | | | | | | | | | | | | | 1 | 79 |
| Example 19-3 | | | | | | | | | | | | | 1.5 | 80 |
| Example 19-4 | | | | | | | | | | | | | 2 | 80.5 |
| Example 14-7 | | | | | | | | | | | | | 5 | 81 |
| Example 19-5 | | | | | | | | | | | | | 10 | 81.2 |
| Example 19-6 | | | | | | | | | | | | | 20 | 81.6 |
| Example 19-7 | | | | | | | | | | | | | 30 | 81.7 |
| Example 19-8 | | | | | | | | | | | | | 40 | 81.7 |
| Example 19-9 | | | | | | | | | | | | | 45 | 81.7 |
| Example 14-18 | Present | 15 | 5 | 0.95 | Present | Crystal-line | 1 | 35 | Fe | 0.3 | — | — | 5 | 65 |

Battery structure: laminated film type; cathode active material: LiCoO$_2$; anode active material: Si (spraying method); and ten point height of roughness profile Rz of anode current collector: 5 μm In Examples 19-1 to 19-9 in which the metal layer was formed, even in the case where the oxygen content was changed, the discharge capacity retention ratio was higher than that of Example 14-18 in which the metal layer was not formed. In this case, in the case where the oxygen content was from 1.5 atomic % to 40 atomic % both inclusive, the discharge capacity retention ratio was more increased, and a sufficient battery capacity was obtained. Accordingly, in the case where the metal layer is formed, if the oxygen content in the anode active material particles is from 1.5 atomic % to 40 atomic % both inclusive, the cycle characteristics are further improved.

Examples 20-1 to 20-3

A procedure similar to that of Example 14-7 was executed, except that the anode active material layer 54B containing the high oxygen-containing region and the low oxygen-containing region was formed as illustrated in Table 25. The cycle characteristics for the secondary batteries of Examples 20-1 to 20-3 were examined. The results illustrated in Table 25 were obtained.

In Examples 20-1 to 20-3 in which the metal layer was formed, even in the case where the anode active material layer 54B had the high oxygen-containing region and the low oxygen-containing region, the discharge capacity retention ratio was higher than that of Example 14-18 in which the metal layer was not formed. Accordingly, even in the case where the metal layer is formed, if the anode active material layer 54B had the high oxygen-containing region and the low oxygen-containing region, the cycle characteristics are further improved.

Examples 21-1 to 21-12

A procedure similar to that of Example 14-7 was executed, except that the ten point height of roughness profile Rz of the surface of the anode current collector 54A was changed as illustrated in Table 26. The cycle characteristics for the secondary batteries of Examples 21-1 to 21-12 were examined. The results illustrated in Table 26 were obtained.

TABLE 25

| | Anode active material layer | | | | | | | | | | | | |
|---|---|---|---|---|---|---|---|---|---|---|---|---|---|
| | Spherical particle | | | | Crystal state | | | | Metal element | | Metal layer | | Number of high-oxygen containing regions | Discharge capacity |
| | | Particle | | | Planu- | | | Crystal- | | | | | | |
| | Presence | Number of particles (pcs) | Particle diameter (μm) | Circularity degree | lar particle | Type | Half-width (deg) | lite size (nm) | Type | Content (atomic %) | Type | Thickness (m) | | retention ratio (%) |
| Example 14-7 | Present | 15 | 5 | 0.95 | Present | Crystal-line | 1 | 35 | Fe | 0.3 | Fe | 200 | — | 81 |
| Example 20-1 | | | | | | | | | | | | | 1 | 81.5 |
| Example 20-2 | | | | | | | | | | | | | 2 | 82.1 |
| Example 20-3 | | | | | | | | | | | | | 3 | 82.5 |
| Example 14-18 | Present | 15 | 5 | 0.95 | Present | Crystal-line | 1 | 35 | Fe | 0.3 | — | — | — | 65 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

TABLE 26

| | Anode active material layer | | | | | | | | | | | Anode current collector | |
|---|---|---|---|---|---|---|---|---|---|---|---|---|---|
| | Spherical particle | | | | Crystal state | | | | | | | Ten point height of roughness profile Rz (μm) | Discharge capacity retention ratio (%) |
| | Presence | Number of particles (pcs) | Particle diameter (μm) | Circularity degree | Planular particle | Type | Half-width (deg) | Crystallite size (nm) | Metal element Type | Content (atomic %) | Metal layer Type | Thickness (m) | | |
| Example 21-1 | Present | 15 | 5 | 0.95 | Present | Crystalline | 1 | 35 | Fe | 0.3 | Fe | 200 | 0.5 | 77 |
| Example 21-2 | | | | | | | | | | | | | 1 | 78 |
| Example 21-3 | | | | | | | | | | | | | 1.5 | 80 |
| Example 21-4 | | | | | | | | | | | | | 2 | 80.3 |
| Example 21-5 | | | | | | | | | | | | | 3 | 80.6 |
| Example 14-7 | | | | | | | | | | | | | 5 | 81 |
| Example 21-6 | | | | | | | | | | | | | 10 | 81.2 |
| Example 21-7 | | | | | | | | | | | | | 15 | 81.5 |
| Example 21-8 | | | | | | | | | | | | | 20 | 81.9 |
| Example 21-9 | | | | | | | | | | | | | 25 | 82.2 |
| Example 21-10 | | | | | | | | | | | | | 30 | 82.8 |
| Example 21-11 | | | | | | | | | | | | | 35 | 82.8 |
| Example 21-12 | | | | | | | | | | | | | 40 | 82.8 |
| Example 14-18 | Present | 15 | 5 | 0.95 | Present | Crystalline | 1 | 35 | Fe | 0.3 | — | — | 5 | 65 |

Battery structure: laminated film type; cathode active material: LiCoO$_2$; anode active material: Si (spraying method); and oxygen content in anode active material particles: 5 atomic %

In Examples 21-1 to 21-12 in which the metal layer was formed, even in the case where the ten point height of roughness profile Rz was changed, the discharge capacity retention ratio was higher than that of Example 14-8 in which the metal layer was not formed. In this case, in the case where the ten point height of roughness profile Rz was 1.5 μm or more, or preferably from 3 μm to 30 μm both inclusive, the discharge capacity retention ratio was more increased. Accordingly, even in the case where the metal layer is formed, if the ten point height of roughness profile Rz of the anode current collector 54A is 1.5 μm or more, or preferably from 3 μm to 30 μm both inclusive, the cycle characteristics are further improved.

Examples 22-1 to 22-8

A procedure similar to that of Example 14-7 was executed, except that the composition of the electrolytic solution was changed as illustrated in Table 27 and Table 28. Specific compositions of the electrolytic solution were similar to those of Examples 11-1 to 11-8. The cycle characteristics for the secondary batteries of Examples 22-1 to 22-8 were examined. The results illustrated in Table 27 and Table 28 were obtained.

TABLE 27

| | Anode active material layer | | | | | | | | | | | |
|---|---|---|---|---|---|---|---|---|---|---|---|---|
| | Spherical particle | | | | | Crystal state | | | | | | |
| | Presence | Number of particles (pcs) | Particle diameter (μm) | Circularity degree | Planular particle | Type | Half-width (deg) | Crystallite size (nm) | Metal element Type | Content (atomic %) | Metal layer Type | Thickness (m) |
| Example 14-7 | Present | 15 | 5 | 0.95 | Present | Crystalline | 1 | 35 | Fe | 0.3 | Fe | 200 |
| Example 22-1 | | | | | | | | | | | | |
| Example 22-2 | | | | | | | | | | | | |
| Example 22-3 | | | | | | | | | | | | |
| Example 22-4 | | | | | | | | | | | | |
| Example 22-5 | | | | | | | | | | | | |
| Example 22-6 | | | | | | | | | | | | |
| Example 22-7 | | | | | | | | | | | | |
| Example 22-8 | | | | | | | | | | | | |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

TABLE 28

| | Solvent (weight ratio) | | | | Electrolyte salt | | Discharge capacity retention ratio |
|---|---|---|---|---|---|---|---|
| | EC | FEC | DFEC | DEC | (mol/kg) | Other solvent | (%) |
| Example 14-7 | 50 | — | — | 50 | LiPF$_6$: 1 mol/kg | — | 81 |
| Example 22-1 | — | 50 | — | 50 | | — | 82.5 |
| Example 22-2 | 25 | — | 5 | 70 | | | 82.4 |
| Example 22-3 | — | 50 | — | 50 | LiPF$_6$: 0.9 mol/kg + LiBF$_4$: 0.1 mol/kg | | 82.4 |
| Example 22-4 | | | | | LiPF$_6$: 1 mol/kg | VC | 82.6 |
| Example 22-5 | | | | | | VEC | 82.5 |
| Example 22-6 | | | | | | PRS | 82.3 |
| Example 22-7 | | | | | | SBAH | 82.6 |
| Example 22-8 | | | | | | SPAH | 82.6 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

In Examples 22-1 to 22-8 in which the metal layer was formed, even in the case where the composition of the electrolytic solution was changed, the discharge capacity retention ratio was higher than that of Example 14-18 in which the metal layer was not formed. Accordingly, even in the case where the metal layer is formed, if a chain ester carbonate or a cyclic ester carbonate having halogen, a cyclic ester carbonate having an unsaturated carbon bond, sultone, or an acid anhydride is used, the cycle characteristics are further improved. Further, in the case where lithium tetrafluoroborate is used as an electrolyte salt, the cycle characteristics are further improved. Further, in the case where sultone or an acid anhydride is used as a solvent, the cycle characteristics are further improved.

Examples 23-1 and 23-2

A procedure similar to that of Example 14-7 was executed, except that the square type secondary battery was fabricated as illustrated in Table 29. The procedure for fabricating the square type secondary battery was similar to that of Examples 13-1 and 13-2. The cycle characteristics for the secondary batteries of Examples 23-1 and 23-2 were examined. The results illustrated in Table 29 were obtained.

increased. Accordingly, even in the case where the metal layer is formed, if the battery structure is square, the cycle characteristics are further improved.

From the results of Table 1 to Table 29 and FIG. 14 to FIG. 20, it was confirmed as follows. That is, the anode active material layer in the secondary battery of the invention contains the plurality of crystalline anode active material particles having silicon as an element. The plurality of crystalline anode active material particles contain the spherical particle and the nonspherical particle. Thereby, superior cycle characteristics and superior swollenness characteristics are obtained without depending on the oxygen content in the anode active material particles, the presence of a metal element in the anode active material particles, the composition of the electrolytic solution, the battery structure, presence of the metal layer and the like.

The invention has been described with reference to the embodiment and the examples. However, the invention is not limited to the aspects described in the foregoing embodiment and the foregoing examples, and various modifications may be made. For example, use application of the anode of the invention is not always limited to the secondary battery, but may be an electrochemical device other than the secondary battery. Examples of other use applications include a capacitor.

TABLE 29

| | Anode active material layer | | | | | | | | | | | |
|---|---|---|---|---|---|---|---|---|---|---|---|---|
| | Spherical particle | | | | | Crystal state | | | Metal element | | Metal layer | | | |
| | Presence | Number of particles (pcs) | Particle diameter (μm) | Circularity degree | Planular particle | Type | Half-width (deg) | Crystallite size (nm) | Type | Content (atomic %) | Type | Thickness (m) | Battery structure | Discharge capacity retention ratio (%) |
| Example 14-7 | Present | 15 | 5 | 0.95 | Present | Crystalline | 1 | 35 | Fe | 0.3 | Fe | 200 | Laminated film type | 81 |
| Example 23-1 | | | | | | | | | | | | | Square type (Al) | 82.5 |
| Example 23-2 | | | | | | | | | | | | | Square type (Fe) | 84.5 |

Battery structure: laminated film type; cathode active material: LiCoO$_2$; anode active material: Si (spraying method); ten point height of roughness profile Rz of anode current collector: 5 μm; and oxygen content in anode active material particles: 5 atomic %

In Examples 23-1 and 23-2 in which the metal layer was formed, even in the case where the battery structure was changed, the discharge capacity retention ratio was higher than that of Example 14-18 in which the metal layer was not formed. In this case, in the case where the battery structure was square, the discharge capacity retention ratio was more Further, in the foregoing embodiment and the foregoing examples, the description has been given of the lithium ion secondary battery as a secondary battery type in which the anode capacity is expressed based on insertion and extraction of lithium ions. However, the secondary battery of the invention is not limited thereto. The invention is able to be similarly applied to a secondary battery in which the anode capacity includes the capacity associated with insertion and extraction of lithium ions and the capacity associated with precipitation and dissolution of lithium metal, and the anode capacity is expressed by the sum of these capacities. In this case, a material capable of inserting and extracting lithium ions is used as an anode active material, and the chargeable capacity in such a material is set to a smaller value than the discharge capacity of the cathode.

Further, in the foregoing embodiment and the foregoing examples, the description has been given with the specific examples of the case in which the battery structure is the square type, the cylindrical type, or the laminated film type, and with the specific example in which the battery element has the spirally wound structure. However, the secondary battery of the invention is able to be similarly applied to a battery having other battery structure such as a coin type battery and a button type battery or a battery in which the battery element has other structure such as a laminated structure.

Further, in the foregoing embodiment and the foregoing examples, the description has been given of the case using lithium as an electrode reactant, but the electrode reactant is not limited thereto. However, as an electrode reactant, for example, other Group 1 element such as sodium (Na) and potassium (K), a Group 2 element such as magnesium and calcium, or other light metal such as aluminum may be used. The effect of the invention is able to be obtained without depending on the electrode reactant type, and thus even if the electrode reactant type is changed, similar effect is able to be obtained.

Further, in the foregoing embodiment and the foregoing examples, for the particle diameter of the spherical particle of the secondary battery of the invention, the description has been given of the appropriate range derived from the results of the examples. However, the description does not totally deny a possibility that the particle diameter is out of the foregoing range. That is, the foregoing appropriate range is the range particularly preferable for obtaining the effects of the invention. Therefore, as long as effect of the invention is obtained, the particle diameter may be out of the foregoing range in some degrees. The same is applied to the circularity of the spherical particle, the half-width and the crystallite size of the anode active material particles, the oxygen content in the anode active material particles, the ten point height of roughness profile Rz of the surface of the anode current collector, or the thickness of the metal layer.

The present application contains subject matter related to that disclosed in Japanese Priority Patent Application JP 2008-291850 filed in the Japanese Patent Office on Nov. 14, 2008, and Japanese Priority Patent Application JP 2009-150923 filed in the Japanese Patent Office on Jun. 25, 2009, the entire content of which is hereby incorporated by references.

It should be understood by those skilled in the art that various modifications, combinations, sub combinations and alternations may occur depending on design requirements and other factors insofar as they are within the scope of the appended claims or the equivalents thereof.

What is claimed is:

1. A secondary battery comprising:
 a cathode and an anode capable of inserting and extracting an electrode reactant; and
 an electrolyte containing a solvent and an electrolyte salt, wherein,
  the anode has an anode active material layer on an anode current collector,
  the anode active material layer comprises at least one layer which includes anode active material particles including a plurality of spherical crystalline particles having silicon (Si) as an element and a plurality of non-spherical particles each having a plate-like outline when viewed in cross-section,
  at least some of the spherical crystalline particles are directly fixed to the anode current collector,
  the number of whole spherical crystalline particles having a diameter of 0.1 μm to 40 μm, both inclusive, is 10 pieces to 200 pieces, both inclusive, as obtained as an average count per image for thirty 10.75 μm×16.00 μm SEM images at 8,000 times magnification, the images being of a surface of the anode active material layer,
  at least part of each of the spherical crystalline particles has a planular shape, and
  the anode active material layer includes a metal layer with metal material in at least some gaps between anode active material particles, the metal material not reacting with the electrode reactant.

2. The secondary battery according to claim 1, wherein a half-width (2θ) of a diffraction peak in (111) crystal plane of the anode active material particles obtained by X-ray diffraction is 20° or less, or a crystallite size originated in the (111) crystal plane of the anode active material particles obtained by X-ray diffraction is 10 nm or more.

3. The secondary battery according to claim 1, wherein the spherical crystalline particles have a median diameter from and including 0.5 μm to 35 μm.

4. The secondary battery according to claim 1, wherein a circularity degree of the spherical particles is greater than or equal to 0.5 and less than 1.

5. The secondary battery according to claim 1, wherein the anode active material particles are formed by spraying method.

6. The secondary battery according to claim 1, wherein the anode active material particles are alloyed with at least part of an interface with the anode current collector.

7. The secondary battery according to claim 1, wherein the anode active material particles are at least one of a simple substance, an alloy, and a compound of silicon.

8. The secondary battery according to claim 1, wherein the anode active material particles have oxygen (O) as an element, and an oxygen content in the anode active material particles is from and including 1.5 atomic % to 40 atomic %.

9. The secondary battery according to claim 1, wherein the anode active material particles have at least one metal element selected from the group consisting of iron (Fe), nickel (Ni), molybdenum (Mo), titanium (Ti), chromium (Cr), cobalt (Co), copper (Cu), manganese (Mn), zinc (Zn), germanium (Ge), aluminum (Al), zirconium (Zr), silver (Ag), tin (Sn), antimony (Sb), and tungsten (W).

10. The secondary battery according to claim 1, wherein the anode active material layer comprises at least a first region containing an amount of oxygen and a second region containing an amount of oxygen less than the oxygen in the first region, the oxygen content being measured in a thickness direction.

11. The secondary battery according to claim 1, wherein ten point height of roughness profile Rz of a surface of the anode current collector is 1.5 μm or more.

12. The secondary battery according to claim 1, wherein the solvent contains at least one of:
 (a) a chain ester carbonate having halogen as an element,
 (b) a cyclic ester carbonate having halogen as an element, (c) a cyclic ester carbonates having an unsaturated carbon bond,
(d) sultone, or
(e) an acid anhydride wherein, (1) the chain ester carbonate having halogen as an element is fluoromethyl methyl carbonate, bis(fluoromethyl) carbonate, difluoromethyl methyl carbonate, or any combination of them, (2) the cyclic ester carbonate having halogen as an element is any one or a combination of chemical formulae 2-1 to 2-21, chemical formulae 2-1 to 2-21 being:

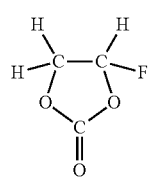
(2-1)

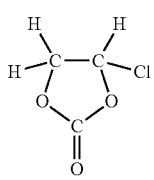
(2-2)

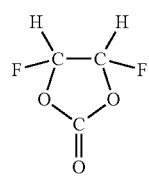
(2-3)

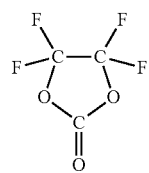
(2-4)

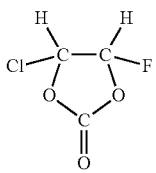
(2-5)

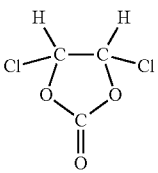
(2-6)

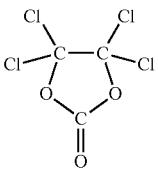
(2-7)

-continued

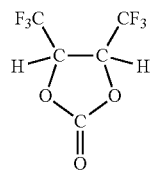
(2-8)

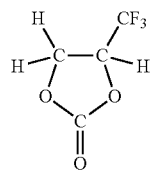
(2-9)

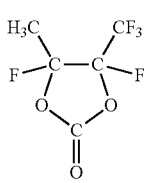
(2-10)

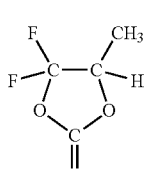
(2-11)

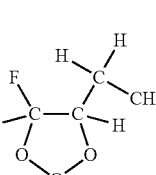
(2-12)

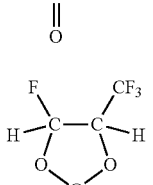
(2-13)

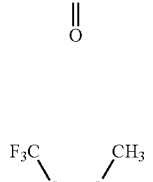
(2-14)

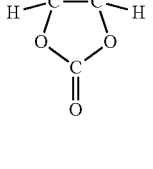
(2-15)

(2-16) 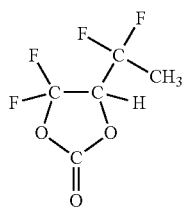

(2-17) 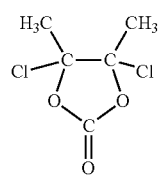

(2-18) 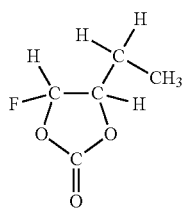

(2-19) 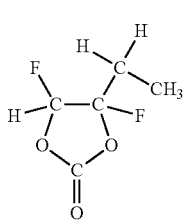

(2-20) 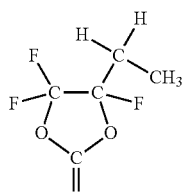

(2-21) 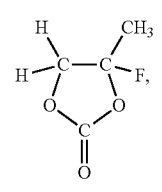

and (3) the cyclic ester carbonates having an unsaturated carbon bond is vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one, vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one, 4-methylene-1,3-dioxolane-2-one, 4,4-dimethyl-5-methylene-1,3-dioxolane-2-one, 4,4-diethyl-5-methylene-1,3-dioxolane-2-one, catechol carbonate having a benzene ring, or any combination of them.

13. The secondary battery according to claim 1, wherein:

(1) the electrolyte salt contains lithium hexafluorophosphate ($LiPF_6$), lithium tetrafluoroborate ($LiBF_4$), lithium perchlorate ($LiClO_4$), lithium hexafluoroarsenate ($LiAsF_6$), a compound shown in chemical formulae 6-1 to 6-6, a compound shown in chemical formulae 7-1 to 7-8, a compound shown in chemical formula 8-1, one or a combination of lithium bis(trifluoromethanesulfonyl)imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)mide ($LiN(CF_3SO_2)(C_2F_5SO_2)$), lithium (trifluoromethanesulfonyl)(heptafluoropropanesulfonyl)imide ($LiN(CF_3SO_2)(C_3F_7SO_2)$), and lithium(trifluoromethanesulfonyl)(nonafluorobutanesulfonyl)imide ($LiN(CF_3SO_2)(C_4F_9SO_2)$), a compound shown in chemical formula 10-1 to 10-4, lithium tris(trifluoromethanesulfonyl)methyde ($LiC(CF_3SO_2)_3$, or any combination of them;

(2) chemical formulae 6-1 to 6-6 are:

(6-1) 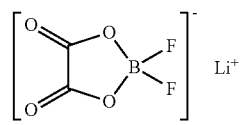

(6-2) 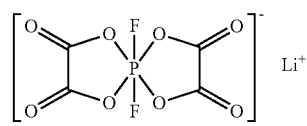

(6-3) 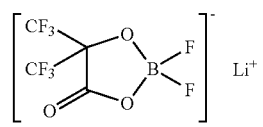

(6-4) 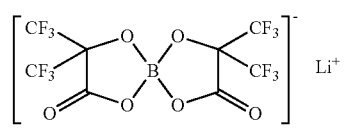

(6-5) 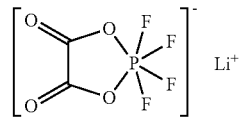

(6-6) 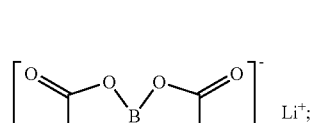

(3) chemical formulae 7-1 to 7-8 are:

(7-1)
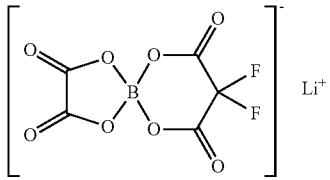

(7-2)
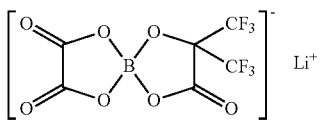

(7-3)
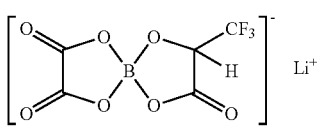

(7-4)
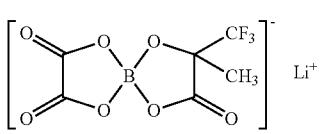

(7-5)
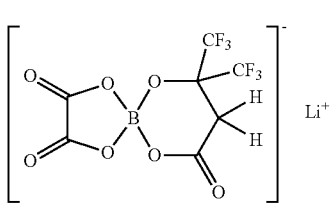

(7-6)
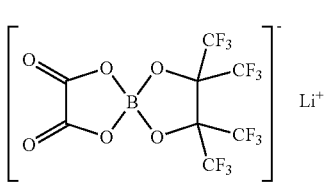

(7-7)
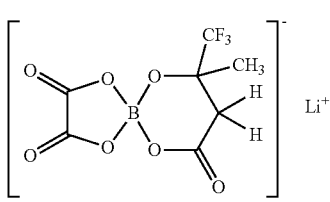

(7-8)
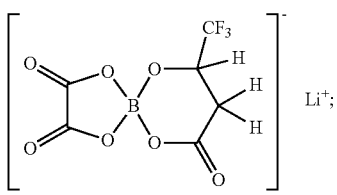

(4) chemical formula 8-1 is (8-1)
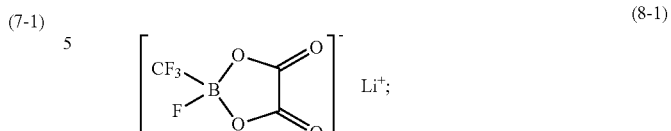

and (5) chemical formula 10-1 to 10-4 are:

(10-1)
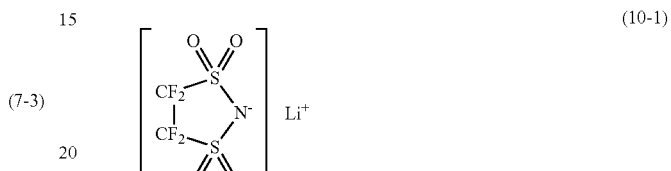

(10-2)
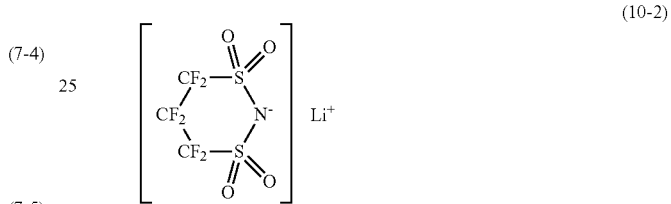

(10-3)
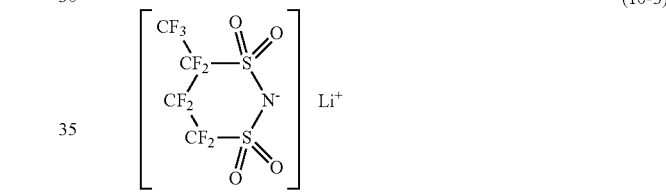

(10-4)
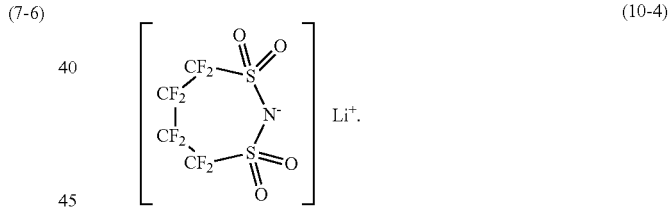

14. The secondary battery according to claim 1, wherein the cathode contains a composite oxide shown in Formula 12 as a cathode active material, Formula 12 being $LiNi_{1-x}M_xO_2$, where M is at least one of cobalt, manganese, iron, aluminum, vanadium (V), tin, magnesium (Mg), titanium, strontium (Sr), calcium (Ca), zirconium, molybdenum, technetium (Tc), ruthenium (Ru), tantalum (Ta), tungsten, rhenium (Re), ytterbium (Yb), copper, zinc, barium (Ba), boron (B), chromium, silicon, gallium (Ga), phosphorus (P), antimony, or niobium (Nb), and x is in the range of $0.005<x<0.5$.

15. The secondary battery according to claim 1, wherein the metal layer covers at least parts of surfaces of the anode active material particles.

16. The secondary battery according to claim 1, wherein the metal layer has at least one metal element of iron, cobalt, nickel, zinc, copper, and chromium as an element.

17. The secondary battery according to claim 1, wherein a thickness of the metal layer is from and including 1 nm to 30000 nm.

18. An anode comprising:
an anode current collector; and
an anode active material layer on the anode current collector,
wherein,
- the anode is configured to insert and extract an electrode reactant,
- the anode active material layer comprises at least one layer which includes anode active material particles including a plurality of spherical crystalline particles having silicon as an element and a plurality of non-spherical particles each having a plate-like outline when viewed in cross-section,
- at least some of the spherical crystalline particles are directly fixed to the anode current collector,
- the number of whole spherical crystalline particles having a diameter of 0.1 μm to 40 μm, both inclusive, is 10 pieces to 200 pieces, both inclusive, as obtained as an average count per image for thirty 10.75 μm×16.00 μm SEM images at 8,000 times magnification, the images being of a surface of the anode active material layer, at least part of each of the spherical crystalline particles has a planular shape, and
the anode active material layer includes a metal layer with metal material in at least some gaps between anode active material particles, the metal material not reacting with the electrode reactant.

* * * * *